(12) United States Patent
Ono

(10) Patent No.: US 10,594,964 B2
(45) Date of Patent: Mar. 17, 2020

(54) IMAGING DEVICE AND IMAGE DATA GENERATION METHOD

(71) Applicant: FUJIFILM Corporation, Tokyo (JP)

(72) Inventor: Shuji Ono, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 66 days.

(21) Appl. No.: 16/030,870

(22) Filed: Jul. 10, 2018

(65) Prior Publication Data

US 2018/0316879 A1 Nov. 1, 2018

Related U.S. Application Data

(63) Continuation of application No. PCT/JP2016/086590, filed on Dec. 8, 2016.

(30) Foreign Application Priority Data

Jan. 26, 2016 (JP) .................. 2016-012537

(51) Int. Cl.
*H04N 5/359* (2011.01)
*G03B 15/00* (2006.01)
(Continued)

(52) U.S. Cl.
CPC .......... *H04N 5/3597* (2013.01); *G03B 11/00* (2013.01); *G03B 15/00* (2013.01); *G03B 17/17* (2013.01);
(Continued)

(58) Field of Classification Search
CPC .. H04N 5/3597; H04N 5/35563; H04N 5/359; H04N 5/22541; H04N 5/23238;
(Continued)

(56) References Cited

U.S. PATENT DOCUMENTS

2009/0190016 A1 7/2009 Iida
2013/0222676 A1* 8/2013 Ono .................. G02B 3/14
                                              348/345

(Continued)

FOREIGN PATENT DOCUMENTS

JP   2014178190   9/2014
WO   2013018471   2/2013

(Continued)

OTHER PUBLICATIONS

International Search Report (Form PCT/ISA/210) of PCT/JP2016/086590, dated Mar. 7, 2017, with English translation thereof, pp. 1-5.

(Continued)

*Primary Examiner* — Jason A Flohre
(74) *Attorney, Agent, or Firm* — JCIPRNET

(57) ABSTRACT

In an imaging device that includes an imaging lens including n number of optical systems of which imaging characteristics are different and an image sensor including m number of light receiving sensors of which combinations of crosstalk ratio and light sensitivity are different in each pixel, m number of primary image data items are generated by obtaining image signals output from the light receiving sensors of each pixel of the image sensor, and n number of secondary image data items corresponding to the optical systems are generated by performing crosstalk removal processing on the m number of generated primary image data items for each pixel. In a case where a pixel as a processing target includes the primary image data of which a pixel value is saturated, the secondary image data items are generated by removing the corresponding primary image data and performing the crosstalk removal processing.

30 Claims, 42 Drawing Sheets

(51) Int. Cl.
 *H04N 5/225* (2006.01)
 *G03B 11/00* (2006.01)
 *H04N 5/232* (2006.01)
 *G03B 17/17* (2006.01)
 *G06T 5/50* (2006.01)
 *G03B 19/07* (2006.01)
 *H04N 5/355* (2011.01)
 *H04N 5/235* (2006.01)
 *H04N 5/3745* (2011.01)

(52) U.S. Cl.
 CPC ................ *G03B 19/07* (2013.01); *G06T 5/50* (2013.01); *H04N 5/2254* (2013.01); *H04N 5/2258* (2013.01); *H04N 5/22541* (2018.08); *H04N 5/2353* (2013.01); *H04N 5/23229* (2013.01); *H04N 5/23238* (2013.01); *H04N 5/359* (2013.01); *H04N 5/35563* (2013.01); *H04N 5/37452* (2013.01); *G06T 2207/10052* (2013.01); *G06T 2207/20221* (2013.01)

(58) Field of Classification Search
 CPC ............. H04N 5/2258; H04N 5/37452; H04N 5/2353; H04N 5/23229; H04N 5/2254; G03B 19/07; G03B 17/17; G03B 11/00; G03B 15/00; G06T 5/50; G06T 2207/10052; G06T 2207/20221
 See application file for complete search history.

(56) References Cited

U.S. PATENT DOCUMENTS

| | | |
|---|---|---|
| 2014/0139645 A1 | 5/2014 | Ono |
| 2014/0152779 A1 | 6/2014 | Ono |
| 2014/0168498 A1 | 6/2014 | Ono |
| 2014/0267622 A1 | 9/2014 | Kasahara |
| 2015/0009369 A1 | 1/2015 | Ono |
| 2015/0156478 A1 | 6/2015 | Ono |
| 2017/0099436 A1* | 4/2017 | Ono ...................... G02B 13/00 |

FOREIGN PATENT DOCUMENTS

| | | |
|---|---|---|
| WO | 2013024636 | 2/2013 |
| WO | 2013027488 | 2/2013 |
| WO | 2013146506 | 10/2013 |
| WO | 2014024745 | 2/2014 |

OTHER PUBLICATIONS

"Written Opinion of the International Searching Authority (Form PCT/ISA/237) of PCT/JP2016/086590," dated Mar. 7, 2017, with English translation thereof, pp. 1-7.

"Search Report of Europe Counterpart Application", dated Dec. 3, 2018, p. 1-p. 8.

* cited by examiner $$\begin{bmatrix} A1 \\ A2 \end{bmatrix} = \begin{bmatrix} C11 & C12 \\ C21 & C22 \end{bmatrix} \times \begin{bmatrix} B1 \\ B2 \end{bmatrix}$$

$$A = C * B$$

$$\begin{bmatrix} B1 \\ B2 \end{bmatrix} = \begin{bmatrix} C11 & C12 \\ C21 & C22 \end{bmatrix}^{-1} \times \begin{bmatrix} A1 \\ A2 \end{bmatrix}$$

$$\begin{bmatrix} A1 \\ A2 \\ A3 \\ A4 \end{bmatrix} = \begin{bmatrix} s1*C11 & s1*C12 \\ s2*C21 & s2*C22 \\ s3*C31 & s3*C32 \\ s4*C41 & s4*C42 \end{bmatrix} \times \begin{bmatrix} B1 \\ B2 \end{bmatrix}$$

⇩

A = T * B $B = T^{-1} * A$ $$\begin{bmatrix} A2 \\ A3 \\ A4 \end{bmatrix} = \begin{bmatrix} s2*C21 & s2*C22 \\ s3*C31 & s3*C32 \\ s4*C41 & s4*C42 \end{bmatrix} \times \begin{bmatrix} B1 \\ B2 \end{bmatrix}$$

$A = T * B$ $$\begin{bmatrix} B1 \\ \\ B2 \end{bmatrix} = \begin{bmatrix} s2*C21 & s2*C22 \\ s3*C31 & s3*C32 \\ s4*C41 & s4*C42 \end{bmatrix}^{-1} \times \begin{bmatrix} A2 \\ A3 \\ A4 \end{bmatrix}$$

$$B = T^{-1} * A$$

IMAGING DEVICE AND IMAGE DATA GENERATION METHOD

CROSS-REFERENCE TO RELATED APPLICATIONS

This application is a Continuation of PCT International Application No. PCT/JP2016/086590 filed on Dec. 8, 2016, which claims priority under 35 U.S.C § 119(a) to Japanese Patent Application No. 2016-012537 filed on Jan. 26, 2016. Each of the above application(s) is hereby expressly incorporated by reference, in its entirety, into the present application.

BACKGROUND OF THE INVENTION

1. Field of the Invention

The present invention relates to an imaging device and an image data generation method, and particularly, to an imaging device and an image data generation method which are capable of imaging a plurality of images at one time by using an imaging lens including a plurality of optical systems and an image sensor of which each light receiving sensor has directivity for an incidence angle of light.

2. Description of the Related Art

An imaging device capable of imaging a plurality of images at one time by using an imaging lens including a plurality of optical systems and an image sensor of which each light receiving sensor has directivity for an incidence angle of light has been known (for example, WO2013/018471A). In this imaging device, images corresponding to the optical systems are captured by selectively receiving light rays passing through the optical systems of the imaging lens by the light receiving sensors of the image sensor. However, it is difficult to completely distribute and receive the light rays from the optical systems by the light receiving sensors. As a result, crosstalk is caused. The crosstalk is a phenomenon by which light from another optical system is mixed and is received. In a case where the crosstalk is caused, an image on which an image of another optical system is superimposed is captured (see FIGS. 13 and 14). WO2013/146506A and JP2014-178190A suggest a method of removing the influence of the crosstalk from each image through signal processing by using images of the optical systems obtained through the imaging.

SUMMARY OF THE INVENTION

The image sensor outputs a signal (voltage) in proportion with an exposure amount. However, a range in which linearity is secured is limited, and an output is constant in a case where the exposing is performed beyond a saturation exposure amount.

Meanwhile, processing for removing the influence of the crosstalk is performed by mutually using the images of the optical systems. Thus, in a case where a part thereof is saturated on the images of the optical systems, there is a problem that image quality is deteriorated since the influence of the crosstalk is not able to be removed (see FIG. 42).

The present invention has been made in view of such circumstances, and an object of the present invention is to provide an imaging device and an image data generation method which obtain a high-quality image by reducing influence of crosstalk.

Means for solving the problems are as follows.

(1) There is provided an imaging device comprising an imaging lens that includes n number of optical systems of which imaging characteristics are different in which n is an integer satisfying n>1, an image sensor that includes m number of light receiving sensors of which combinations of crosstalk ratio and light sensitivity are different in each pixel in which m is an integer satisfying m>n, a primary image data generation unit that generates m number of primary image data items by obtaining image signals output from the light receiving sensors of each pixel of the image sensor, a saturation pixel detection unit that detects a pixel of which a pixel value is saturated from the primary image data items, and a secondary image data generation unit that generates n number of secondary image data items corresponding to the optical systems by performing crosstalk removal processing on the m number of primary image data items for each pixel. The secondary image data generation unit generates the secondary image data items by removing the primary image data of which a pixel value is saturated and performing the crosstalk removal processing on remaining primary image data items in a case where a processing target includes the primary image data of which the pixel value is saturated.

According to the present aspect, the m number of light receiving sensors of which the combinations of crosstalk ratio and light sensitivity are different are included in each pixel of the image sensor. Accordingly, it is possible to generate the m number of image data items by performing the exposing once. That is, the outputs of the corresponding light receiving sensors from each pixel are obtained, and thus, it is possible to generate the m number of image data items. It is assumed that the image data items are the primary image data items. The image data items (secondary image data items) corresponding to the optical systems are generated from the m number of primary image data items. That is, the secondary image data items are generated by performing the crosstalk removal processing on the m number of primary image data items. The crosstalk removal processing is performed for each pixel. In a case where there is the primary image data of which the pixel value is saturated at the time of processing, the corresponding primary image data is removed, and the crosstalk removal processing is performed. Accordingly, it is possible to accurately remove the influence of the crosstalk, and it is possible to generate a high-quality image. The light receiving sensors of which light sensitivity is different are included in each pixel, and thus, it is possible to expand a dynamic range.

The "crosstalk ratio" is a ratio between light rays received from the optical systems. For example, it is assumed that three optical systems are included in the imaging lens. It is assumed that the three optical systems are a first optical system, a second optical system, and a third optical system. It is assumed that the crosstalk ratios in the light receiving sensors are first optical system:second optical system:third optical system=0.8:0.1:0.1. In this case, in a case where all the light reception amounts are 1, light rays are received by the light receiving sensors at a ratio of 0.8 from the first optical system, at a ratio of 0.1 from the second optical system, and at a ratio of 0.1 from the third optical system. That is, 80% of light rays received by the light receiving sensors are light rays from the first optical system, 10% of light rays are light rays from the second optical system, and 10% of light rays are light rays from third optical system.

The "crosstalk ratios are different" means that the ratios between light rays received from the optical systems are different. Accordingly, the "light receiving sensors of which the crosstalk ratios" are different are the light receiving sensors of which the ratios between the light rays received from the optical systems are different.

The "light receiving sensors of which light sensitivity is different" are light receiving sensors of which output signals (voltages) generated for every unit incident light amount are different.

The "crosstalk removal processing" is processing for removing the influence of the crosstalk from the image. In a case where the crosstalk is caused, the image on which the image of another optical system is superimposed is captured. The image of another optical system is separated and removed through the crosstalk removal processing.

The "imaging characteristics" means characteristics related to the imaging, and the "optical systems of which imaging characteristics are different" are optical systems of which the characteristics related to the imaging are different. For example, there are optical systems of which focal lengths are different, optical systems of which focusing distances are different, and optical systems of which transmission wavelength characteristics are different.

(2) In the imaging device according to (1), the secondary image data generation unit generates the secondary image data items by solving the following simultaneous equations $$A1 = s1*C11*B1 + s1*C12*B2 + \ldots + s1*C1n*Bn$$
$$A2 = s2*C21*B1 + s2*C22*B2 + \ldots + s2*C2n*Bn$$
$$\ldots$$
$$Am = sm*Cm1*B1 + sm*Cm2*B2 + \ldots + sm*Cmn*Bn$$

as the crosstalk removal processing in a case where pixel values of the primary image data items are A1, A2, ..., and Am, pixel values of the secondary image data items are B1, B2, ..., and Bn, crosstalk ratios of the light receiving sensors are C1=C11:C12: ... :C1n, C2=C21:C22: ... :C2n, ..., and Cm=Cm1:Cm2: ... :Cmn, and coefficients corresponding to light sensitivity of the light receiving sensors are s1, s2, ..., and sm, and generates the secondary image data items by removing the primary image data of which a pixel value is saturated and establishing the simultaneous equations in a case where a pixel as a processing target includes the primary image data of which the pixel value is saturated.

According to the present aspect, processing for solving predetermined simultaneous equations is performed as the crosstalk removal processing. In a case where the simultaneous equations are established and the pixel as the processing target includes the primary image data of which the pixel value is saturated, the corresponding primary image data is removed, and the simultaneous equation is established.

(3) In the imaging device according to (1), the secondary image data generation unit generates the secondary image data items by solving the following matrix equation $$B=T^{-1}*A$$

as the crosstalk removal processing in a case where a matrix of m rows×1 column in which pixel values A1, A2, ..., and Am of the primary image data items are elements is A, a matrix of n rows×1 column in which pixel values B1, B2, ..., and Bn of the secondary image data items are elements is B, a matrix of m rows×n columns in which products s1*C1=s1*C11:s1*C12: ... :s1*C1n, s2*C2=s2*C21:s2*C22: ... :s2*C2n, ..., and sm*Cm=sm*Cm1:sm*Cm2: ... :sm*Cmn of crosstalk ratios C1=C11:C12: ... :C1n, C2=C21:C22: ... :C2n, ..., and Cm=Cm1:Cm2: ... :Cmn of the light receiving sensors and coefficients s1, s2, ..., and sm corresponding to light sensitivity of the light receiving sensors are elements is T, and an inverse matrix of the T is $T^{-1}$, and generates the secondary image data items by removing the primary image data of which the pixel value is saturated and establishing the matrix equation in a case where a pixel as a processing target includes the primary image data of which the pixel value is saturated.

According to the present aspect, processing for solving a predetermined matrix equation is performed as the crosstalk removal processing. In a case where the matrix equation is established and the pixel as the processing target includes the primary image data of which the pixel value is saturated, the corresponding primary image data is removed, and the matrix equation is established.

(4) The imaging device according to (3) further comprises an inverse matrix information storage unit that stores information of the inverse matrix $T^{-1}$. The secondary image data generation unit solves the matrix equation by using the information of the inverse matrix $T^{-1}$ stored in the inverse matrix information storage unit.

According to the present aspect, the matrix equation is solved by using the information of the inverse matrix $T^{-1}$ stored in the inverse matrix information storage unit.

(5) In the imaging device according to (4), the inverse matrix information storage unit stores the information of the inverse matrix $T^{-1}$ for each pixel.

According to the present aspect, the information of the inverse matrix $T^{-1}$ is stored for each pixel. Accordingly, it is possible to more accurately remove the influence of the crosstalk.

(6) In the imaging device according to any one of (1) to (5), in a case where a pixel as a processing target includes k number of primary image data items of which pixel values are saturated in which k is an integer satisfying k>0 and a relationship of (m−k)<n is satisfied, the secondary image data generation unit calculates a pixel value of the secondary image data in the pixel as the processing target based on a pixel value of the primary image data which is not saturated and a crosstalk ratio of the primary image data which is not saturated without performing the crosstalk removal processing.

According to the present aspect, in a case where the number (m−k) of primary image data items in the pixel as the processing target is smaller than the number (n) of optical systems included in the imaging lens ((m−k)<n) as the result of the removal of the primary image data of which the pixel value is saturated, the crosstalk removal processing in the corresponding pixel is stopped. For example, in a case where the number (n) of optical systems included in the imaging lens is two and the number (m) of light receiving sensors included in each pixel is 4, pixel values of three primary image data items are saturated in the specific pixel. In this case, the crosstalk removal processing is not performed on the corresponding pixel. As alternative measures, the pixel value of the secondary image data is calculated based on the pixel value of the primary image data which is not saturated and the crosstalk ratio of the primary image data which is not saturated. Accordingly, it is possible to more appropriately remove the influence of the crosstalk. The crosstalk ratio of the primary image data which is not saturated is the crosstalk ratio of the light receiving sensor that generates the corresponding primary image data.

(7) In the imaging device according to (6), in a case where m=k, the secondary image data generation unit determines the pixel value of the secondary image data in the pixel as the processing target, as a saturation value.

According to the present aspect, in a case where all the light receiving sensors are saturated in the pixel as the processing target (m=k), the pixel value of the secondary image data in the corresponding pixel is the saturation value.

(8) In the imaging device according to any one of (1) to (7), the light receiving sensor includes a photoelectric conversion element, a microlens that forms an image of an emission pupil of the imaging lens on the photoelectric conversion element, and a light shielding mask that is disposed between the microlens and the light receiving sensor. A difference in shape of the light shielding mask causes a difference in light sensitivity.

According to the present aspect, the light sensitivity of the individual light receiving sensor is adjusted by the shape of the light shielding mask. For example, it is possible to adjust the light sensitivity by changing a size of an opening.

(9) In the imaging device according to any one of (1) to (7), the light receiving sensor includes a filter, and a difference in transmittance of the filter causes a difference in light sensitivity.

According to the present aspect, the light sensitivity of the individual light receiving sensor is adjusted by the transmittance of the filter. For example, a neutral density (ND) filter is used as the filter, and the light sensitivity of the individual light receiving sensor is adjusted by changing the density (transmittance) of the ND filter.

(10) There is provided an imaging device comprising an imaging lens that includes n number of optical systems of which imaging characteristics are different in which n is an integer satisfying n>1, an image sensor that includes n number of light receiving sensors or more of which crosstalk ratios are different in each pixel, an exposing controller that exposes the image sensor with different exposure values multiple times, a primary image data generation unit that generates m number of primary image data items in which m>n by obtaining image signals output from the light receiving sensors of each pixel of the image sensor whenever the exposing is performed, a saturation pixel detection unit that detects a pixel of which a pixel value is saturated from the primary image data items, and a secondary image data generation unit that generates n number of secondary image data items corresponding to the optical systems by performing crosstalk removal processing on the m number of primary image data items for each pixel. The secondary image data generation unit generates the secondary image data items by removing the primary image data of which a pixel value is saturated and performing the crosstalk removal processing on remaining primary image data items in a case where a processing target includes the primary image data of which the pixel value is saturated.

According to the present aspect, the exposing is performed multiple times according to one imaging instruction. The exposing is performed with a different exposure value whenever the exposing is performed. The exposing is performed multiple times with different exposure values, and thus, it is possible to obtain a plurality of image data items of which brightness is different. The image data items are image data items of which the combinations of crosstalk ratio and light sensitivity are different. For example, in a case where the image sensor that includes two light receiving sensors of which crosstalk ratios are different in each pixel is used and imaging is performed twice with different exposure values, it is possible to generate four image data items. It is assumed that the image data items are the primary image data items. The image data items (secondary image data items) corresponding to the optical systems are generated from the m number of primary image data items. That is, the secondary image data items are generated by performing the crosstalk removal processing on the m number of primary image data items. The crosstalk removal processing is performed for each pixel. In a case where the pixel as the processing target includes the primary image data of which the pixel value is saturated at the time of processing, the primary image data is removed, and the crosstalk removal processing is performed. Accordingly, it is possible to accurately remove the influence of the crosstalk, and thus, a high-quality image is obtained. The light receiving sensors of which light sensitivity is different are included in each pixel, and thus, it is possible to expand a dynamic range.

The "exposure value" is a value indicating the brightness of the exposure. The exposure value is determined by the combination of the stop (F number) of the imaging lens, an exposing time (shutter speed), and sensitivity.

(11) In the imaging device according to (10), the secondary image data generation unit generates the secondary image data items by solving the following simultaneous equations $$A1 = e1*C11*B1 + e1*C12*B2 + \ldots + e1*C1n*Bn$$

$$A2 = e2*C21*B1 + e2*C22*B2 + \ldots + e2*C2n*Bn$$

$$\ldots$$

$$Am = em*Cm1*B1 + em*Cm2*B2 + \ldots + em*Cmn*Bn$$

as the crosstalk removal processing in a case where pixel values of the primary image data items are A1, A2, ..., and Am, pixel values of the secondary image data items are B1, B2, ..., and Bn, crosstalk ratios of the light receiving sensors corresponding to the primary image data items are C1=C11:C12: ... :C1n, C2=C21:C22: ... :C2n, ..., and Cm=Cm1:Cm2: ... :Cmn, and coefficients corresponding to exposure values at the time of exposing the primary image data items are e1, e2, ..., and em, and generates the secondary image data items by removing the primary image data of which a pixel value is saturated and establishing the simultaneous equations in a case where a pixel as a processing target includes the primary image data of which the pixel value is saturated.

According to the present aspect, processing for solving predetermined simultaneous equations is performed as the crosstalk removal processing. In a case where the simultaneous equations are established and the pixel as the processing target includes the primary image data of which the pixel value is saturated, the corresponding primary image data is removed, and the simultaneous equation is established.

(12) In the imaging device according to (10), the secondary image data generation unit generates the secondary image data items by solving the following matrix equation $$B = T^{-1} * A$$

as the crosstalk removal processing in a case where a matrix of m rows×1 column in which pixel values A1, A2, ..., and Am of the primary image data items are elements is A, a matrix of n rows×1 column in which pixel values B1, B2, ..., and Bn of the secondary image data items are elements is B, a matrix of m rows×n columns in which products e1*C1=e1*C11:e1*C12: ... :e1*C1n, e2*C2=e2*C21:e2*C22: ... :e2*C2n, ..., and em*Cm=em*Cm1:em*Cm2: ... :em*Cmn of crosstalk ratios C1=C11:C12: ... :C1n, C2=C21:C22: ... : C2n, ..., and Cm=Cm1:Cm2: ... :Cmn of the light receiving sensors corresponding to the primary image data items and coefficients e1, e2, ..., and em corresponding to exposure values at the time of exposing the primary image data items are elements is T, and an inverse matrix of the T is $T^{-1}$, and generates the secondary image data items by removing the primary image data of which a pixel value is saturated and establishing the matrix equation in a case where a pixel as a processing target includes the primary image data of which the pixel value is saturated.

According to the present aspect, processing for solving a predetermined matrix equation is performed as the crosstalk removal processing. In a case where the matrix equation is established and the pixel as the processing target includes the primary image data of which the pixel value is saturated, the corresponding primary image data is removed, and the matrix equation is established.

(13) The imaging device according to (12) further comprises an inverse matrix information storage unit that stores information of the inverse matrix $T^{-1}$. The secondary image data generation unit solves the matrix equation by using the information of the inverse matrix $T^{-1}$ stored in the inverse matrix information storage unit.

According to the present aspect, the matrix equation is solved by using the information of the inverse matrix $T^{-1}$ stored in the inverse matrix information storage unit.

(14) The imaging device according to (13), the inverse matrix information storage unit stores the information of the inverse matrix $T^{-1}$ for each pixel.

According to the present aspect, the information of the inverse matrix $T^{-1}$ is stored for each pixel. Accordingly, it is possible to more accurately remove the influence of the crosstalk.

(15) In the imaging device according to any one of (10) to (14), in a case where a pixel as a processing target includes k number of primary image data items of which pixel values are saturated in which k is an integer satisfying k>0 and a relationship of (m-k)<n is satisfied, the secondary image data generation unit calculates a pixel value of the secondary image data in the pixel as the processing target based on a pixel value of the primary image data which is not saturated and a crosstalk ratio of the primary image data which is not saturated without performing the crosstalk removal processing.

According to the present aspect, in a case where the number (m-k) of primary image data items in the pixel as the processing target is smaller than the number (n) of optical systems included in the imaging lens ((m-k)<n) as the result of the removal of the primary image data of which the pixel value is saturated, the crosstalk removal processing in the corresponding pixel is stopped. As alternative measures, the pixel value of the secondary image data is calculated based on the pixel value of the primary image data which is not saturated and the crosstalk ratio of the primary image data which is not saturated. Accordingly, it is possible to more appropriately remove the influence of the crosstalk.

(16) In the imaging device according to (15), in a case where m=k, the secondary image data generation unit determines the pixel value of the secondary image data in the pixel as the processing target, as a saturation value.

According to the present aspect, in a case where all the light receiving sensors are saturated in the pixel as the processing target (m=k), the pixel value of the secondary image data in the corresponding pixel is the saturation value.

(17) In the imaging device according to any one of (1) to (16), the plurality of optical systems included in the imaging lens has different focal lengths from each other.

According to the present aspect, the optical systems included in the imaging lens are optical systems of which focal lengths are different. Accordingly, for example, images of which focal lengths are different, such as a telephoto image and a wide-angle image, can be captured.

(18) The imaging device according to any one of (1) to (16), the plurality of optical systems included in the imaging lens has different focusing distances.

According to the present aspect, the optical system included in the imaging lens are optical systems of which focusing distances are different. Accordingly, images of which focusing distances are different, such as an image focused on a subject present in a short range and an image focused on a subject present in a long range, can be captured.

(19) The imaging device according to any one of (1) to (16), the plurality of optical systems included in the imaging lens has different transmission wavelength characteristics.

According to the present aspect, the optical systems included in the imaging lens are optical systems of which transmission wavelength characteristics are different. The "transmission wavelength characteristics" are characteristics that transmit light rays having a specific wavelength range, and the optical systems of which transmission wavelength characteristics are different" are optical systems of which characteristics that transmit light rays having a specific wavelength range are different. For example, in a case where the imaging lens includes two optical systems, one optical system is an optical system that transmits light rays having an infrared light range, and the other optical system is an optical system that transmits light rays having a visible light range.

(20) The imaging device according to any one of (1) to (19), the plurality of optical systems included in the imaging lens is concentrically disposed with each other.

According to the present aspect, the imaging lens is constituted such that a plurality of optical systems is concentrically disposed.

(21) There is provided an image data generation method using an imaging device that includes an imaging lens including n number of optical systems of which imaging characteristics are different in which n is an integer satisfying n>1 and an image sensor including m number of light receiving sensors of which combinations of crosstalk ratio and light sensitivity are different in each pixel in which m is an integer satisfying m>n. The method comprises a step of exposing the image sensor, a step of generating m number of primary image data items by obtaining image signals output from the light receiving sensors of each pixel of the image sensor, a step of detecting a pixel of which a pixel value is saturated from the primary image data items, and a step of generating n number of secondary image data items corresponding to the optical systems by performing crosstalk removal processing on the m number of primary image data items for each pixel, the secondary image data items being generated by removing the primary image data of which the pixel value is saturated and performing the crosstalk removal processing on remaining primary image data items in a case where a processing target includes the primary image data of which the pixel value is saturated in the step of generating the secondary image data items.

According to the present aspect, the m number of light receiving sensors of which the combinations of crosstalk ratio and light sensitivity are different are included in each pixel of the image sensor. The number (m) of light receiving sensors is larger than the number (n) of optical systems included in the imaging lens. In a case where the light receiving sensor is saturated through the exposing, the secondary image data items are generated by performing the crosstalk removal processing based on the outputs of the remaining light receiving sensors except for the saturated light receiving sensor. Accordingly, it is possible to accurately remove the influence of the crosstalk, and thus, a high-quality image is obtained. The light receiving sensors of which light sensitivity is different are included in each pixel, and thus, it is possible to expand a dynamic range.

(22) In the image data generation method using an imaging device according to (21), in the step of generating the secondary image data items, the secondary image data items are generated by solving the following simultaneous equations $$A1 = s1*C11*B1 + s1*C12*B2 + \ldots + s1*C1n*Bn$$
$$A2 = s2*C21*B1 + s2*C22*B2 + \ldots + s2*C2n*Bn$$
$$\ldots$$
$$Am = sm*Cm1*B1 + sm*Cm2*B2 + \ldots + sm*Cmn*Bn$$

as the crosstalk removal processing in a case where pixel values of the primary image data items are A1, A2, . . . , and Am, pixel values of the secondary image data items are B1, B2, . . . , and Bn, crosstalk ratios of the light receiving sensors are C1=C11:C12: . . . :C1n, C2=C21:C22: . . . : C2n, . . . , and Cm=Cm1:Cm2: . . . :Cmn, and coefficients corresponding to light sensitivity of the light receiving sensors are s1, s2, . . . , and sm, and the secondary image data items are generated by removing the primary image data of which a pixel value is saturated and establishing the simultaneous equations in a case where a pixel as a processing target includes the primary image data of which the pixel value is saturated.

According to the present aspect, processing for solving predetermined simultaneous equations is performed as the crosstalk removal processing. In a case where the simultaneous equations are established and the pixel as the processing target includes the primary image data of which the pixel value is saturated, the corresponding primary image data is removed, and the simultaneous equation is established.

(23) In the image data generation method using an imaging device according to (21), in the step of generating the secondary image data items, the secondary image data items are generated by solving the following matrix equation $$B=T^{-1}*A$$

as the crosstalk removal processing in a case where a matrix of m rows×1 column in which pixel values A1, A2, . . . , and Am of the primary image data items are elements is A, a matrix of n rows×1 column in which pixel values B1, B2, . . . , and Bn of the secondary image data items are elements is B, a matrix of m rows×n columns in which products s1*C1=s1*C11:s1*C12: . . . :s1*C1n, s2*C2=s2*C21:s2*C22: . . . :s2*C2n, . . . , and sm*Cm=sm*Cm1:sm*Cm2: . . . :sm*Cmn of crosstalk ratios C1=C11:C12: . . . :C1n, C2=C21:C22: . . . : C2n, . . . , and Cm=Cm1:Cm2: . . . :Cmn of the light receiving sensors and coefficients s1, s2, . . . , and sm corresponding to light sensitivity of the light receiving sensors are elements is T, and an inverse matrix of the T is $T^{-1}$, and the secondary image data items are generated by removing the primary image data of which the pixel value is saturated and establishing the matrix equation in a case where a pixel as a processing target includes the primary image data of which the pixel value is saturated.

According to the present aspect, processing for solving a predetermined matrix equation is performed as the crosstalk removal processing. In a case where the matrix equation is established and the pixel as the processing target includes the primary image data of which the pixel value is saturated, the corresponding primary image data is removed, and the matrix equation is established.

(24) The image data generation method using an imaging device according to any one of (21) to (23), in a case where a pixel as a processing target includes k number of primary image data items of which pixel values are saturated in which k is an integer satisfying k>0 and a relationship of (m−k)<n is satisfied, the crosstalk removal processing is not performed, and a pixel value of the secondary image data in the pixel as the processing target is calculated based on a pixel value of the primary image data which is not saturated and a crosstalk ratio of the primary image data which is not saturated in the step of generating the secondary image data items.

According to the present aspect, in a case where the number (m−k) of primary image data items in the pixel as the processing target is smaller than the number (n) of optical systems included in the imaging lens ((m−k)<n) as the result of the removal of the primary image data of which the pixel value is saturated, the crosstalk removal processing in the corresponding pixel is stopped. In this case, as alternative measures, the pixel value of the secondary image data is calculated based on the pixel value of the primary image data which is not saturated and the crosstalk ratio of the primary image data which is not saturated. Accordingly, it is possible to more appropriately remove the influence of the crosstalk.

(25) In the image data generation method using an imaging device according to (24), in a case where m=k, the pixel value of the secondary image data in the pixel as the processing target is determined as a saturation value in the step of generating the secondary image data items.

According to the present aspect, in a case where all the light receiving sensors are saturated in the pixel as the processing target (m=k), the pixel value of the secondary image data in the corresponding pixel is the saturation value.

(26) There is provided an image data generation method using an imaging device that includes an imaging lens including n number of optical systems of which imaging characteristics are different in which n is an integer satisfying n>1 and an image sensor including n number of light receiving sensors or more of which crosstalk ratios are different in each pixel. The method comprises a step of exposing the image sensor with different exposure values multiple times, a step of generating m number of primary image data items in which m>n by obtaining image signals output from the light receiving sensors of each pixel of the image sensor whenever the exposing is performed, a step of detecting a pixel of which a pixel value is saturated from the primary image data items, and a step of generating n number of secondary image data items corresponding to the optical systems by performing crosstalk removal processing on the m number of primary image data items for each pixel, the secondary image data items being generated by removing the primary image data of which a pixel value is saturated and performing the crosstalk removal processing on remaining primary image data items in a case where a processing target includes the primary image data of which the pixel value is saturated in the step of generating the secondary image data items.

According to the present aspect, the exposing is performed multiple times according to one imaging instruction. The exposing is performed with a different exposure value whenever the exposing is performed. The exposing is performed multiple times with different exposure values, and thus, it is possible to obtain a plurality of image data items of which brightness is different. The image data items are image data items of which the combinations of crosstalk ratio and light sensitivity are different. It is assumed that the image data items are the primary image data items. The image data items (secondary image data items) corresponding to the optical systems are generated from the m number of primary image data items. That is, the secondary image data items are generated by performing the crosstalk removal processing on the m number of primary image data items. The crosstalk removal processing is performed for each pixel. In a case where there is the primary image data of which the pixel value is saturated at the time of processing, the corresponding primary image data is removed, and the crosstalk removal processing is performed. Accordingly, it is possible to accurately remove the influence of the crosstalk, and thus, a high-quality image is obtained. The light receiving sensors of which light sensitivity is different are included in each pixel, and thus, it is possible to expand a dynamic range.

(27) The image data generation method using an imaging device according to (26), in the step of generating the secondary image data items, the secondary image data items are generated by solving the following simultaneous equations $$A1 = e1*C11*B1 + e1*C12*B2 + \ldots + e1*C1n*Bn$$
$$A2 = e28C21*B1 + e2*C22*B2 + \ldots + e2*C2n*Bn$$
$$\ldots$$
$$Am = em*Cm1*B1 + em*Cm2*B2 + \ldots + em*Cmn*Bn$$

as the crosstalk removal processing in a case where pixel values of the primary image data items are A1, A2, . . . , and Am, pixel values of the secondary image data items are B1, B2, . . . , and Bn, crosstalk ratios of the light receiving sensors corresponding to the primary image data items are C1=C11:C12: . . . :C1n, C2=C21:C22: . . . :C2n, . . . , and Cm=Cm1:Cm2: . . . :Cmn, and coefficients corresponding to exposure values at the time of exposing the primary image data items are e1, e2, . . . , and em, and the secondary image data items are generated by removing the primary image data of which the pixel value is saturated and establishing the simultaneous equation in a case where a pixel as a processing target includes the primary image data of which the pixel value is saturated.

According to the present aspect, processing for solving predetermined simultaneous equations is performed as the crosstalk removal processing. In a case where the simultaneous equations are established and the pixel as the processing target includes the primary image data of which the pixel value is saturated, the corresponding primary image data is removed, and the simultaneous equation is established.

(28) In the image data generation method using an imaging device according to (26), in the step of generating the secondary image data items, the secondary image data items are generated by solving the following matrix equation $$B = T^{-1}*A$$

as the crosstalk removal processing in a case where a matrix of m rows×1 column in which pixel values A1, A2, . . . , and Am of the primary image data items are elements is A, a matrix of n rows×1 column in which pixel values B1, B2, . . . , and Bn of the secondary image data items are elements is B, a matrix of m rows×n columns in which products e1*C1=e1*C11:e1*C12: . . . :e1*C1n, e2*C2=e2*C21:e2*C22: . . . :e2*C22: . . . :e2*C2n, . . . , and em*Cm=em*Cm1:em*Cm2: . . . :em*Cmn of the crosstalk ratios C1=C11:C12: . . . :C1n, C2=C21:C22: . . . :C2n, . . . , and Cm=Cm1:Cm2: . . . :Cmn of the light receiving sensors corresponding to the primary image data items and coefficients e1, e2, . . . , and em corresponding to the exposure values at the time of exposing the primary image data items are elements is T, and an inverse matrix of the T is $T^{-1}$, and the secondary image data items are generated by removing the primary image data of which the pixel value is saturated and establishing the matrix equation in a case where the pixel as the processing target includes the primary image data of which the pixel value is saturated.

According to the present aspect, processing for solving a predetermined matrix equation is performed as the crosstalk removal processing. In a case where the matrix equation is established and the pixel as the processing target includes the primary image data of which the pixel value is saturated, the corresponding primary image data is removed, and the matrix equation is established.

(29) In the image data generation method using an imaging device according to any one of (26) to (28), in a case where a pixel as a processing target includes k number of primary image data items of which pixel values are saturated in which k is an integer satisfying k>0 and a relationship of (m−k)<n is satisfied, the crosstalk removal processing is not performed, and a pixel value of the secondary image data in the pixel as the processing target is calculated based on a pixel value of the primary image data which is not saturated and a crosstalk ratio of the primary image data which is not saturated in the step of generating the secondary image data items.

According to the present aspect, in a case where the number (m−k) of primary image data items in the pixel as the processing target is smaller than the number (n) of optical systems included in the imaging lens ((m−k)<n) as the result of the removal of the primary image data of which the pixel value is saturated, the crosstalk removal processing in the corresponding pixel is stopped. As alternative measures, the pixel value of the secondary image data is calculated based on the pixel value of the primary image data which is not saturated and the crosstalk ratio of the primary image data which is not saturated. Accordingly, it is possible to more appropriately remove the influence of the crosstalk.

(30) In the image data generation method using an imaging device according to (29), in a case where m=k, the pixel value of the secondary image data in the pixel as the processing target is determined as a saturation value in the step of generating the secondary image data items.

According to the present aspect, in a case where all the light receiving sensors are saturated in the pixel as the processing target (m=k), the pixel value of the secondary image data in the corresponding pixel is the saturation value.

According to the present invention, a high-quality image is obtained by reducing the influence of the crosstalk.

BRIEF DESCRIPTION OF THE DRAWINGS

FIG. 25 is a matrix equation representing the relationship between the primary image data items and the secondary image data items.

DESCRIPTION OF THE PREFERRED EMBODIMENTS

Hereinafter, preferred embodiment of the present invention will be described in detail with reference to the accompanying drawings.

First Embodiment

<<Device Configuration of Imaging Device>>

Figure 1:
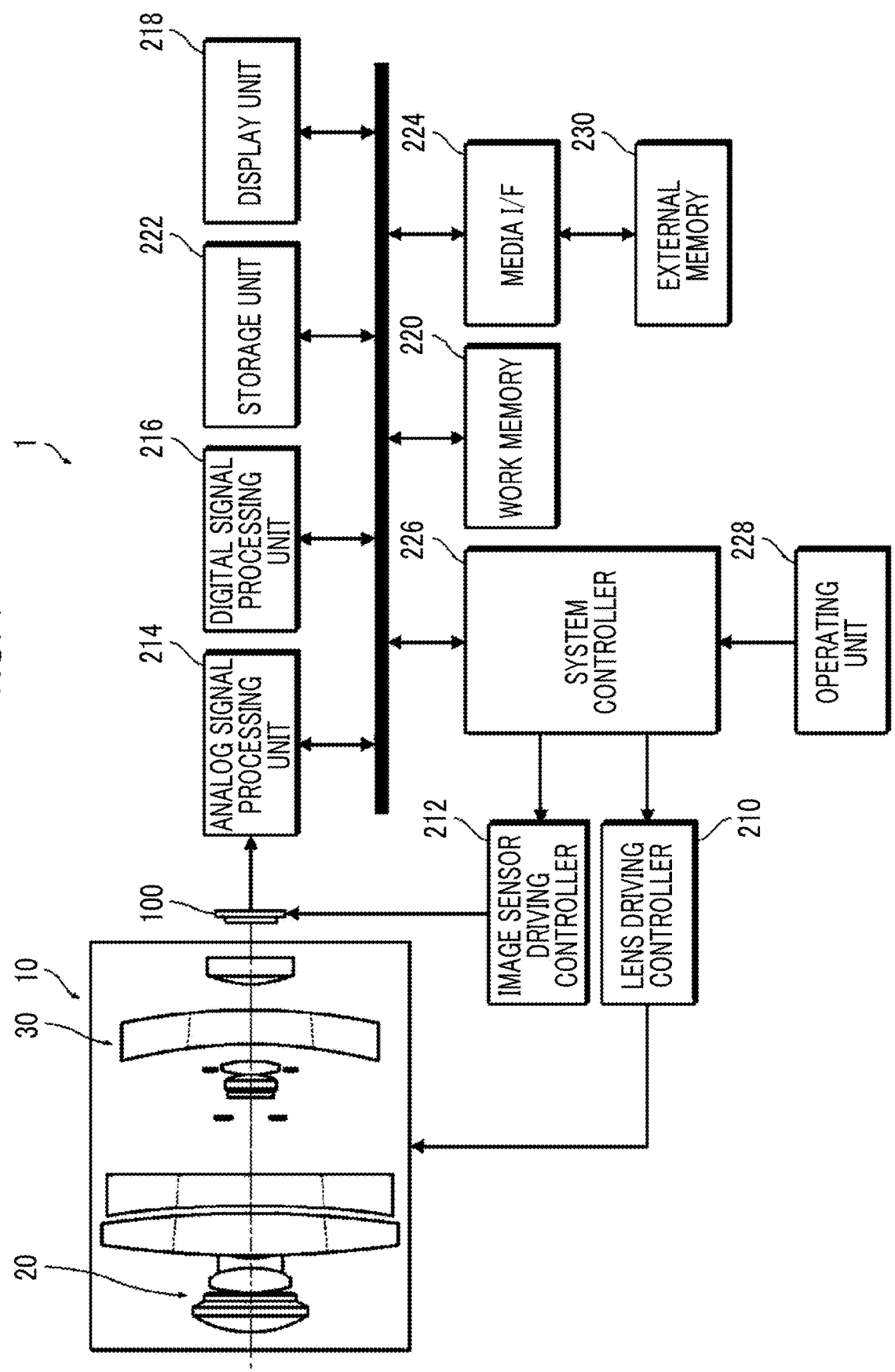
FIG. 1 is a block diagram showing a system configuration of an imaging device.

FIG. 1 is a block diagram showing a system configuration of an imaging device.

An imaging device 1 mainly includes an imaging lens 10, an image sensor 100, a lens driving controller 210, an image sensor driving controller 212, an analog signal processing unit 214, a digital signal processing unit 216, a display unit 218, a work memory 220, a storage unit 222, a media interface 224, a system controller 226, and an operating unit 228.

<Imaging Lens>

Figure 2:
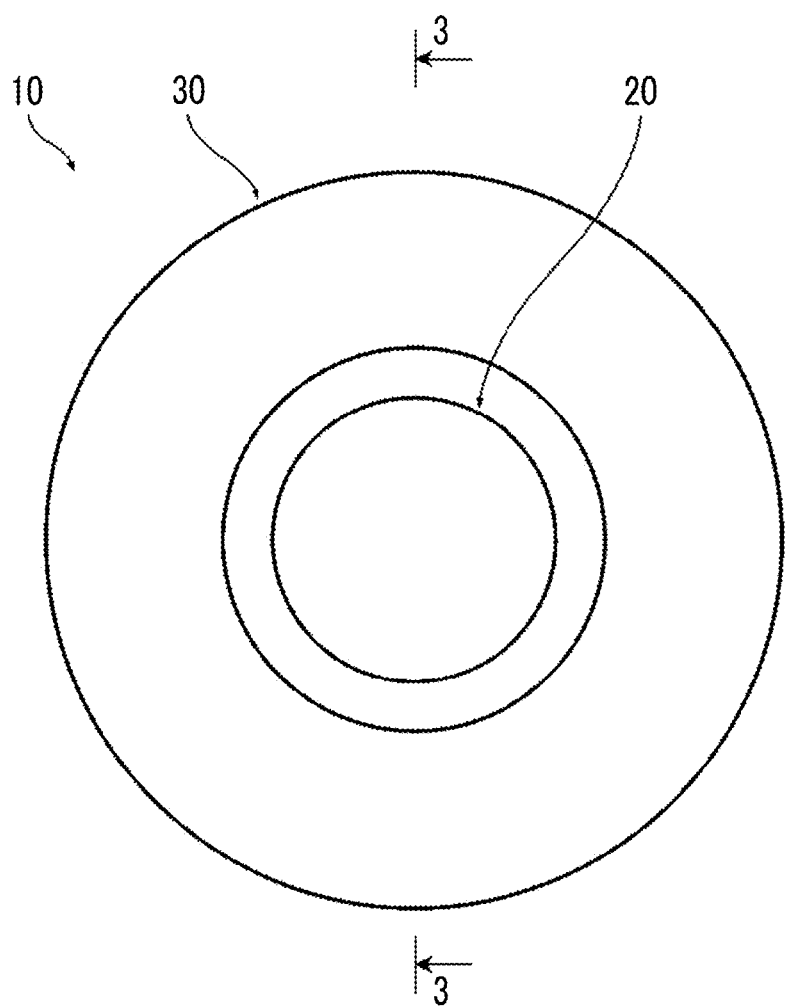
FIG. 2 is a front view showing a schematic configuration of an imaging lens.
Figure 3:
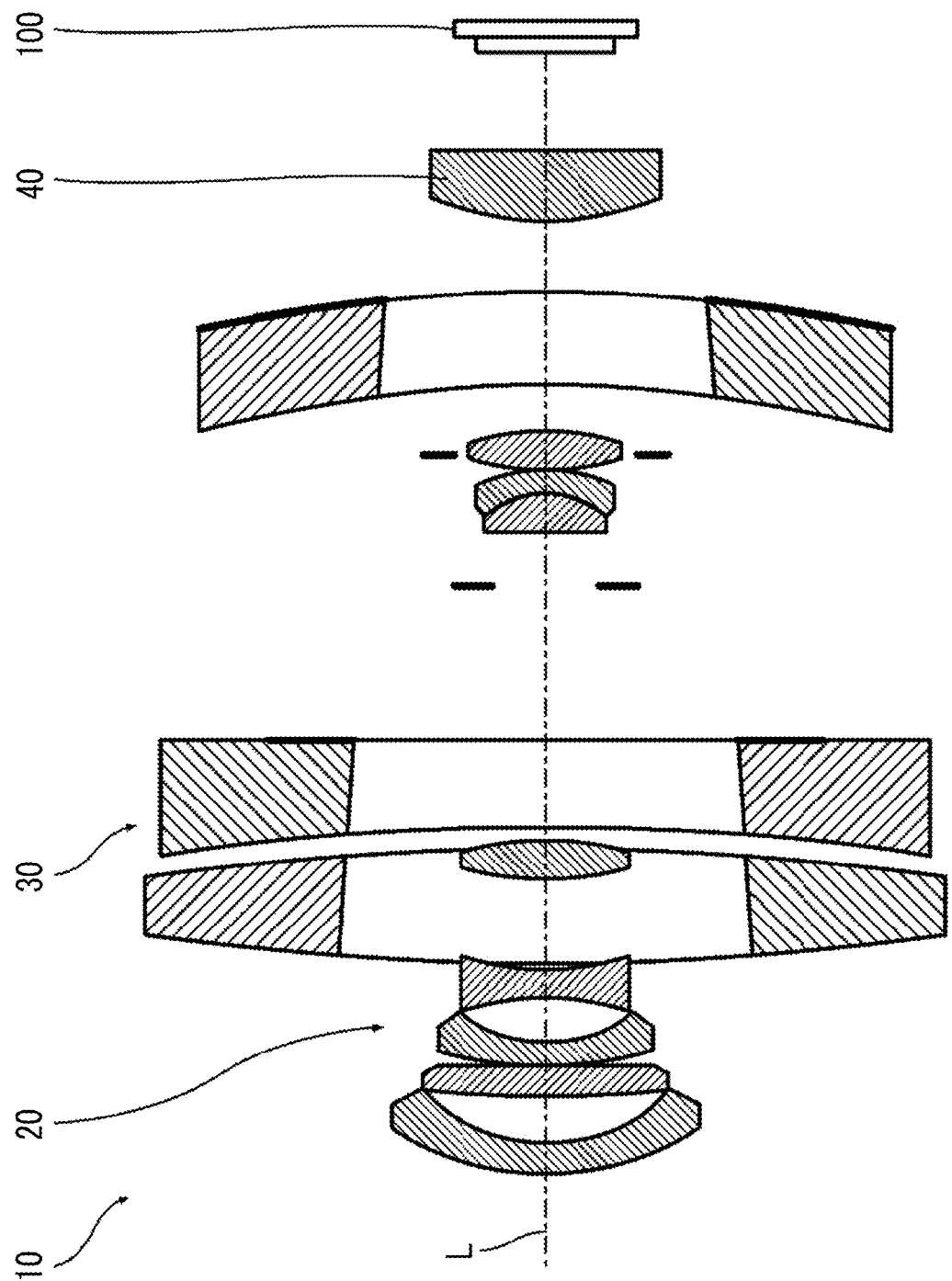
FIG. 3 is a cross-sectional view taken along line 3-3 of FIG. 2.

FIG. 2 is a front view showing a schematic configuration of the imaging lens. FIG. 3 is a cross-sectional view taken along 3-3 of FIG. 2.

The imaging lens 10 includes two optical systems 20 and 30. The two optical systems 20 and 30 are concentrically disposed. Accordingly, the optical systems 20 and 30 have the same optical axis L. Hereinafter, the central optical system 20 is referred to as a first optical system, and the outer optical system 30 is referred to as a second optical system. These optical systems are distinguished from each other.

The first optical system 20 and the second optical system 30 are optical systems of which focal lengths are different. The first optical system 20 is a wide-angle optical system, and the second optical system 30 is a telephoto optical system. Here, the wide-angle optical system is an optical system of which a focal length is shorter than that of a standard optical system (an optical system having an angle of view of about 50°). The telephoto optical system is an optical system of which a focal length is longer than that of the standard optical system.

[First Optical System]

Figure 4:
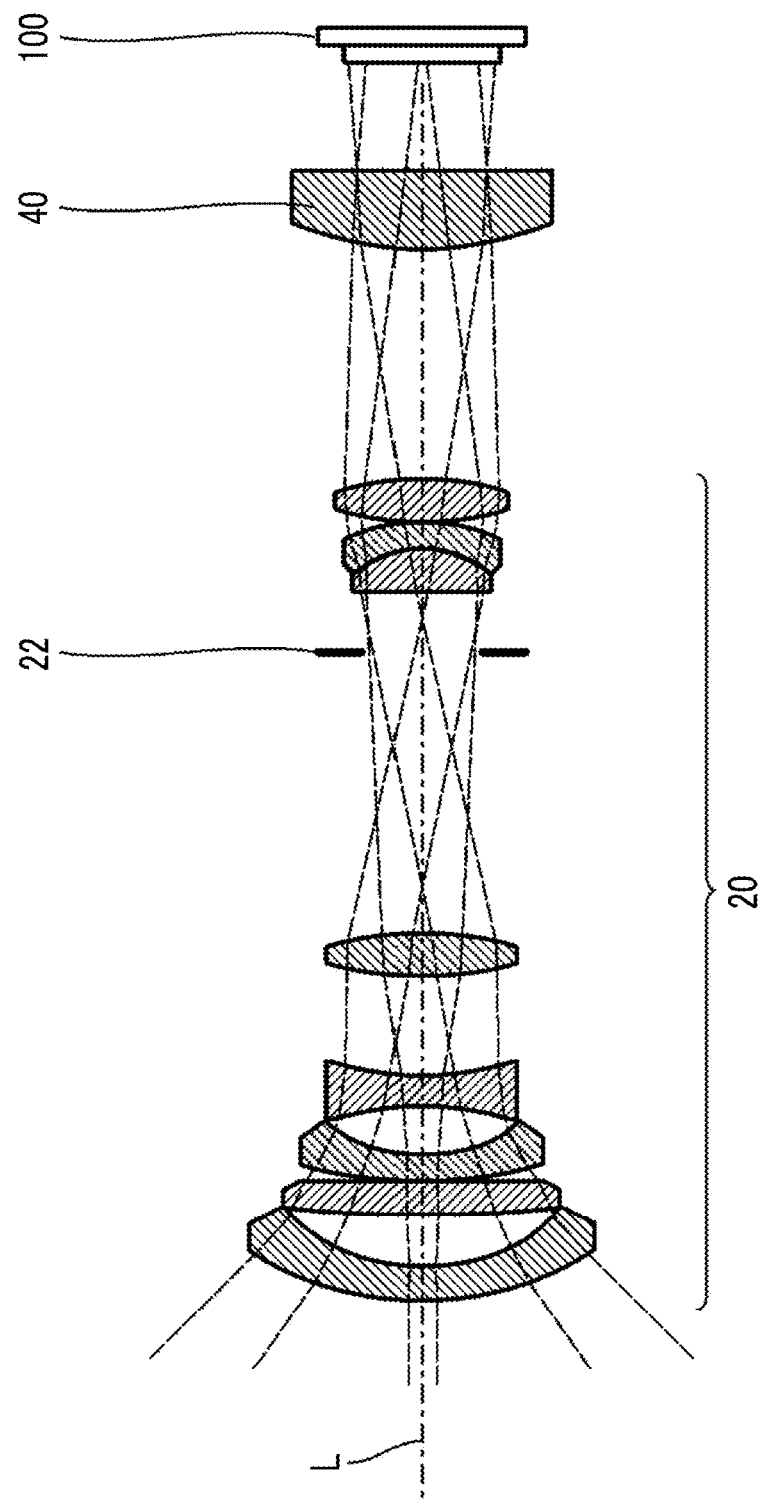
FIG. 4 is a cross-sectional view showing a schematic configuration of a first optical system.

FIG. 4 is a cross-sectional view showing a schematic configuration of the first optical system. In this drawing, dashed lines depict light ray traces of light rays passing through the first optical system 20.

As shown in FIG. 4, the first optical system 20 is composed of three groups, and is composed of eight lenses. The first optical system 20 has a stop 22 between a second lens group and a third lens group. The stop 22 has an annular light shielding portion. The stop 22 adjusts a light amount of light rays passing through the first optical system 20 by expanding or contracting an inner diameter of the annular light shielding portion.

Figure 5:
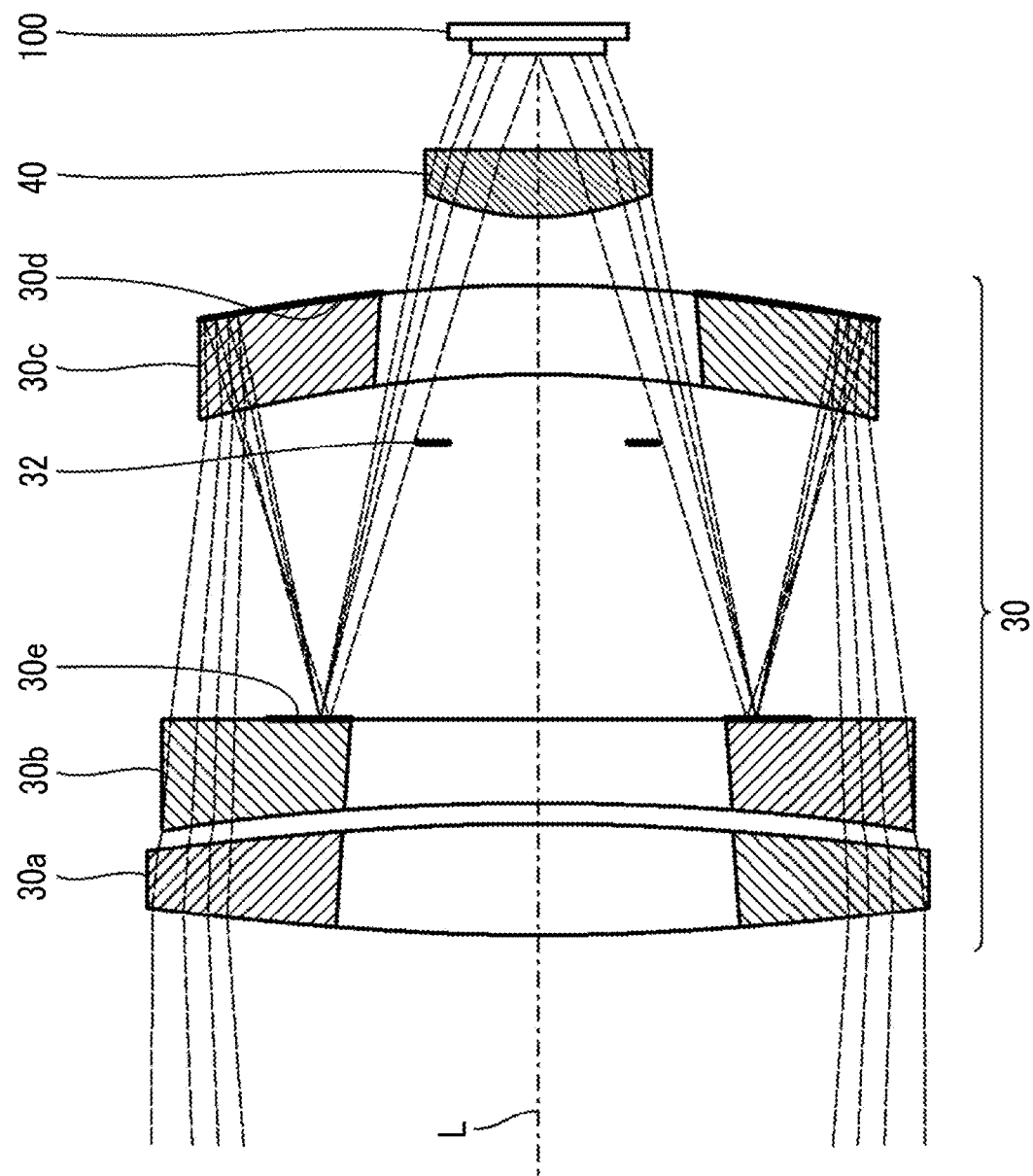
FIG. 5 is a cross-sectional view showing a schematic configuration of a second optical system.

[Second Optical System] FIG. 5 is a cross-sectional view showing a schematic configuration of the second optical system. In this drawing, dashed lines depict light ray traces of light rays passing through the second optical system 30.

As shown in FIG. 5, the second optical system 30 is a so-called reflective optical system. The second optical system 30 includes a first lens 30a, a second lens 30b, a third lens 30c, a main mirror 30d, and a secondary mirror 30e. Since the second optical system 30 is disposed outside the first optical system 20, the components thereof have annular shapes.

The first lens 30a, the second lens 30b, and the third lens 30c are disposed along the optical axis L in order of the first lens 30a, the second lens 30b, and the third lens 30c from an object.

The main mirror 30d is provided on a surface of an image surface of the third lens 30c. A reflective film is formed on the surface of the image surface of the third lens 30c, and thus, the main mirror 30d is integrally provided on the third lens 30c. The main mirror 30d is provided on the entire surface of the image of the image surface of the third lens 30c.

The secondary mirror 30e is provided on a surface of an image surface of the second lens 30b. A reflective film is formed on the surface of the image surface of the second lens 30b, and thus, the secondary mirror 30e is integrally provided on the second lens 30b. The secondary mirror 30e is provided an inner peripheral portion of the surface of the image surface of the second lens 30b.

Light rays incident on the second optical system 30 pass through the first lens 30a, the second lens 30b, and the third lens 30c, and are incident on the main mirror 30d. The light rays incident on the main mirror 30d are reflected from the main mirror 30d, pass through the third lens 30c again, and are incident on the secondary mirror 30e. The light rays incident on the secondary mirror 30e are reflected from the secondary mirror 30e, and are emitted.

The second optical system 30 has a stop 32 in a latter stage of the secondary mirror 30e. The stop 32 has an annular light shielding portion. The stop 32 adjusts a light amount of light rays passing through the second optical system 30 by expanding or contracting an outer diameter of the annular light shielding portion.

[Common Lens] The imaging lens 10 as a common lens 40 common to the first optical system 20 and the second optical system 30. The light rays passed through the first optical system 20 and the second optical system 30 are incident on the image sensor 100 through the common lens 40. The common lens 40 has a function of adjusting an incidence angle of the light rays incident on the image sensor 100 through the first optical system 20 and the second optical system 30.

[Focus Adjustment mechanism] Foci of the first optical system 20 and the second optical system 30 are independently adjusted. The entire optical system is moved forward and backward along the optical axis L, and thus, the focus of the first optical system 20 is adjusted. Similarly, the entire optical system is moved forward and backward along the optical axis L, and thus, the focus of the second optical system 30 is adjusted. Although not shown, the imaging lens 10 includes a mechanism (focus adjustment mechanism) for moving the first optical system 20 forward and backward along the optical axis L and a mechanism (focus adjustment mechanism) for moving the second optical system 30 forward and backward along the optical axis L.

<Image Sensor>

Figure 6:
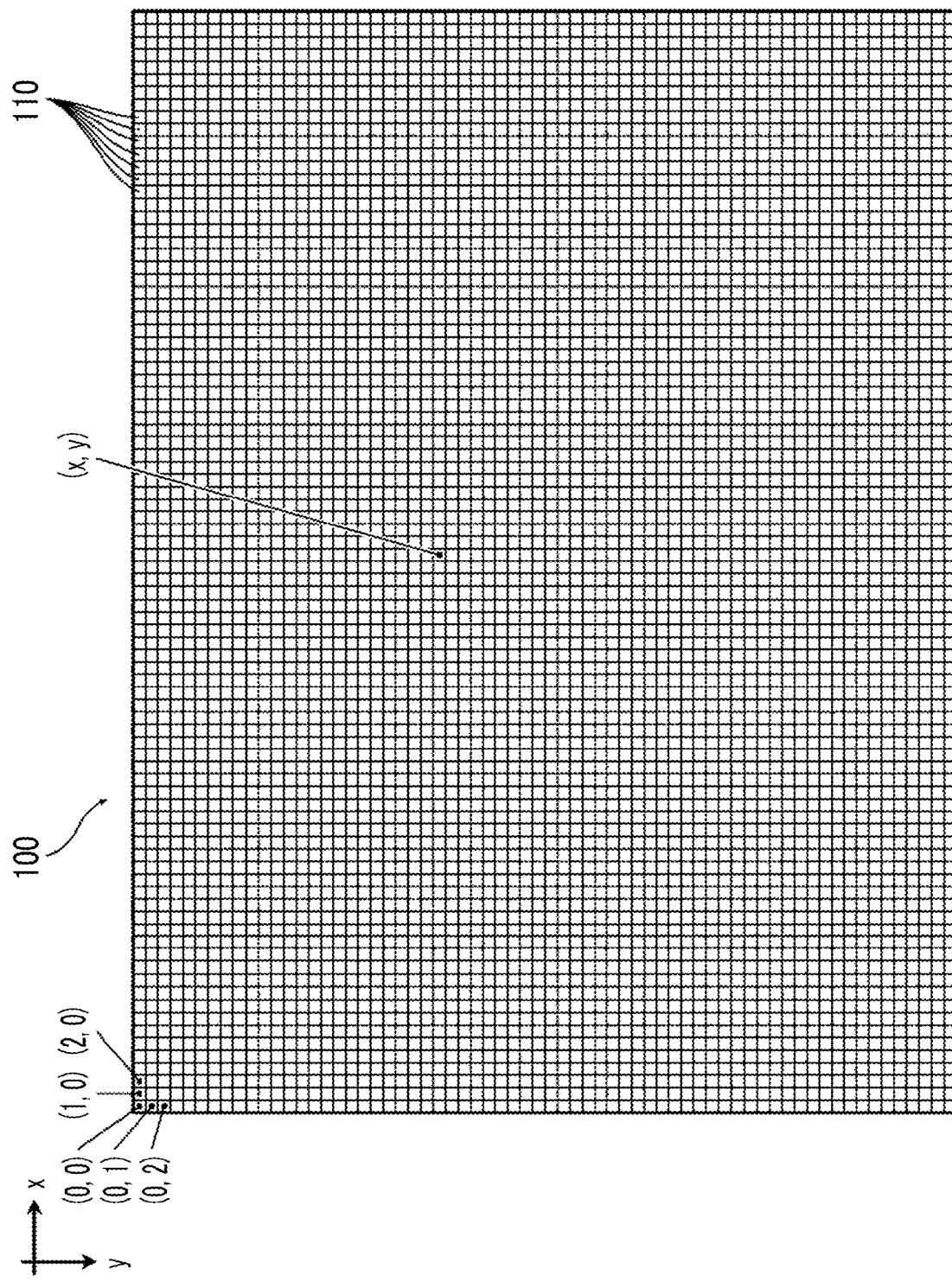
FIG. 6 is a front view of a light reception surface of an image sensor.

FIG. 6 is a front view of a light reception surface of the image sensor.

The image sensor 100 includes a plurality of pixels 110 on the light reception surface. The plurality of pixels 110 is arrayed on the light reception surface in a two-dimensional matrix shape.

Figure 7:
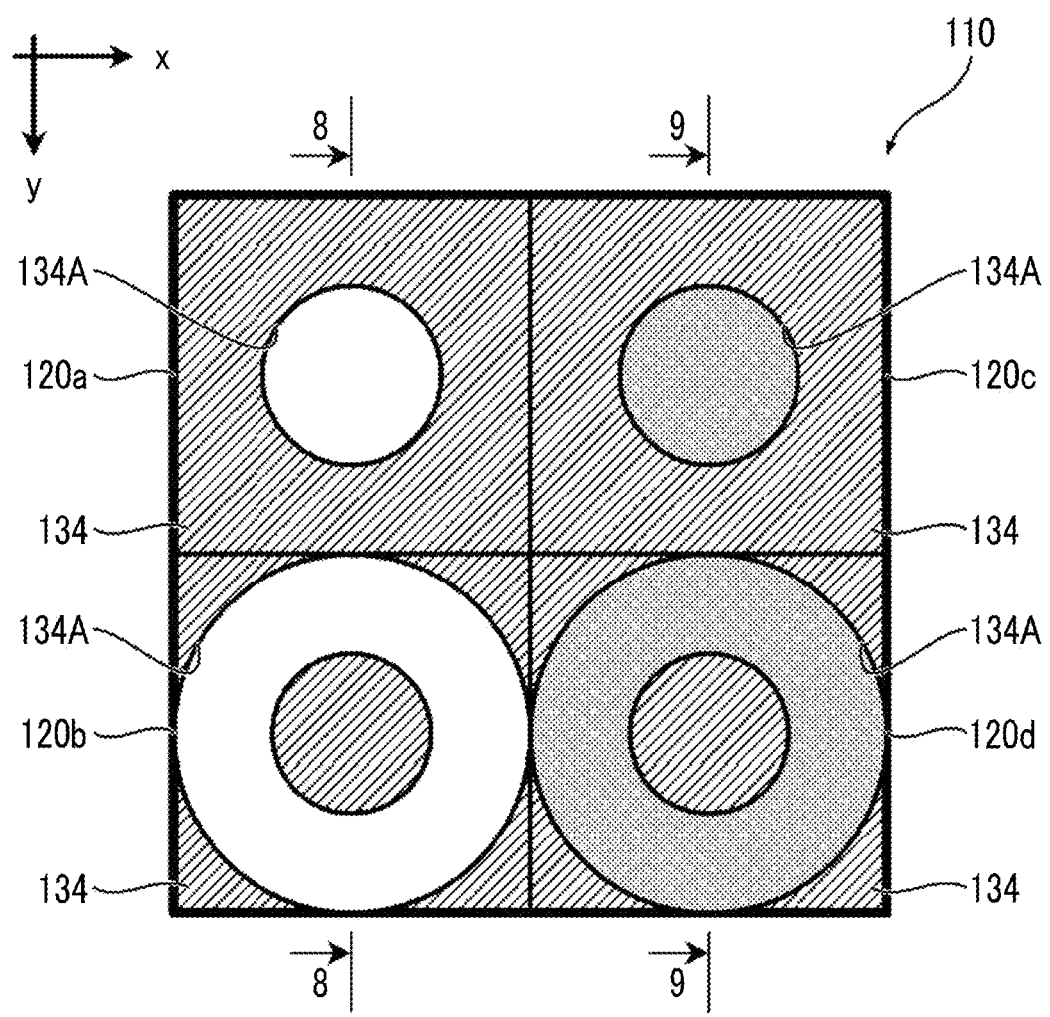
FIG. 7 is an enlarged front view showing one pixel of the image sensor.

FIG. 7 is an enlarged front view of one pixel of the image sensor. In this drawing, diagonal lines depict mask regions using a light shielding mask. The light shielding mask will be described below.

The image sensor 100 includes a plurality of light receiving sensors in one pixel 110.

The plurality of light receiving sensors is disposed in a two-dimensional matrix shape. The image sensor 100 of the present embodiment includes four light receiving sensors 120a, 120b, 120c, and 120d in one pixel 110, as shown in FIG. 7. The four light receiving sensors 120a, 120b, 120c, and 120d are disposed in a two-dimensional matrix shape in an array of 2 rows×2 columns (2×2). Hereinafter, the light receiving sensor assigned the reference 120a is referred to as a first light receiving sensor, the light receiving sensor assigned the reference 120b is referred to as a second light receiving sensor, the light receiving sensor assigned the reference 120c is referred to as a third light receiving sensor, and the light receiving sensor assigned the reference 120d is referred to as a fourth light receiving sensor. If necessary, the four light receiving sensors 120a, 120b, 120c, and 120d are distinguished from one another.

The four light receiving sensors 120a, 120b, 120c, and 120d are light receiving sensors of which combinations of crosstalk ratio and light sensitivity are different from each other.

Here, the "light receiving sensors of which the crosstalk ratios are different" is the light receiving sensors of which the ratios between the light rays received from the optical systems are different. The "light receiving sensors of which the light sensitivity is different" are light receiving sensors of which the output signals (voltages) generated for every unit incident light amount are different.

In the image sensor 100 of the present embodiment, the first light receiving sensor 120a and the third light receiving sensor 120c are light receiving sensors that mainly receive light rays from the first optical system 20, and the second light receiving sensor 120b and the fourth light receiving sensor 120d are light receiving sensors that mainly receive the light rays from the second optical system 30. The first light receiving sensor 120a and the second light receiving sensor 120b are light receiving sensors having high-sensitivity, and the third light receiving sensor 120c and the fourth light receiving sensor 120d are light receiving sensors having low-sensitivity.

The "the light receiving sensors that mainly receive the light rays from the first optical system 20" mean light receiving sensors that receive the light rays from the first optical system 20 with high sensitivity. In this case, most light rays received by the light receiving sensors are light rays from the first optical system 20. Similarly, the "light receiving sensors that mainly receive the light rays from the second optical system 30" mean light receiving sensors that receive the light rays from the second optical system 30 with high sensitivity. In this case, most light rays received by the light receiving sensors are light rays from the second optical system 30.

The crosstalk ratio of the m-th light receiving sensor is represented by Cm=Cm1 Cm2. [Cm1:Cm2] means [ratio between light rays received from first optical system 20: ratio between light rays received from second optical system 30]. Accordingly, the crosstalk ratio of the first light receiving sensor 120a is C1=C11:C12. The crosstalk ratio of the second light receiving sensor 120b is C2=C21:C22. The crosstalk ratio of the third light receiving sensor 120c is C3=C31:C32. The crosstalk ratio of the fourth light receiving sensor 120d is C4=C41:C42.

Since the first light receiving sensor 120a mainly receives the light rays from the first optical system 20, the relationship of the crosstalk ratio C1 is C11>C12. Similarly, since the third light receiving sensor 120c mainly receives the light rays from the first optical system 20, the relationship of the crosstalk ratio C3 is C31>C32. Meanwhile, since the second light receiving sensor 120b mainly receives the light rays from the second optical system 30, the relationship of the crosstalk ratio C2 is C21<C22. Similarly, since the fourth light receiving sensor 120d mainly receives the light rays from the second optical system 30, the relationship of the crosstalk ratio C4 is C41<C42.

The "high-sensitivity" and the "low-sensitivity" mentioned herein are high-sensitivity and low-sensitivity in a relative sense. That is, the "high-sensitivity" means that the first light receiving sensor 120a and the second light receiving sensor 120b have high-sensitivity to the third light receiving sensor 120c and the fourth light receiving sensor 120d. Alternatively, the "low-sensitivity" means that the third light receiving sensor 120c and the fourth light receiving sensor 120d have low-sensitivity to the first light receiving sensor 120a and the second light receiving sensor 120b.

From the above, the first light receiving sensor 120a mainly receives the light rays from the first optical system 20, and is a light receiving sensor having high-sensitivity. The second light receiving sensor 120b mainly receives the light rays from the second optical system 30, and is a light receiving sensor having high-sensitivity. The third light receiving sensor 120c mainly receives the light rays from the first optical system 20, and is a light receiving sensor having low-sensitivity. The fourth light receiving sensor 120d mainly receives the light rays from the second optical system 30, and is a light receiving sensor having low-sensitivity.

The crosstalk ratio of each light receiving sensor is adjusted by the shape of the light shielding mask included in each light receiving sensor. The light sensitivity of each light receiving sensor is adjusted by transmittance of a filter included in each light receiving sensor.

Figure 8:
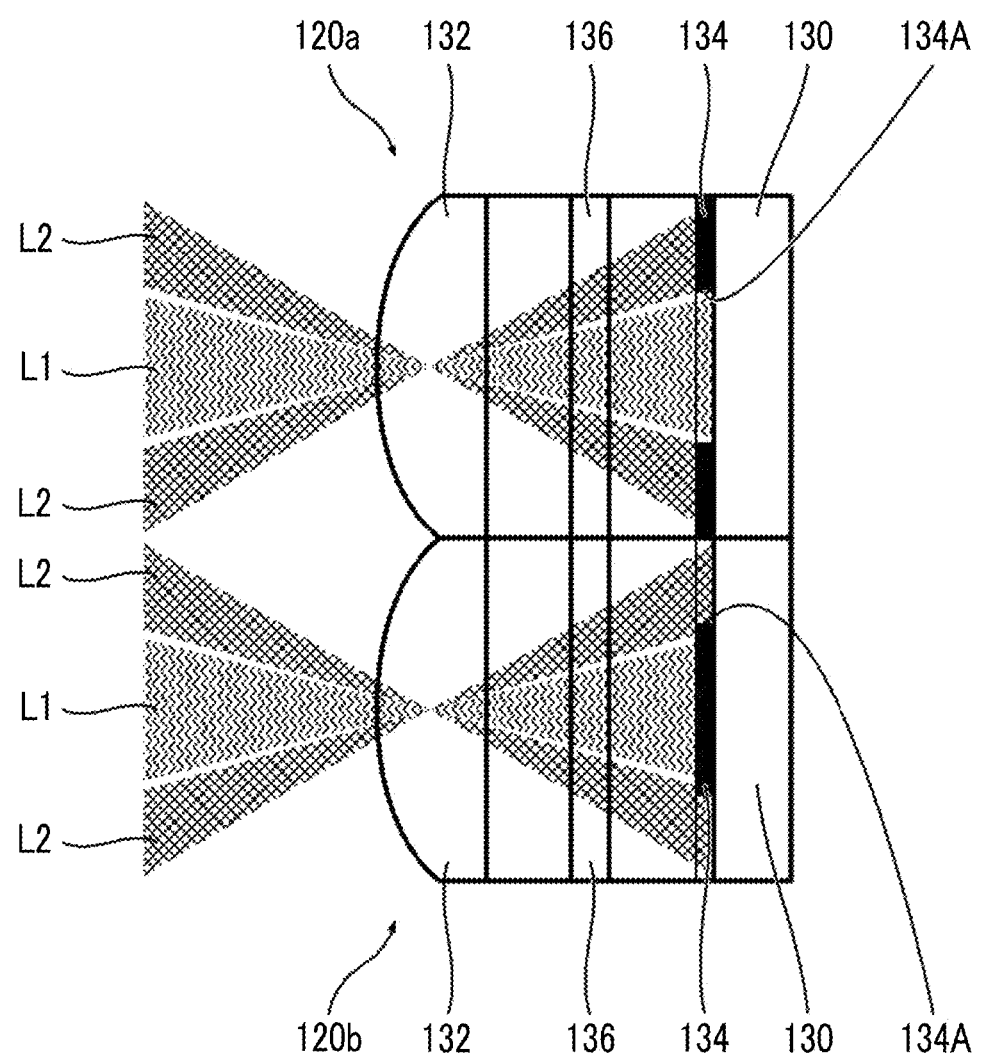
FIG. 8 is a cross-sectional view showing a schematic configuration of a light receiving sensor.
Figure 9:
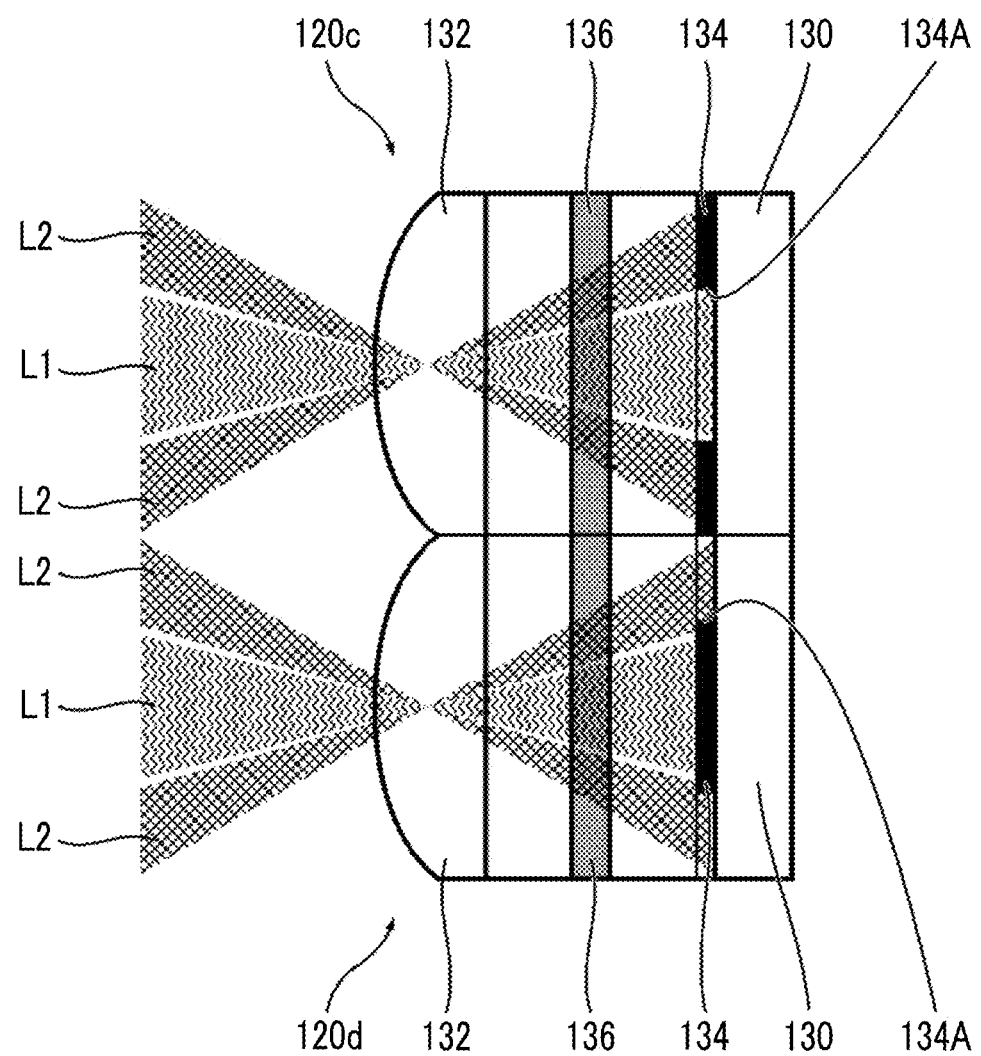
FIG. 9 is a cross-sectional view showing a schematic configuration of a light receiving sensor.

FIGS. 8 and 9 are cross-sectional views showing a schematic configuration of the light receiving sensor. FIG. 8 is a cross section taken along line 8-8 of FIG. 7, and FIG. 9 is a cross section taken along line 9-9 of FIG. 7. In FIGS. 8 and 9, a region L1 depicted by wavy lines conceptually represents light rays incident from the first optical system 20, and a region L2 depicted by an oblique lattice conceptually represents light rays incident from the second optical system 30.

Basic configurations of the light receiving sensors 120a to 120d are the same. Each of the light receiving sensors 120a to 120d includes a photoelectric conversion element 130, a microlens 132, a light shielding mask 134, and a filter 136.

The photoelectric conversion element 130 receives light, and accumulates electric charges in proportion to intensity of the received light. The photoelectric conversion element 130 is, for example, a photodiode.

The microlens 132 forms images of emission pupils of the first optical system 20 and the second optical system 30 on the photoelectric conversion element 130.

The light shielding mask 134 is disposed between the microlens 132 and the photoelectric conversion element 130. The light shielding mask 134 blocks a part of the light rays passed through the microlens 132. The crosstalk ratios of the light receiving sensors are adjusted by adjusting the shape of the light shielding mask 134.

As stated above, the first light receiving sensor 120a and the third light receiving sensor 120c mainly receive the light rays from the first optical system 20. In this case, the light shielding mask 134 has a shape including a circular opening portion 134A in the center.

Meanwhile, the second light receiving sensor 120b and the fourth light receiving sensor 120d mainly receive the light rays from the second optical system 30. In this case, the light shielding mask 134 has a shape including an annular opening portion 134A.

As stated above, the crosstalk ratios of the light receiving sensors 120a to 120d can be adjusted by adjusting the shape of the light shielding mask 134. Accordingly, in a case where the shape of the light shielding mask 134 is strictly defined, it is possible to completely separate and receive the light rays from two optical systems in theory. However, it is difficult to completely separate and receive the light rays from two optical systems due to the influence of a manufacturing error of the light shielding mask or aberration of the microlens. As a result, the crosstalk is caused.

The filter 136 is disposed between the microlens 132 and the light shielding mask 134. The light rays passed through the microlens 132 are transmitted through the filter 136, and are incident on the photoelectric conversion element 130.

The filter 136 is used to adjust the light sensitivity of the light receiving sensor. For example, the filter 136 is a neutral density (ND) filter, and the light sensitivity of the light receiving sensor is adjusted by adjusting the density (transmittance).

As stated above, the first light receiving sensor 120a and the second light receiving sensor 120b are light receiving sensors having high-sensitivity. In this case, a filter having high transmittance (filter having low density) is used as the filter 136.

Meanwhile, the third light receiving sensor 120c and the fourth light receiving sensor 120d are light receiving sensors having low-sensitivity. In this case, a filter (filter having high density) having low transmittance is used as the filter 136.

Figure 10:
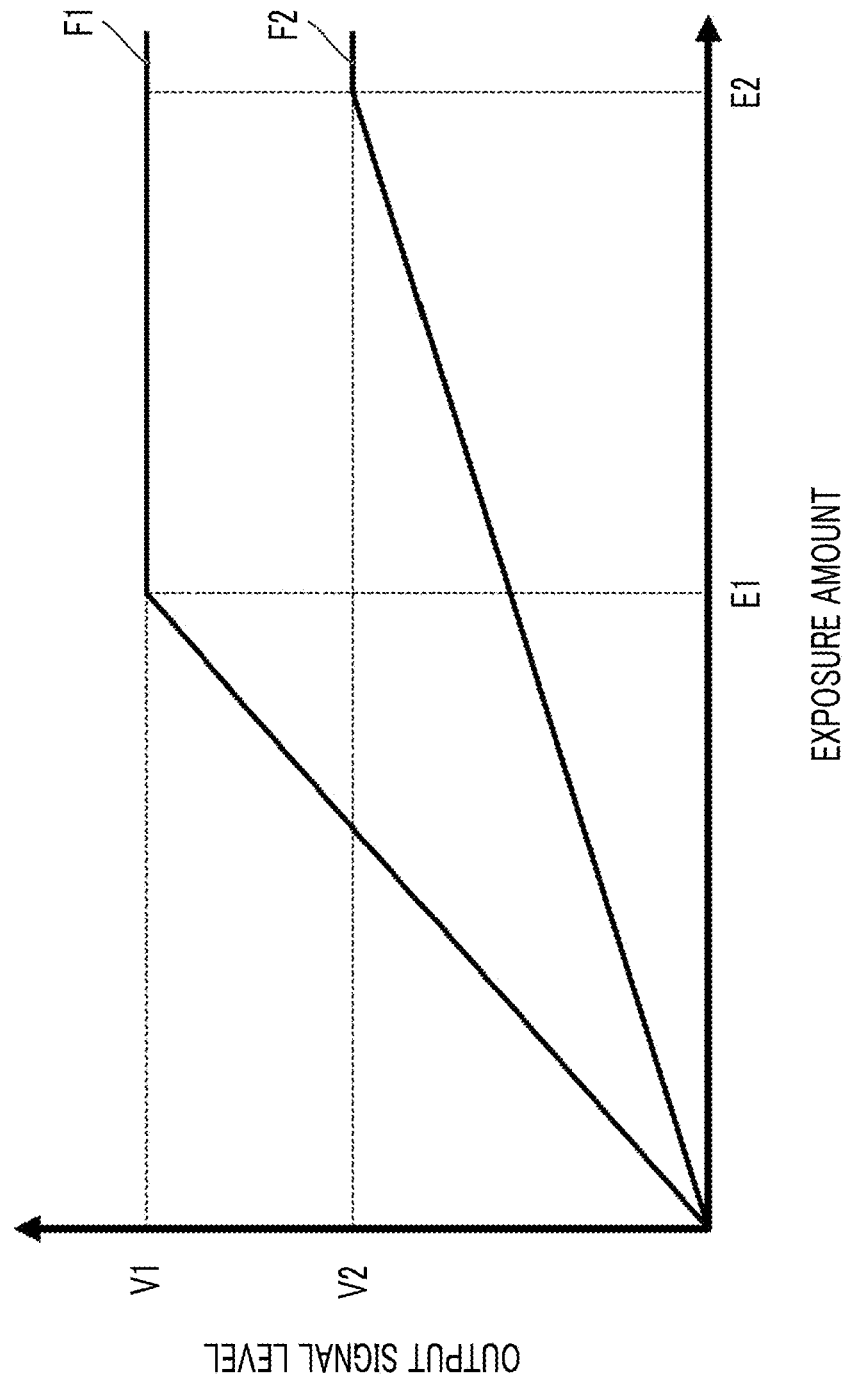
FIG. 10 is a graph showing the relationship the incident light amounts and the output signals in the first light receiving sensor and the second light receiving sensor.

FIG. 10 is a graph showing the relationship between the incident light amounts and the output signals in the first light receiving sensor and the second light receiving sensor. In this drawing, a horizontal axis depicts an exposure amount, and a vertical axis depicts an output signal level (output voltage). In this drawing, a graph assigned a reference F1 is a graph of the first light receiving sensor 120a which is the light receiving sensor having high-sensitivity, and a graph assigned a reference F2 is a graph of the third light receiving sensor 120c which is the light receiving sensor having low-sensitivity.

As shown in FIG. 10, the first light receiving sensor 120a which is the light receiving sensor having the high-sensitivity is saturated in a case where the exposure amount exceeds an exposure amount E1, and the output signal level becomes a predetermined value V1. The third light receiving sensor 120c which is the light receiving sensor having low-sensitivity is saturated in a case where the exposure amount exceeds an exposure amount E2, and the output signal level becomes a predetermined value V2. The exposure amount E1 at which the first light receiving sensor 120a is saturated is smaller than the exposure amount E2 at which the second light receiving sensor 120b is saturated (E1<E2). That is, the first light receiving sensor 120a has high-sensitivity, but has saturation properties in a case where the incident light amount is large. Meanwhile, the third light receiving sensor 120c has low-sensitivity, but has properties that the output of which linearity is maintained is possible even though the incident light amount is large.

The same is true for the relationship between the second light receiving sensor 120b which is the light receiving sensor having high-sensitivity and the fourth light receiving sensor 120d which is the light receiving sensor having low-sensitivity.

The image sensor 100 reads out electric charge amounts accumulated in the photoelectric conversion elements 130 of the light receiving sensors 120a to 120d of each pixel 110, and outputs signals (voltages) corresponding to the electric charge amounts, as image signals. Image data items corresponding to the optical systems can be obtained by processing the image signals. The processing will be described in detail below.

<Lens Driving Controller>

The lens driving controller 210 controls the driving of the imaging lens 10 based on a command from the system controller 226. That is, the driving of the focus adjustment mechanism of the first optical system 20 is controlled in order to adjust the focus of the first optical system 20, and the driving of the focus adjustment mechanism of the second optical system 30 is controlled in order to adjust the focus of the second optical system 30. The driving of the stop 22 of the first optical system 20 is controlled in order to adjust the light amount of the first optical system 20, and the driving of the stop 32 of the second optical system 30 is controlled in order to adjust the light amount of the second optical system 30.

<Image Sensor Driving Controller>

The image sensor driving controller 212 controls the driving of the image sensor 100 based on a command from the system controller 226. That is, the image sensor driving controller controls the reading of the image signals from the image sensor 100.

<Analog Signal Processing Unit>

The analog signal processing unit 214 takes analog image signals output from the image sensor 100, and performs predetermined analog signal processing. The analog signal processing unit 214 converts the image signals obtained through the predetermined analog signal processing into digital signals, and outputs the digital signals.

<Digital Signal Processing Unit>

The digital signal processing unit 216 takes the image signals converted into the digital signals, performs predetermined signal processing, and generates the image data items corresponding to the optical systems. The processing will be described in detail below.

<Display Unit>

For example, the display unit 218 is a liquid crystal monitor, and displays a captured image or an image being captured (so-called live view image). The display unit 218 functions as a graphical user interface (GUI) if necessary.

<Work Memory>

For example, the work memory 220 is a random access memory (RAM), and functions as a work memory.

<Storage Unit>

For example, the storage unit 222 is a non-volatile memory such as electrically erasable programmable read-only memory (EEPROM). The storage unit 222 stores data required in the controlling or data required in the signal processing.

<Media Interface>

The media interface 224 reads or writes data from and to an external memory 230 such as a memory card based on a command from the system controller 226.

<System Controller>

The system controller 226 controls an operation of the entire imaging device. For example, the system controller 226 is a microcomputer including a central processing unit (CPU), a read only memory (ROM), and a RAM, and controls the entire imaging device 1 by executing a predetermined control program. Various data items and a program required in the controlling are stored in the ROM.

<Operating Unit>

The operating unit 228 includes various operating buttons such as a power button and a shutter button, and a driving circuit. Instructional information of the operating unit 228 is input to the system controller 226. The system controller 226 controls the units based on the instructional information from the operating unit 228.

The imaging device 1 has the above-described configuration.

<<Generation Process of Image Data Items Corresponding to Optical Systems>>

<Outline of Process>

As stated above, the image sensor 100 includes the four light receiving sensors 120a to 120d in each pixel 110. Accordingly, the image signals of the light receiving sensors corresponding to each pixel are obtained, and thus, it is possible to generate four image data items by performing imaging once. However, crosstalk is caused in the four image data items. Thus, in the imaging device 1 of the present embodiment, the image data items corresponding to the optical systems are generated by performing crosstalk removal processing on the four image data items obtained through the imaging. Hereinafter, the processing will be described.

Hereinafter, the four image data items generated by obtaining the image signals of the corresponding light receiving sensors from each pixel of the image sensor 100 are referred to as primary image data items, and the image data items generated by performing the crosstalk removal processing on the four primary image data items are referred to as secondary image data items. The primary and secondary image data items are distinguished from each other if necessary.

<Generation of Primary Image Data>

Figure 11:
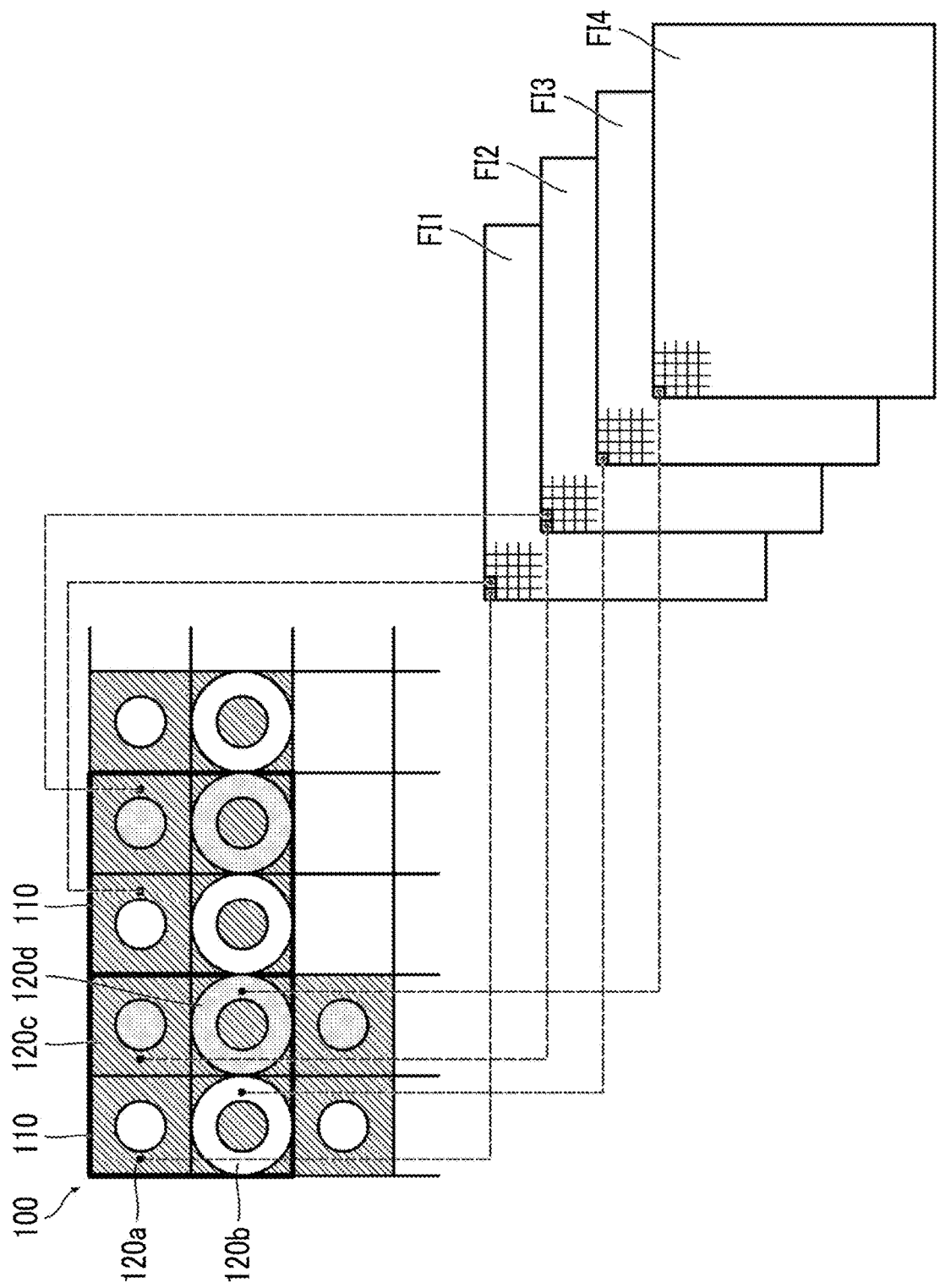
FIG. 11 is a conceptual diagram for describing the generation of four primary image data items from outputs of the image sensor.

FIG. 11 is a conceptual diagram for describing the generation of the four primary image data items from the outputs of the image sensor.

The primary image data items are generated by obtaining the image signals of the corresponding light receiving sensors 120a to 120d from each pixel 110 of the image sensor 100.

For example, the image signal of the first light receiving sensor 120a is obtained from each pixel 110 of the image sensor 100, and thus, the primary image data corresponding to the first light receiving sensor 120a is generated. Similarly, the primary image data corresponding to the second light receiving sensor 120b is generated by obtaining the image signal of the second light receiving sensor 120b from each pixel 110, and the primary image data corresponding to the third light receiving sensor 120c is generated by obtaining the image signal of the third light receiving sensor 120c from each pixel 110. Similarly, the image signal of the fourth light receiving sensor 120d is obtained from each pixel 110, and thus, the primary image data corresponding to the fourth light receiving sensor 120d is generated.

It is assumed that the primary image data generated from the image signal obtained from the first light receiving sensor 120a of each pixel 110 is referred to as first primary image data FI1, the primary image data generated from the image signal obtained from the second light receiving sensor 120b of each pixel 110 is referred to as second primary image data FI2, the primary image data generated from the image signal obtained from the third light receiving sensor 120c of each pixel 110 is referred to as third primary image data FI3, and the primary image data generated from the image signal obtained from the fourth light receiving sensor 120d of each pixel 110 is referred to as fourth primary image data FI4.

Figure 12:
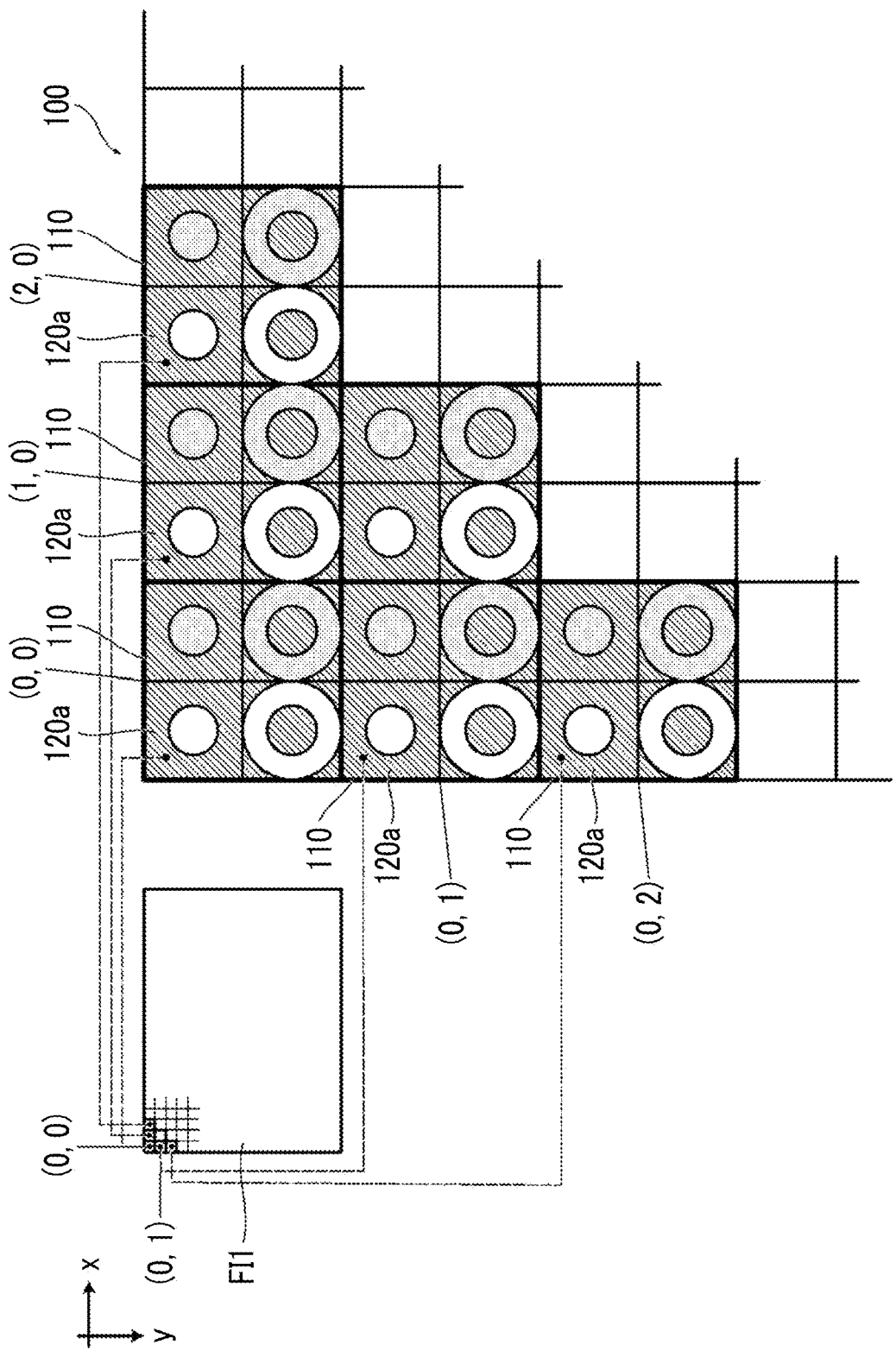
FIG. 12 is a conceptual diagram for describing the generation of the individual primary image data items from the outputs of the image sensor.

FIG. 12 is a conceptual diagram for describing the generation of the individual primary image data items from the outputs of the image sensor. Particularly, this drawing shows a case where the first primary image data FI1 is generated from the output of the image sensor.

As shown in FIG. 12, the first primary image data FI1 is generated by obtaining the image signal of the first light receiving sensor 120a from each pixel 110 of the image sensor 100. For example, a value (pixel value) in a pixel position (0, 0) of the first primary image data FI1 is generated by obtaining the image signal from the first light receiving sensor 120a in the pixel position (0, 0) of the image sensor 100. Similarly, a value (pixel value) in a pixel position (0, 1) of the first primary image data FI1 is generated by obtaining the image signal from the first light receiving sensor 120a in the pixel position (0, 1) of the image sensor 100. As stated above, a value (pixel value) of each pixel of the first primary image data FI1 is generated by obtaining the image signal from the first light receiving sensor 120a in the corresponding pixel 110 of the image sensor 100.

The pixel position (x, y) is obtained by expressing the position of the pixel as xy coordinates. The xy coordinates are set as follows. That is, in the image sensor 100, as shown in FIG. 6, an upper left corner of a screen is a coordinate origin, a horizontal direction is an x coordinate, and a vertical direction is a y coordinate. In this case, a position of a specific pixel is expressed as (x, y). The same is true for the image data. An upper left corner of a screen is a coordinate origin, a horizontal direction is an x coordinate, and a vertical direction is a y coordinate.

The same is true of other primary image data items. The other primary image data items are generated by obtaining the image signals of the corresponding light receiving sensors from the respective pixels 110 of the image sensor 100.

<Generation of Secondary Image Data>

The secondary image data items are generated by performing the crosstalk removal processing on the primary image data items for each pixel. Hereinafter, the crosstalk removal processing will be described.

[Basic Concept of Crosstalk Removal Processing]

Initially, a basic concept of the crosstalk removal processing will be described.

Here, in order to facilitate the understanding of the invention, an example (m=n) in which the number (n) of optical systems included in the imaging lens is two and the number (m) of light receiving sensors included in each pixel of the image sensor is two will be described.

It is assumed that one optical system is a first optical system and the other optical system is a telephoto second optical system as the two optical systems included in the imaging lens. It is assumed that the first optical system is a wide-angle optical system and the second optical system is a telephoto optical system.

It is assumed that one light receiving sensor is a first light receiving sensor and the other light receiving sensor is a second light receiving sensor as the two light receiving sensors included in each pixel. It is assumed that all the first light receiving sensors included in the pixels have the same crosstalk ratios. Similarly, it is assumed that all the second light receiving sensors included in each pixel have the same crosstalk ratios.

It is assumed that the crosstalk ratio of the first light receiving sensor is C1=C11:C12 and the crosstalk ratio of the second light receiving sensor is C2=C21:C22. Here, the "crosstalk ratio C1 of the first light receiving sensor is C11:C12" means that a ratio between the light rays received from the first optical system and the second optical system is expressed by first optical system:second optical system=C11:C12. That is, this means that the light rays are received from the first optical system at a ratio of C11 and are received from the second optical system at a ratio of C12. Similarly, the "crosstalk ratio C2 of the light receiving sensor is C21:C22" means that a ratio between the light rays received from the first optical system and the second optical system is expressed by first optical system:second optical system=C21:C22.

Since the image sensor includes two light receiving sensors (the first light receiving sensor and the second light receiving sensor) in one pixel (m=2), two primary image data items are generated by performing imaging once. It is assumed that the primary image data based on the first light receiving sensor is referred to as the first primary image data FI1 and the primary image data based on the second light receiving sensor is referred to as the second primary image data FI2. Crosstalk is caused in the first primary image data FI1 at a ratio of crosstalk ratio C1=C11:C12, and crosstalk is caused in the second primary image data FI2 at a ratio of crosstalk ratio C2=C21:C22.

Figure 13:
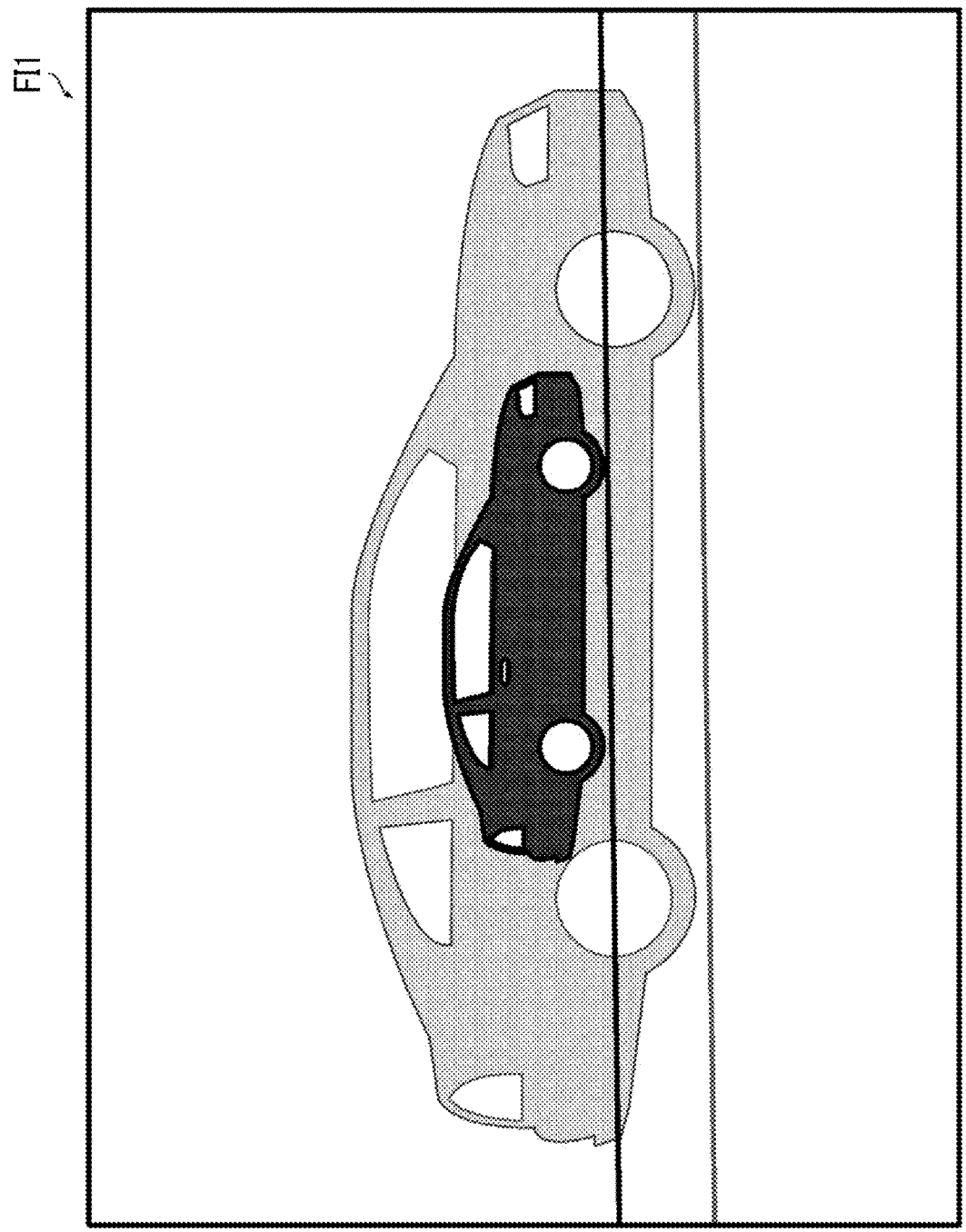
FIG. 13 is a diagram showing an example of an image represented by first primary image data FI1.
Figure 14:
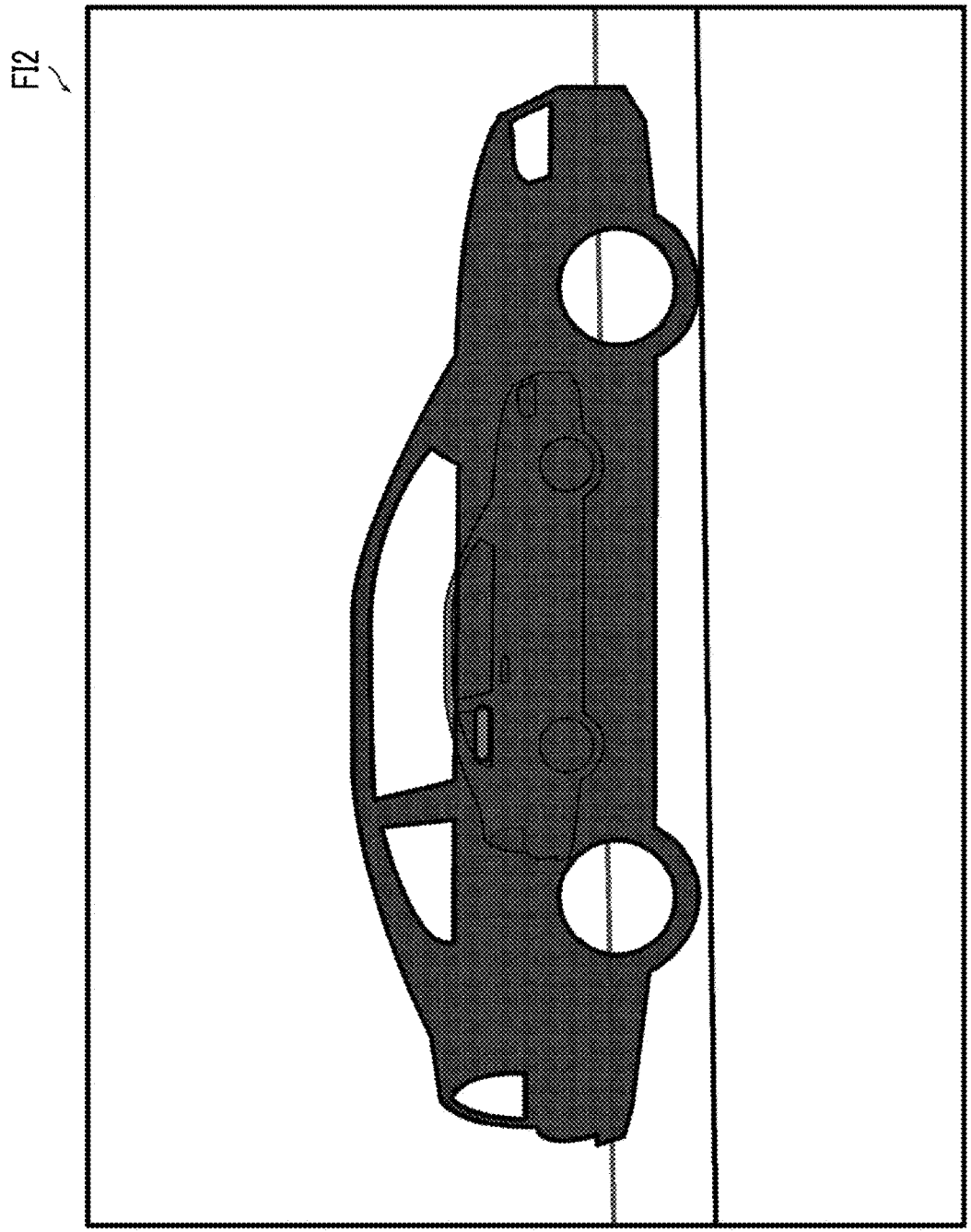
FIG. 14 is a diagram showing an example of an image represented by second primary image data FI2.

FIG. 13 is a diagram showing an example of an image represented by the first primary image data FI1. FIG. 14 is a diagram showing an example of an image represented by the second primary image data FI2. In the examples shown in FIGS. 13 and 14, a case where the crosstalk ratio C1 of the first light receiving sensor is expressed by C11>C12 and the crosstalk ratio C2 of the second light receiving sensor is expressed by C21<C22 is shown. That is, a case where the first light receiving sensor is configured to receive a larger amount of light rays from the first optical system and the second light receiving sensor is configured to receive a larger amount of light rays from the second optical system is shown. In this case, the image (image represented by the first primary image data FI1) obtained from the first light receiving sensor is an image obtained by unnoticeably superimposing an image (telephoto image) of the second optical system on the original image (wide-angle image) of the first optical system as shown in FIG. 13. Meanwhile, the image (image represented by the second primary image data FI2) obtained from the second light receiving sensor is an image obtained by unnoticeably superimposing the image (wide-angle image) of the first optical system on the original image (telephoto image) of the second optical system, as shown in FIG. 14.

As for the secondary image data, since the number of optical systems included in the imaging lens is two (m=2), two secondary image data items are generated. It is assumed that the secondary image data corresponding to the first optical system is first secondary image data SI1 and the secondary image data corresponding to the second optical system is second secondary image data SI2.

Figure 15:
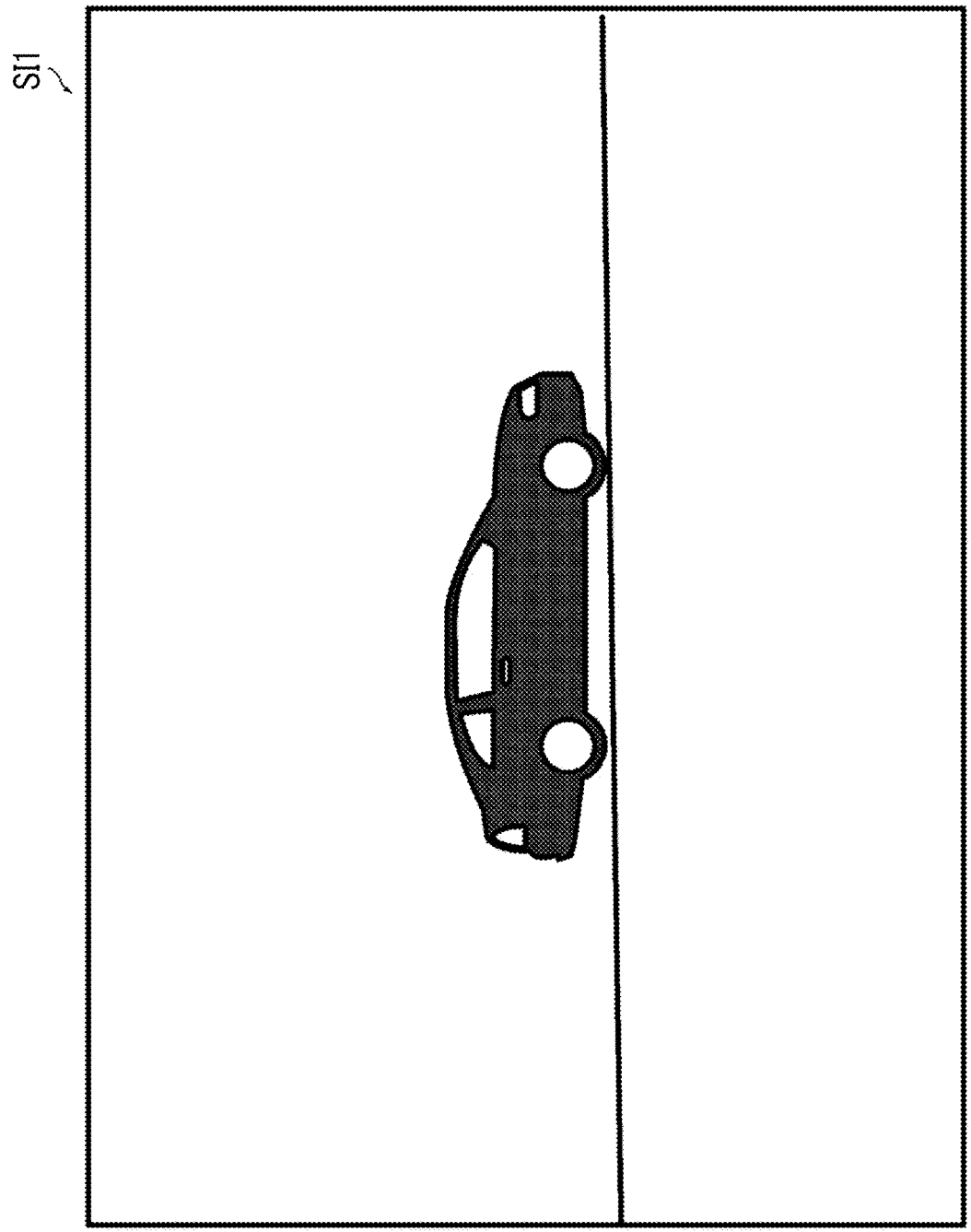
FIG. 15 is a diagram showing an image represented by first secondary image data SI1.
Figure 16:
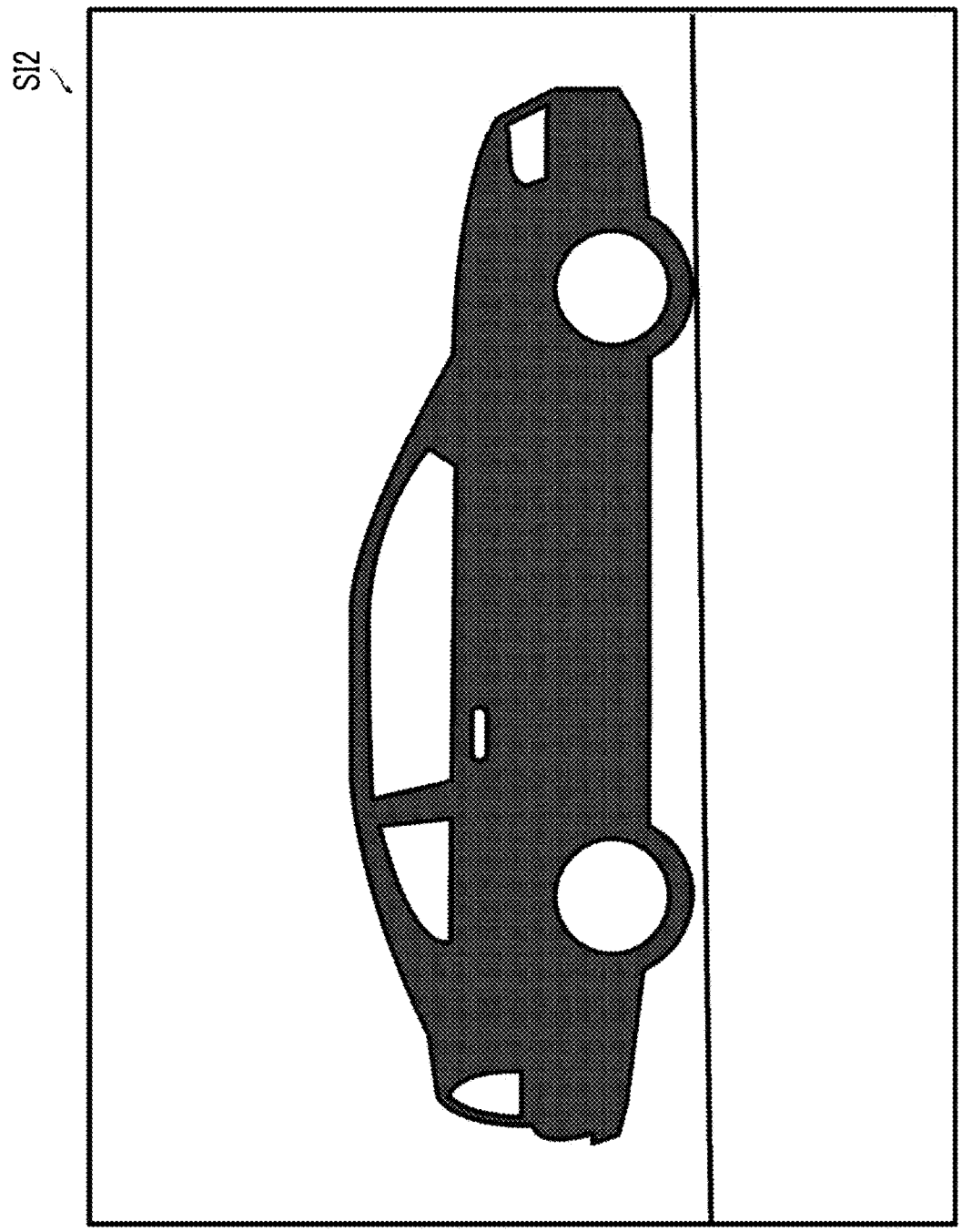
FIG. 16 is a diagram showing an image represented by second secondary image data SI2.

FIG. 15 is a diagram showing an image represented by the first secondary image data SI1, and FIG. 16 is a diagram showing an image represented by the second secondary image data SI2. As shown in FIGS. 15 and 16, the images represented by the first secondary image data SI1 and the second secondary image data SI2 are images obtained by removing the influence of the crosstalk.

It is assumed that a pixel value (value of the corresponding pixel) of the first primary image data FI1 in a specific pixel position (x, y) is A1 and a pixel value of the second primary image data FI2 is A2. It is assumed that a pixel value of the first secondary image data SI1 in the corresponding pixel position is B1 and a pixel value of the second secondary image data SI2 is B2.

The pixel values B1 and B2 of the first secondary image data SI1 and the second secondary image data SI2 may be calculated by solving the following simultaneous equations.

$$A1=C11*B1+C12*B2$$

$$A2=C21*B1+C22*B2$$

That is, the first primary image data FI1 is data including a component (synonymous with a component of the first optical system) of the first secondary image data SI1 and a component (synonymous with a component of the second optical system) of the second secondary image data SI2 at a ratio of C11:C12. Accordingly, in a case where this relationship is expressed by an expression, the relationship of A1=C11*B1+C12*B2 is established. Similarly, since the second primary image data FI2 is data including a component (a component of the first optical system) of the first secondary image data SI1 and a component (a component of the second optical system) of the second secondary image data SI2 at a ratio of C21:C22, in a case where this relationship is expressed by an expression, the relationship of A2=C21*B1+C22*B2 is established. In a case where this relationship is shown in the drawings, this relationship is shown in FIGS. 17 and 18.

Figure 17:
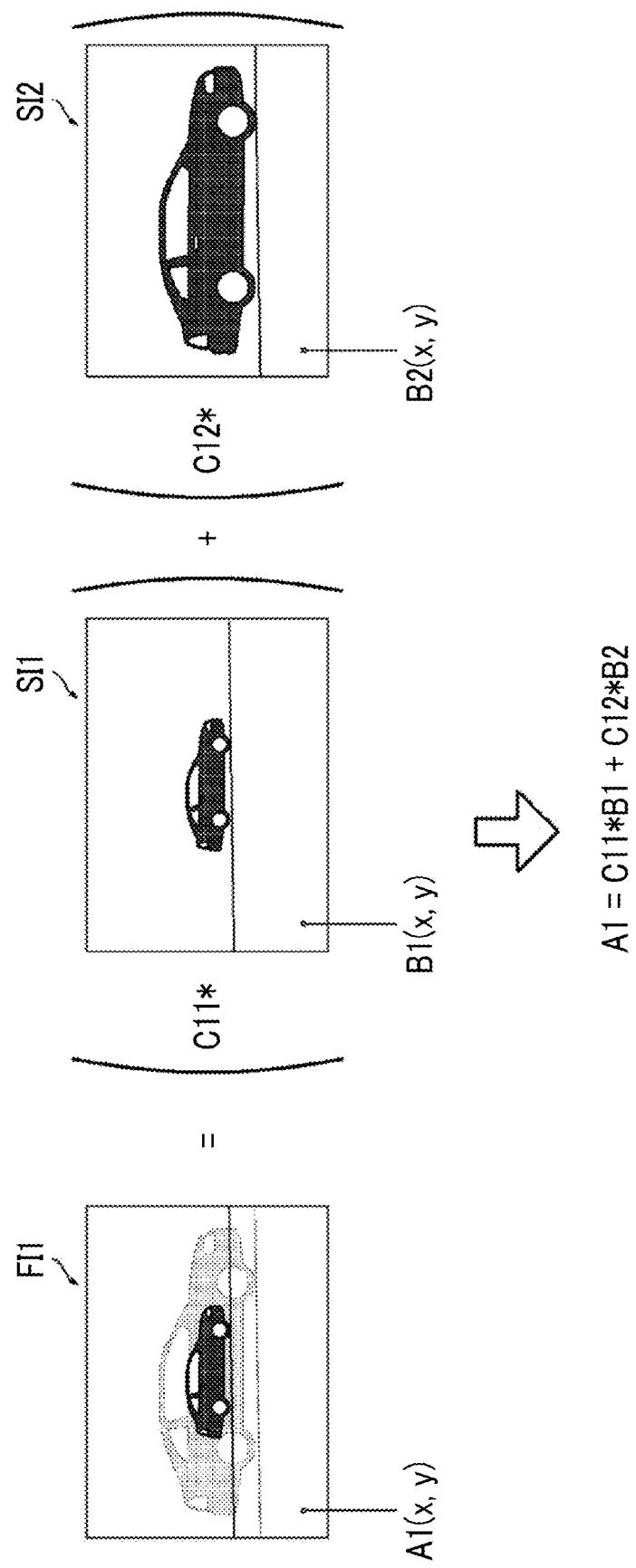
FIG. 17 is a conceptual diagram of a configuration of the first primary image data.

FIG. 17 is a conceptual diagram of a configuration of the first primary image data.

As shown in this drawing, the first primary image data FI1 includes a component of the first secondary image data SI1 at a ratio of C11, and includes a component of the second secondary image data SI2 at a ratio of C12. In a case where this relationship is expressed by an expression, the relationship of A1=C11*B1+C12*B2 is established for the specific pixel position (x, y).

Figure 18:
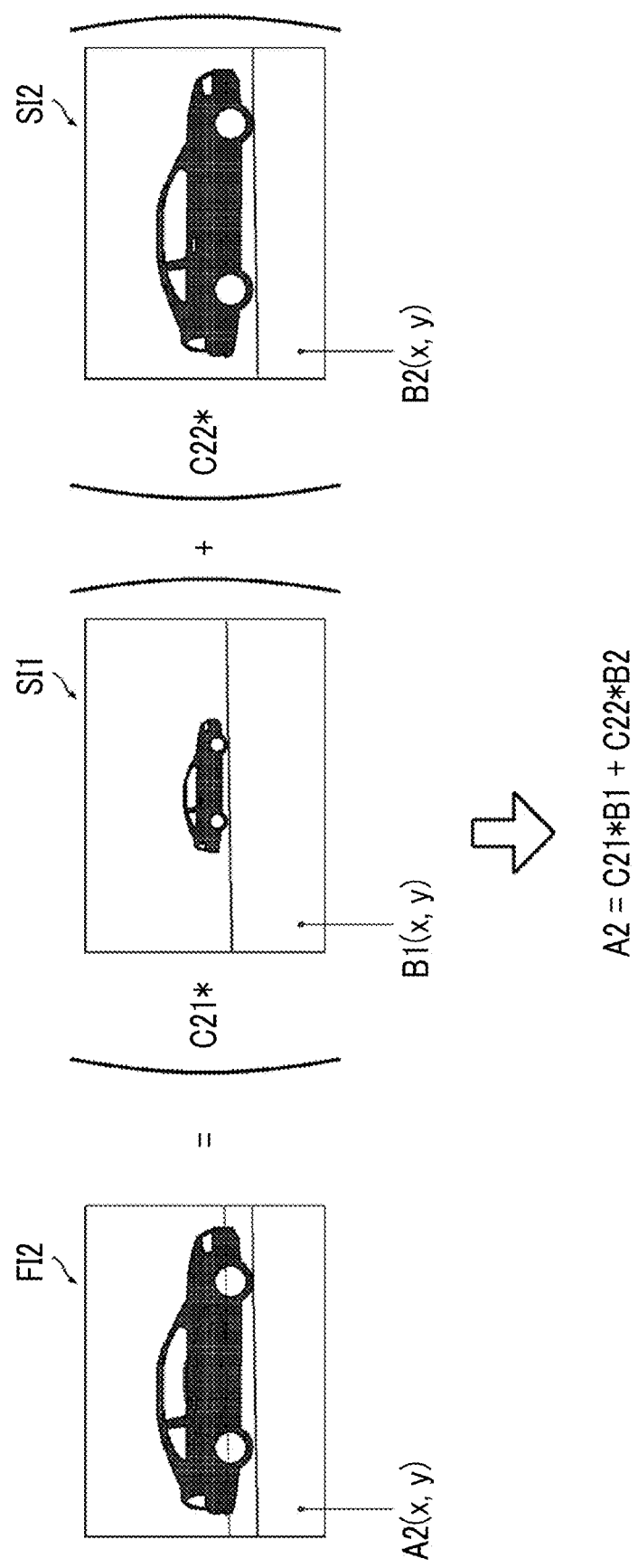
FIG. 18 is a conceptual diagram of a configuration of the second primary image data.

FIG. 18 is a conceptual diagram of a configuration of the second primary image data.

As shown in this drawing, the second primary image data FI2 includes a component of the first secondary image data SI1 at a ratio of C21, and includes a component of the second secondary image data SI2 at a ratio of C22. In a case where this relationship is expressed by an expression, the relationship of A2=C21*B1+C22*B2 is established for the specific pixel position (x, y).

Accordingly, by solving the simultaneous equations for each pixel, the pixel values B1 and B2 of the first secondary image data SI1 and the second secondary image data SI2 can be calculated, and the first secondary image data SI1 and the second secondary image data SI2 can be generated. By solving the simultaneous equations, the image data items (the first secondary image data SI1 and the second secondary image data SI2) in which the influence of the crosstalk is removed can be generated.

Here, the simultaneous equations can be solved by using a matrix.

Figure 19:
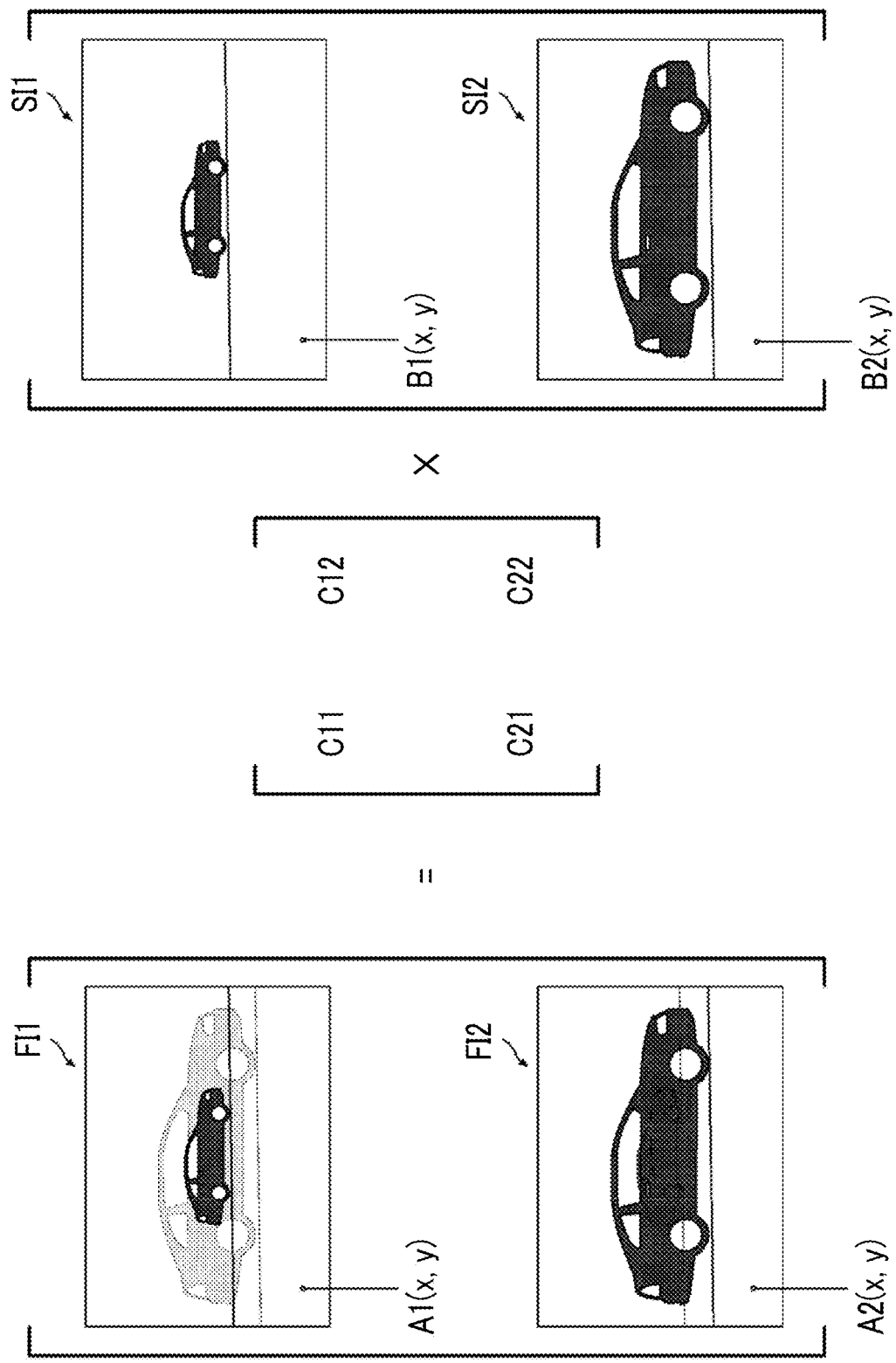
FIG. 19 is a conceptual diagram showing a case where the relationship between the primary image data items and the secondary image data items is represented by using a matrix.
Figure 20:
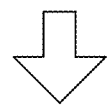
FIG. 20 is a matrix equation representing the relationship between the primary image data items and the secondary image data items.

FIG. 19 is a conceptual diagram showing a case where the relationship between the primary image data items and the secondary image data items is represented by the matrix. FIG. 20 is a matrix equation representing the relationship between the primary image data items and the secondary image data items.

As shown in FIGS. 19 and 20, in a case where a matrix of 2 rows×1 column in which the pixel values A1 and A2 of the first primary image data FI1 and the second primary image data FI2 are elements is A, a matrix of 2 rows×1 column in which the pixel values B1 and B2 of the first secondary image data SI1 and the second secondary image data SI2 are elements is B, and a matrix of 2 rows×2 columns in which the crosstalk ratio C1 of the first light receiving sensor=C11:C12 and the crosstalk ratio C2 of the second light receiving sensor=C21:C22 are elements is C, the simultaneous equation can be expressed by A=C*B.

The pixel values B1 and B2 of the first secondary image data SI1 and the second secondary image data SI2 can be calculated by multiplying both sides of the matrix equation A=C*B by an inverse matrix $C^{-1}$ of C. That is, these pixel values can be calculated by solving $B=C^{-1}*A$.

Figure 21:
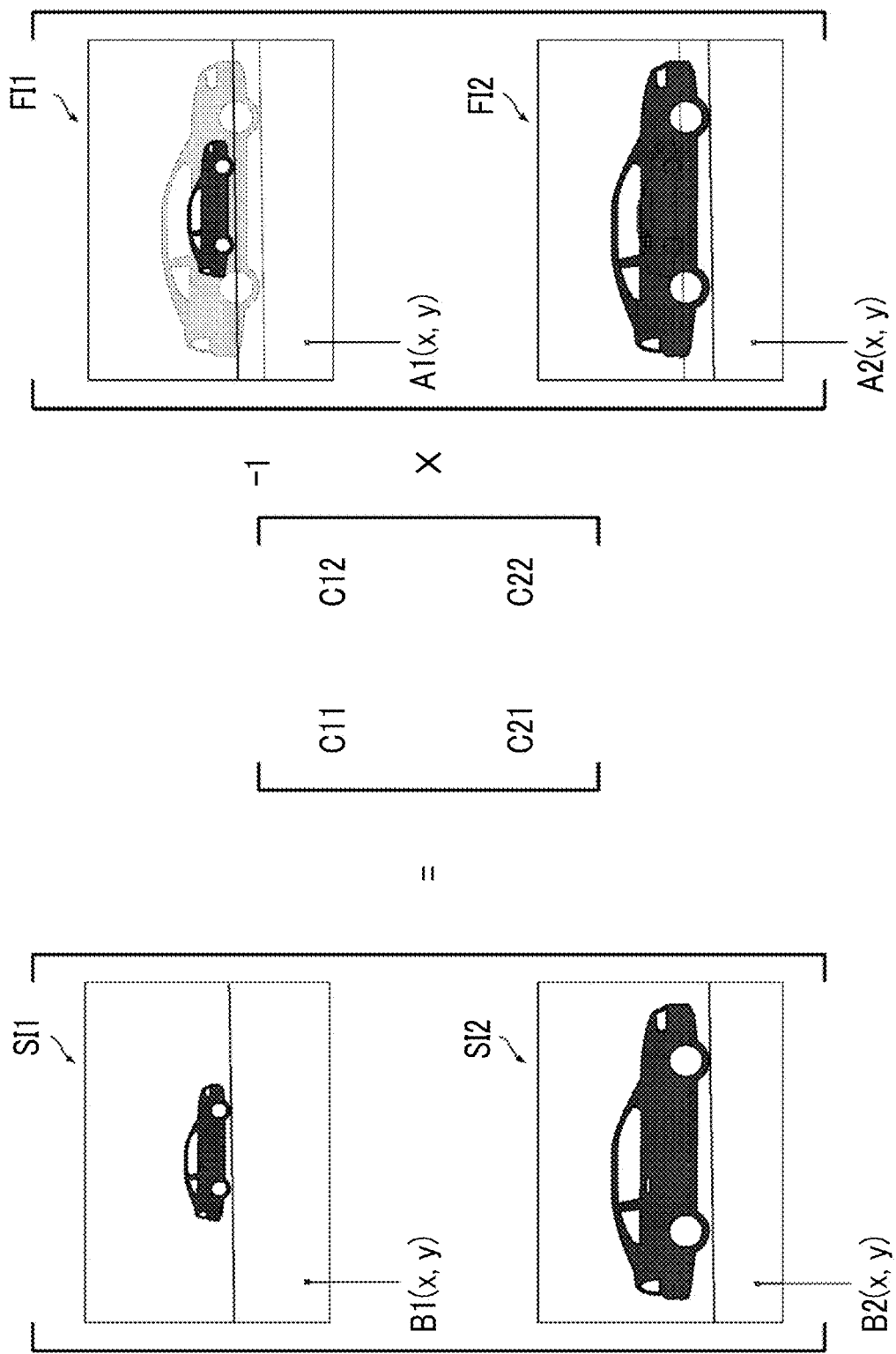
FIG. 21 is a conceptual diagram showing a case where the relationship between the primary image data items and the secondary image data items is represented by using an inverse matrix.
Figure 22:
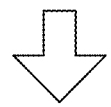
FIG. 22 is a matrix equation representing the relationship between the primary image data items and the secondary image data items by using the inverse matrix.

FIG. 21 is a conceptual diagram a case where the relationship between the primary image data items and the secondary image data items is represented by using the inverse matrix. FIG. 22 is a matrix equation representing the relationship between the primary image data items and the secondary image data items by using the inverse matrix.

As shown in FIGS. 21 and 22, the pixel values B1 and B2 of the first secondary image data SI1 and the second secondary image data SI2 can be calculated by multiplying the matrix A by the inverse matrix $C^{-1}$ of the matrix C.

Since the crosstalk ratios of the light receiving sensors included in each pixel are known, the inverse matrix $C^{-1}$ can be obtained in advance. Accordingly, as long as the pixel values A1 and A2 of the primary image data items can be obtained, the pixel values B1 and B2 of the secondary image data items can be calculated by using the inverse matrix $C^{-1}$.

As mentioned above, the secondary image data items in which the influence of the crosstalk is removed can be generated by performing predetermined calculation processing (crosstalk removal processing) on the primary image data items.

[Influence in Case Where Pixel Value is Saturated]

As stated above, the crosstalk removal processing is performed by using the fact that the relationship of A1=C11*B1+C12*B2 and A2=C21*B1+C22*B2 is established between the primary image data items and the secondary image data items.

However, the relationship is established only in a case where linearity is established between the input and the output of the image sensor. In a case where a part thereof is saturated, this relationship is not established between the pixels thereof, and thus, the influence of the crosstalk is not able to be accurately removed.

[Crosstalk Removal Processing in Imaging Device of Present Embodiment] The imaging device 1 of the present embodiment includes four light receiving sensors 120a to 120d in each pixel 110 of the image sensor 100. The number (m=4) of the light receiving sensors 120a to 120d is larger than the number (n=2) of optical systems included in the imaging lens 10 (m>n). The light receiving sensors 120a to 120d have different combinations of crosstalk ratio and light sensitivity.

Since the imaging device 1 of the present embodiment includes four light receiving sensors 120a to 120d of each pixel 110 of the image sensor 100, the imaging device generates four primary image data items by performing exposing once. The crosstalk removal processing is performed by using the four primary image data items. That is, the secondary image data items corresponding to the optical systems are generated by performing the crosstalk removal processing on the four primary image data items for each pixel. At this time, in a case where the pixel as the processing target includes the primary image data of which the pixel value is saturated, the corresponding primary image data is removed, and the crosstalk removal processing is performed. Accordingly, in the imaging device 1 of the present embodiment, the processing content is different between a case where the pixel as the processing target includes the primary image data of which the pixel value is saturated and a case where the pixel does not include the corresponding primary image data. Hereinafter, these cases will be described.

(A) Case where Pixel as Processing Target does not Include Primary Image Data of which Pixel Value is Saturated A basic concept for the crosstalk removal is the same as that in a case where m=n. That is, the secondary image data items corresponding to the optical systems are calculated from the plurality of primary image data items by using the relationship established between the primary image data items and the secondary image data items, and the influence of the crosstalk is removed.

Figure 23:
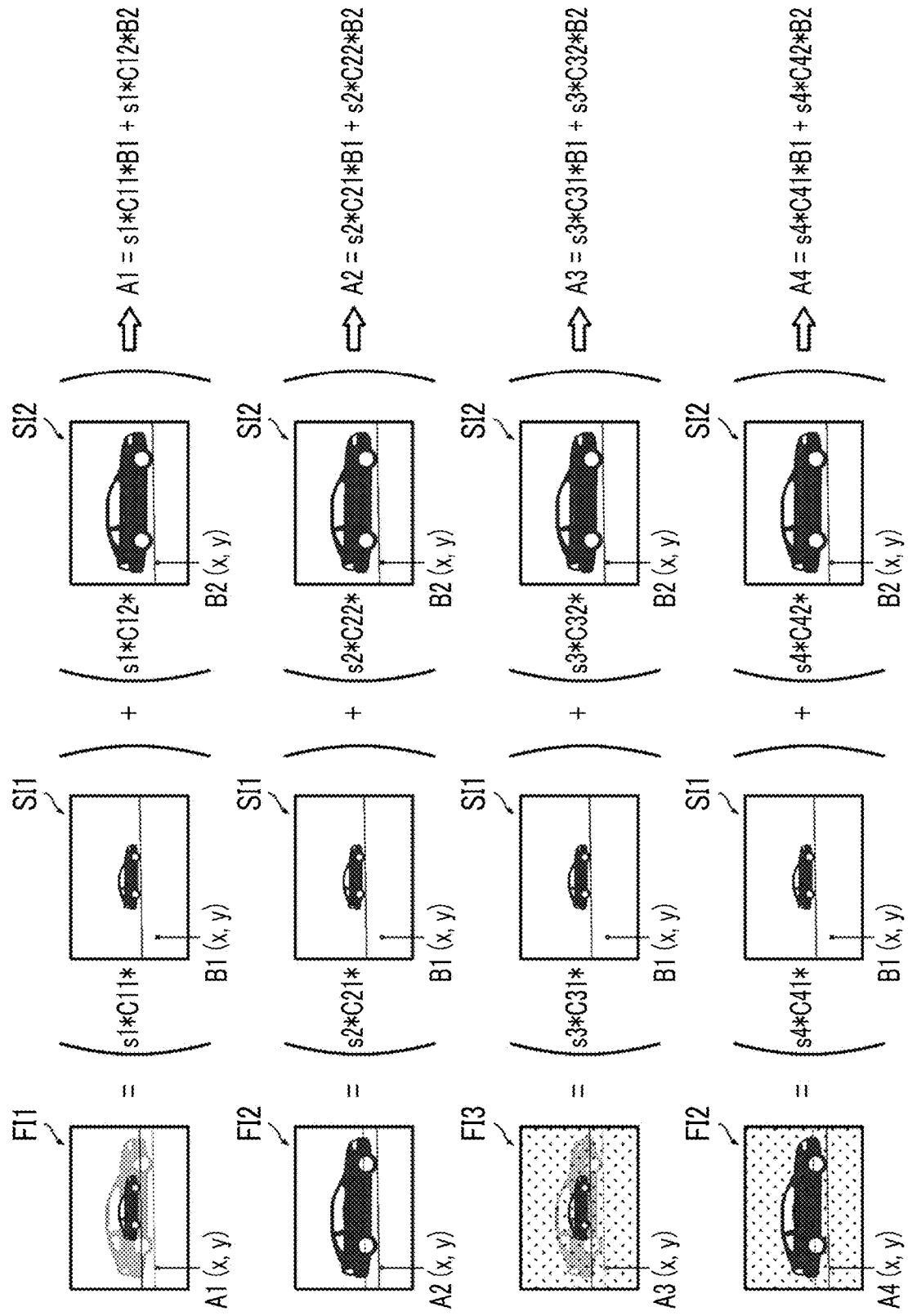
FIG. 23 is a conceptual diagram showing the relationship between the primary image data items and the secondary image data items.

FIG. 23 is a conceptual diagram showing the relationship between the primary image data items and the secondary image data items.

It is assumed that the crosstalk ratio C1 of the first light receiving sensor 120a provided in the specific pixel position (x, y) of the image sensor 100 is C1=C11:C12, the crosstalk ratio C2 of the second light receiving sensor 120b is C2=C21:C22, the crosstalk ratio C3 of the third light receiving sensor 120c is C3=C31:C32, and the crosstalk ratio C4 of the fourth light receiving sensor 120d is C4=C41:C42.

It is assumed that coefficients corresponding to the light sensitivity of the light receiving sensors 120a to 120d are s1, s2, s3, and s4. For example, the coefficients s1, s2, s3, and s4 are set with the specific light receiving sensor as a reference. For example, in a case where the first light receiving sensor 120a is the reference, it is assumed that the coefficient s1 of the first light receiving sensor 120a is s1=1. In a case where the light sensitivity of the second light receiving sensor 120b is ⅕ of the light sensitivity of the first light receiving sensor 120a, the coefficient s2 of the second light receiving sensor 120b is s2=⅕. In a case where the light sensitivity of the third light receiving sensor 120c is equal to the light sensitivity of the first light receiving sensor 120a, the coefficient s3 of the third light receiving sensor 120c is s3=1.

In this case, the first primary image data FI1 is data including a component (synonymous with a component of the first optical system 20) of the first secondary image data SI1 and a component (synonymous with a component of the second optical system 30) of the second secondary image data SI2 at a ratio of s1*C11:s1*C12. In a case where this relationship is expressed by an expression, the first primary image data FI1 satisfies the relationship of A1=s1*C11*B1+s1*C12*B2 for the specific pixel position (x, y).

The second primary image data FI2 is data including a component of the first secondary image data SI1 and a component of the second secondary image data SI2 at a ratio of s2*C21:s2*C22. In a case where this relationship is expressed by an expression, the second primary image data FI2 satisfies the relationship of A2=s2*C21*B1+s2*C22*B2 for the specific pixel position (x, y).

The third primary image data FI3 is data including a component of the first secondary image data SI1 and a component of the second secondary image data SI2 at a ratio of s3*C31:s3*C32. In a case where this relationship is expressed by an expression, the third primary image data FI3 satisfies the relationship of A3=s3*C31*B1+s3*C32*B2 for the specific pixel position (x, y).

The fourth primary image data FI4 is data including a component of the first secondary image data SI1 and a component of the second secondary image data SI2 at a ratio of s4*C41:s4*C42. In a case where this relationship is expressed by an expression, the fourth primary image data FI4 satisfies the relationship of A4=s4*C41*B1+s4*C42*B2 for the specific pixel position (x, y).

That is, in a case where the pixel values of the primary image data items are A1, A2, A3, and A4 in the specific pixel position (x, y) and the pixel values of the secondary image data items are B1 and B2 in the specific pixel positions (x, y), the following relationships are satisfied between the primary image data items and the secondary image data items.

$A1 = s1*C11*B1 + s1*C12*B2$ $A2 = s2*C21*B1 + s2*C22*B2$ $A3 = s3*C31*B1 + s3*C32*B2$ $A4 = s4*C41*B1 + s4*C42*B2$

By solving the simultaneous equations, the pixel values B1 and B2 of the first secondary image data SI1 and the second secondary image data SI2 can be calculated. By solving the simultaneous equations, the image data items (the first secondary image data SI1 and the second secondary image data SI2) in which the influence of the crosstalk is removed can be generated.

As stated above, the simultaneous equations can be solved by using the matrix.

Figure 24:
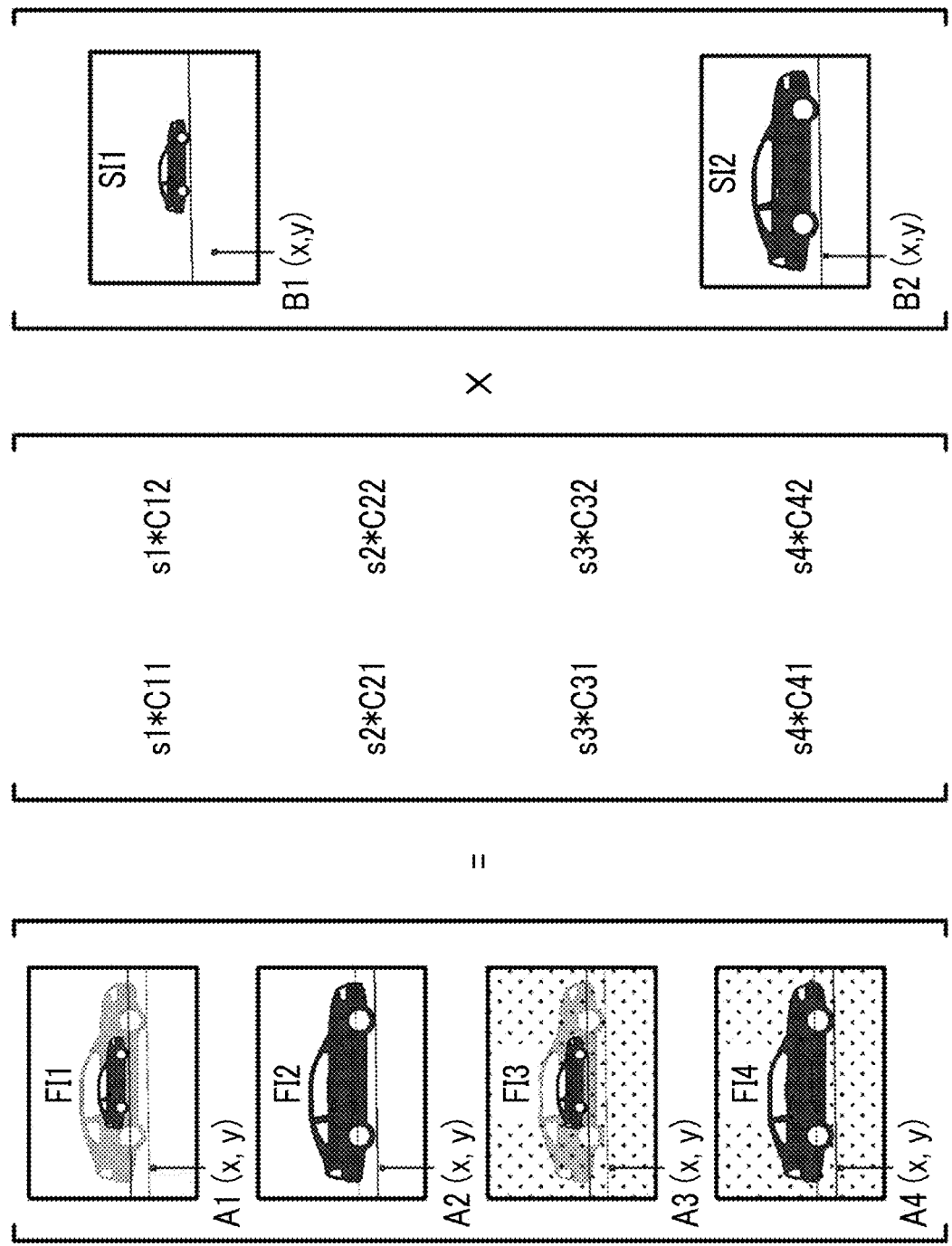
FIG. 24 is a conceptual diagram showing a case where the relationship between the primary image data items and the secondary image data items is represented by using a matrix.

FIG. 24 is a conceptual diagram showing a case where the relationship between the primary image data items and the secondary image data items is represented by the matrix. FIG. 25 is a matrix equation representing the relationship between the primary image data items and the secondary image data items.

As shown in FIGS. 24 and 25, in a case where a matrix of 4 rows×1 column in which the pixel values A1 to A4 of the primary image data items FI1 to FI4 in the specific pixel position (x, y) are elements is A, a matrix of 2 rows×1 column in which the pixel values B1 and B2 of the secondary image data items SI1 and SI2 in the specific pixel position (x, y) are elements is B, and a matrix of 4 rows×2 columns in which products s1*C1=s1*C11: s1*C12, s2*C2=s2*C21:s2*C22, s3*C3=s3*C31:s3*C32, and s4*C4=s4*C41:s4*C42 of the crosstalk ratios C1=C11:C12, C2=C21:C22, C3=C31:C32, and C4=C41:C42 of the light receiving sensors 120a to 120d and the coefficients s1, s2, s3 and s4 corresponding to the light sensitivity of the light receiving sensors 120a to 120d are elements is T, the simultaneous equation can be expressed by A=T*B.

The pixel values B1 and B2 of the first secondary image data SI1 and the second secondary image data SI2 can be calculated by multiplying both sides of the matrix equation A=T*B by an inverse matrix $T^{-1}$ of C. That is, these pixel values can be calculated by solving B=$T^{-1}$*A.

Figure 26:
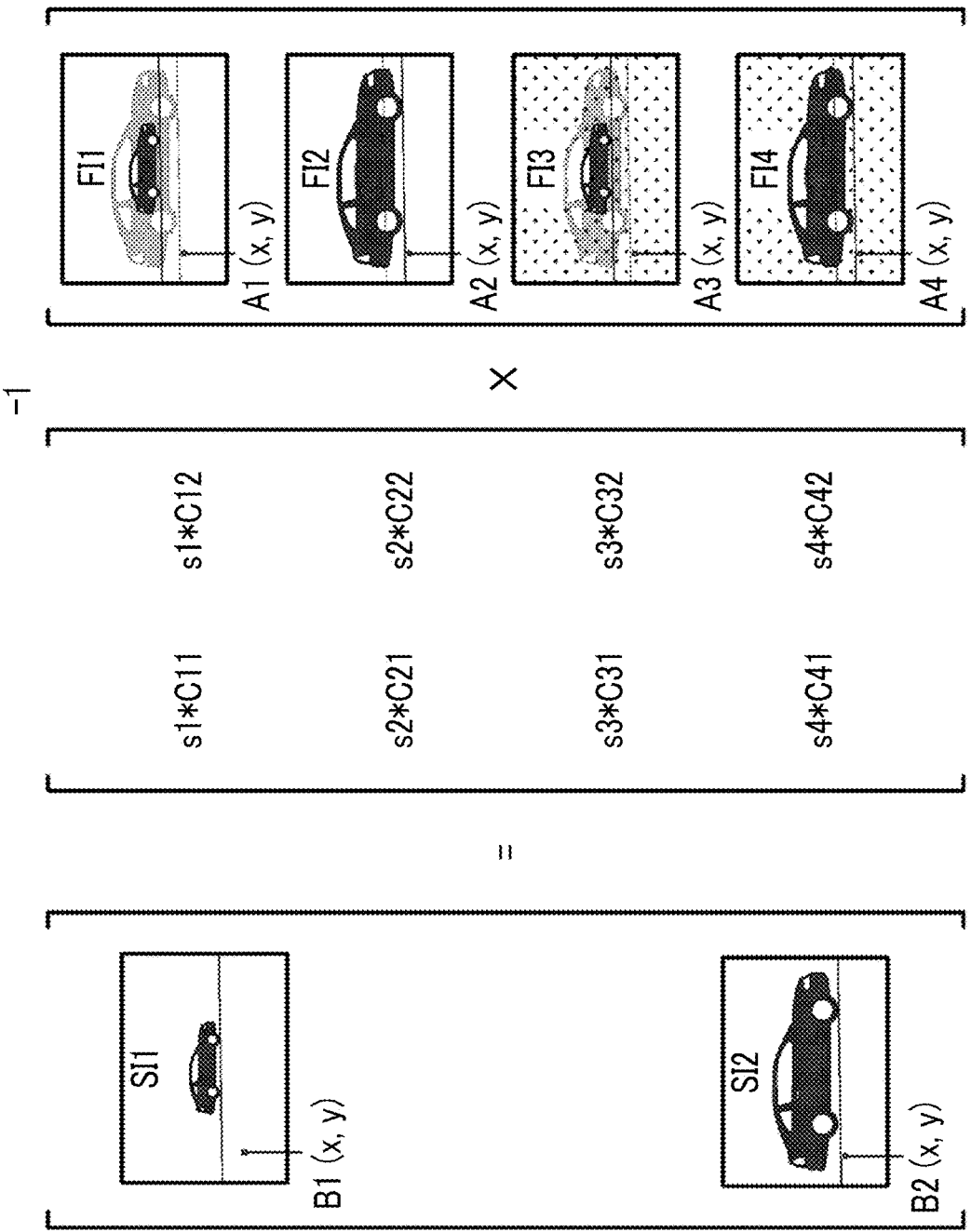
FIG. 26 is a conceptual diagram showing the relationship between the primary image data items and the secondary image data items by using the inverse matrix.
Figure 27:
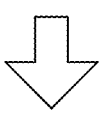
FIG. 27 is a matrix equation representing the relationship between the primary image data items and the secondary image data items by using the inverse matrix.

FIG. 26 is a conceptual diagram showing a case where the relationship between the primary image data items and the secondary image data items is represented by using the inverse matrix. FIG. 27 is a matrix equation representing the relationship between the primary image data items and the secondary image data items by using the inverse matrix.

As shown in FIGS. 26 and 27, the pixel values B1 and B2 of the first secondary image data SI1 and the second secondary image data SI2 can be calculated by multiplying the matrix A by the inverse matrix $T^{-1}$ of the matrix T.

Since the crosstalk ratios of the light receiving sensors included in each pixel are known, the inverse matrix $T^{-1}$ can be obtained in advance.

In a case where the matrix T is not regular, a general inverse matrix of the matrix T is calculated for the inverse matrix $T^{-1}$ thereof, and the inverse matrix $T^{-1}$ is obtained. For example, the general inverse matrix is calculated by a known method such as a Moore-Penrose inverse matrix.

As stated above, in a case where the pixel as the processing target does not include the corresponding primary image data of which the pixel value is saturated, the pixel values of the secondary image data items can be calculated by solving the matrix equation B=$T^{-1}$*A. The secondary image data items in which the influence of the crosstalk is removed can be generated by solving the matrix equation B=$T^{-1}$*A.

(B) Case where Pixel as Processing Target Includes Primary Image Data of which Pixel Value is Saturated In a case where the pixel as the processing target includes the primary image data of which the pixel value is saturated, the corresponding primary image data is removed, and the crosstalk removal processing is performed.

A predetermined relationship is established between the primary image data items and the secondary image data items only in a case where the linearity is secured between the input and the output of the light receiving sensor. The linearity is secured between the input and the output of the light receiving sensor until the light receiving sensor is saturated. In a case where the light receiving sensor is saturated, the linearity is not secured between the input and the output. In a case where the crosstalk removal processing is performed by using the output of the saturated light receiving sensor, the crosstalk is not able to be accurately removed.

Thus, in a case where the pixel as the processing target includes the primary image data of which the pixel value is saturated, the corresponding primary image data is removed, and the crosstalk removal processing is performed.

Figure 28:
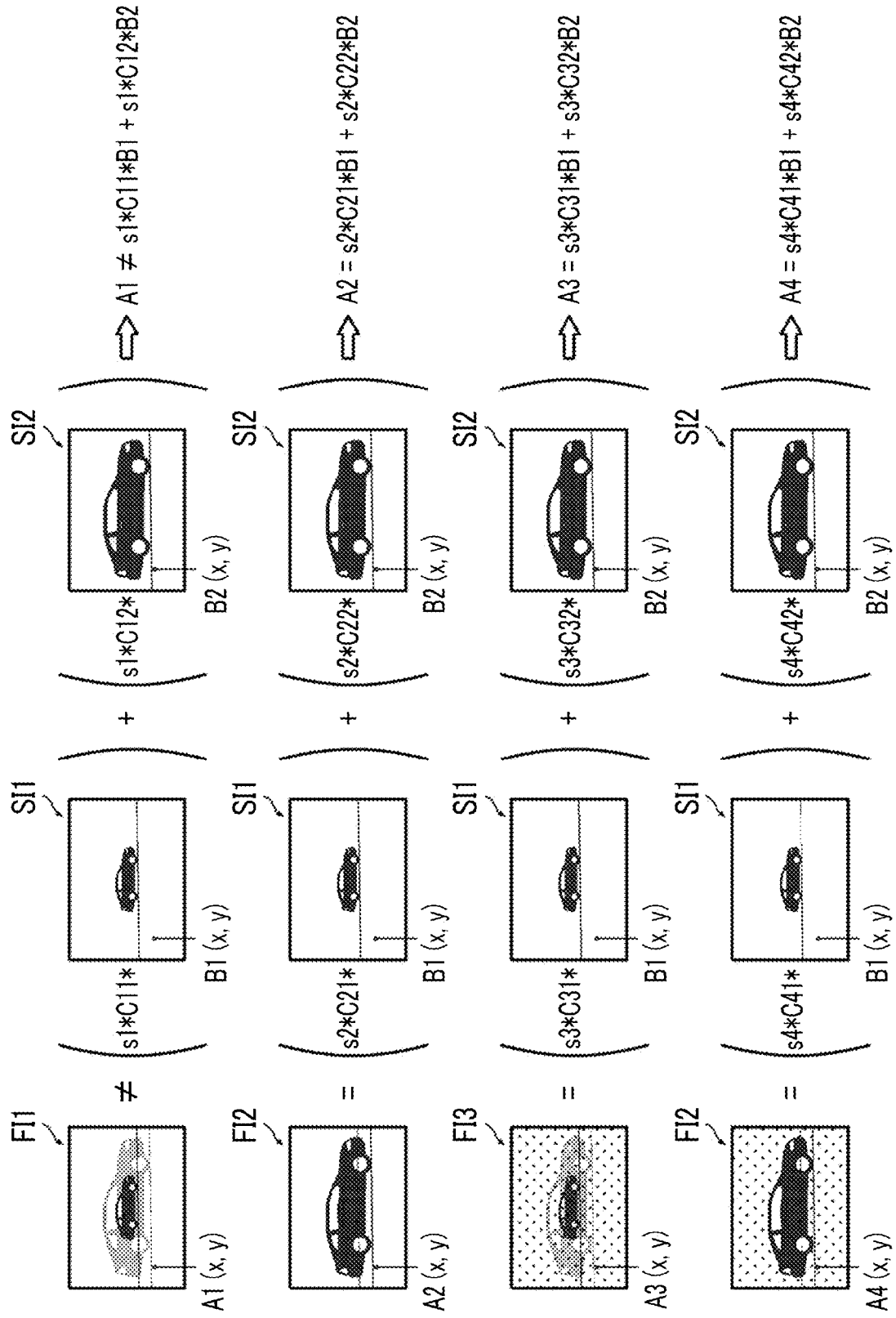
FIG. 28 is a conceptual diagram showing the relationship between the primary image data items and the secondary image data items in a case where the pixel as the processing target includes the primary image data of which the pixel value is saturated.

FIG. 28 is a conceptual diagram showing the relationship between the primary image data items and the secondary image data items in a case where the pixel as the processing target includes the primary image data of which the pixel value is saturated. Particularly, a case where the pixel value of the first primary image data FI1 is saturated is shown in this drawing.

In a case where the pixel value of the first primary image data FI1 is saturated, the relationship of A1=s1*C11*B1+s1*C12*B2 is not established between the first primary image data FI1 and the first secondary image data SI1 and second secondary image data SI2. That is, A1≠s1*C11*B1+s1*C12*B2.

Meanwhile, the second primary image data FI2 satisfies the relationship of A2=s2*C21*B1+s2*C22*B2 between the first secondary image data SI1 and the second secondary image data SI2. Similarly, the third primary image data FI3 satisfies the relationship of A3=s3*C31*B1+s3*C32*B2 between the first secondary image data SI1 and the second secondary image data SI2, and the fourth primary image data FI4 satisfies the relationship of A4=s4*C41**B1+s4*C42*B2 between the first secondary image data SI1 and the second secondary image data SI2.

That is, in a case where the first primary image data FI1 is removed, the following relationships are established between other primary image data items and secondary image data items.

$A2=s2*C21*B1+s2*C22*B2$ $A3=s3*C31*B1+s3*C32*B2$ $A4=s4*C41*B1+s4*C42*B2$

By solving the simultaneous equations, the pixel values B1 and B2 of the first secondary image data SI1 and the second secondary image data SI2 may be calculated. In this case, it is possible to solve the simultaneous equations by using the matrix.

Figure 29:
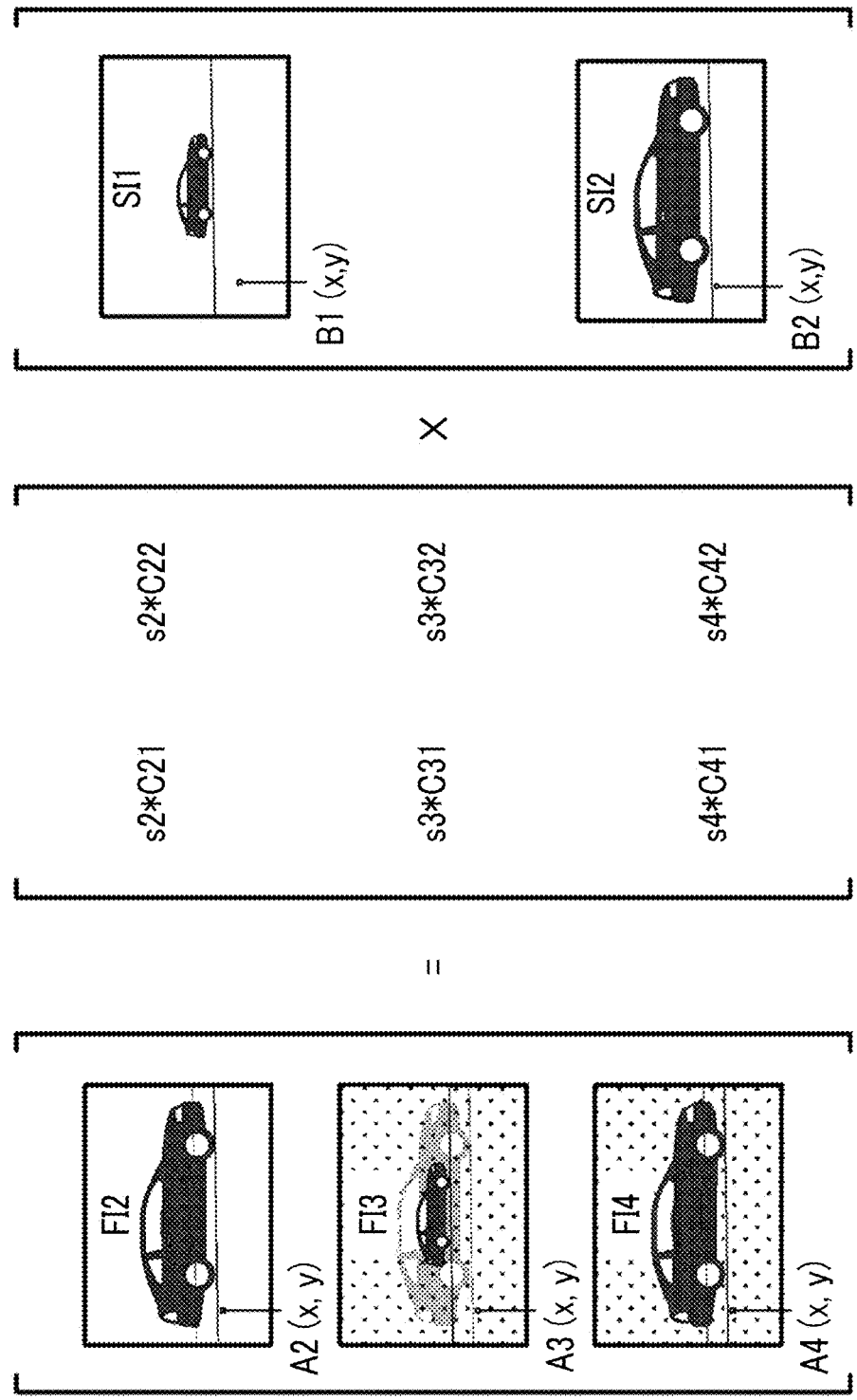
FIG. 29 is a conceptual diagram showing a case where the relationship between the primary image data items and the secondary image data items is represented by the matrix in a case where the first primary image data is removed.
Figure 30:
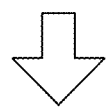
FIG. 30 is a matrix equation representing the relationship between the primary image data items and the secondary image data items in a case where the first primary image data is removed.

FIG. 29 is a conceptual diagram showing a case where the relationship between the primary image data items and the secondary image data items is represented by the matrix in a case where the first primary image data is removed. FIG. 30 is a matrix equation representing the relationship between the primary image data items and the secondary image data items in a case where the first primary image data is removed.

As shown in FIGS. 29 and 30, in a case where it is assumed that a matrix of 3 rows×1 column in which the pixel values A2, A3, and A4 of the primary image data items FI2, FI3, and FI4 in the specific pixel position (x, y) in which the first primary image data FI1 is removed are elements is A, a matrix of 2 rows×1 column in which the pixel values B1 and B2 of the secondary image data items SI1 and SI2 in the specific pixel position (x, y) are elements is B, and a matrix of 3 rows×2 columns in which the products s1*C1=s1*C11:

s1*C12, s2*C2=s2*C21:s2*C22, s3*C3=s3*C31:s3*C32, and s4*C4=s4*C41:s4*C42 of the crosstalk ratios C2=C21: C22, C3=C31:C32, and C4=C41:C42 of the light receiving sensors 120b, 120c, and 120d and the coefficients s, s2, s3, and s4 corresponding to the light sensitivity of the light receiving sensors 120a to 120d are elements is T, the simultaneous equation can be expressed by A=T*B.

The pixel values B1 and B2 of the first secondary image data SI1 and the second secondary image data SI2 can be calculated by multiplying both sides of the matrix equation A=T*B by an inverse matrix $T^{-1}$ of C. That is, these pixel values can be calculated by solving $B=T^{-1}*A$.

Figure 31:
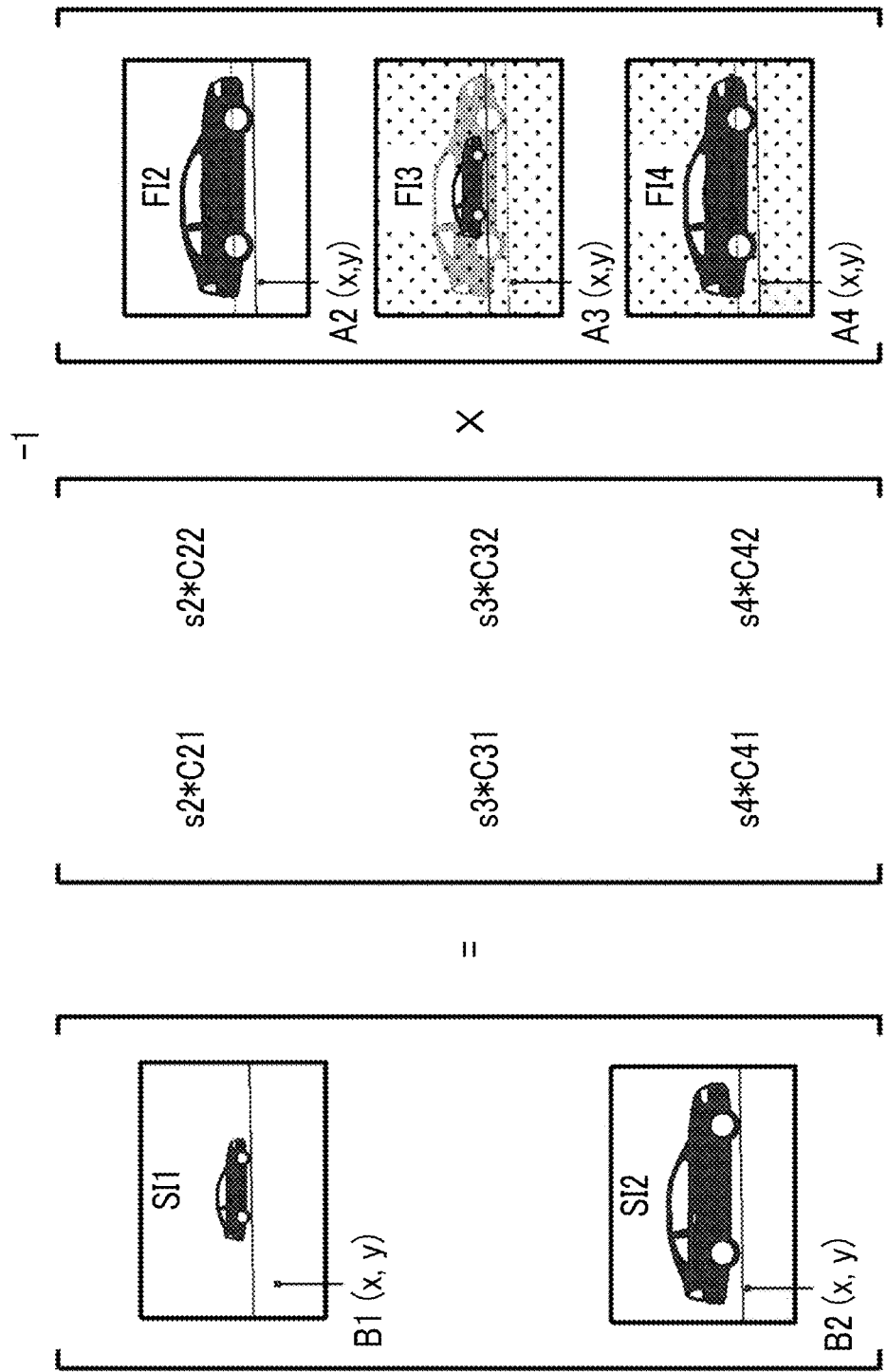
FIG. 31 is a conceptual diagram showing the relationship between the primary image data items and the secondary image data items by using the inverse matrix.
Figure 32:
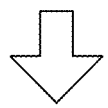
FIG. 32 is a matrix equation representing the relationship between the primary image data items and the secondary image data items by using the inverse matrix.

FIG. 31 is a conceptual diagram showing a case where the relationship between the primary image data items and the secondary image data items is represented by using the inverse matrix. FIG. 32 is a matrix equation representing the relationship between the primary image data items and the secondary image data items by using the inverse matrix.

As shown in FIGS. 31 and 32, the pixel values B1 and B2 of the first secondary image data SI1 and the second secondary image data SI2 can be calculated by multiplying the matrix A by the inverse matrix $T^{-1}$ of the matrix T.

Since the crosstalk ratios of the light receiving sensors included in each pixel are known, the inverse matrix $T^{-1}$ can be obtained in advance.

In a case where the matrix T is not regular, a general inverse matrix of the matrix T is calculated for the inverse matrix $T^{-1}$ thereof, and the inverse matrix $T^{-1}$ is obtained. For example, the general inverse matrix is calculated by a known method such as a Moore-Penrose inverse matrix.

As stated above, in a case where the pixel as the processing target includes the primary image data of which the pixel value is saturated, the corresponding primary image data is removed, and the crosstalk removal processing is performed. Accordingly, it is possible to accurately remove the influence of the crosstalk.

(C) Case where Pixel Values of all Primary Image Data Items are Saturated in Pixels as Processing Targets In a case where the pixel values of all the primary image data items are saturated in the pixels as the processing targets, the secondary image data items are not able to be calculated. Accordingly, in this case, the crosstalk removal processing is not performed. Accordingly, unnecessary processing can be omitted.

In a case where the pixel values of all the primary image data items are saturated in the pixels as the processing targets, the pixel value of the secondary image data in the corresponding pixel position is the saturation value. The saturation value is a signal value output in a case where the light receiving sensor is saturated.

[Detection of Saturated Pixel] The primary image data is analyzed, and the pixel of which the pixel value is saturated is detected. Specifically, the pixel of which the pixel value is the saturation value is detected, and the saturated pixel is detected. The pixel of which the pixel value is saturated is detected by the digital signal processing unit 216. The detection of the saturated pixel will be described in detail below.

<Flow of Generation Processing of Secondary Image Data>

As stated above, the secondary image data items are generated by performing the crosstalk removal processing on the primary image data items.

Figure 33:
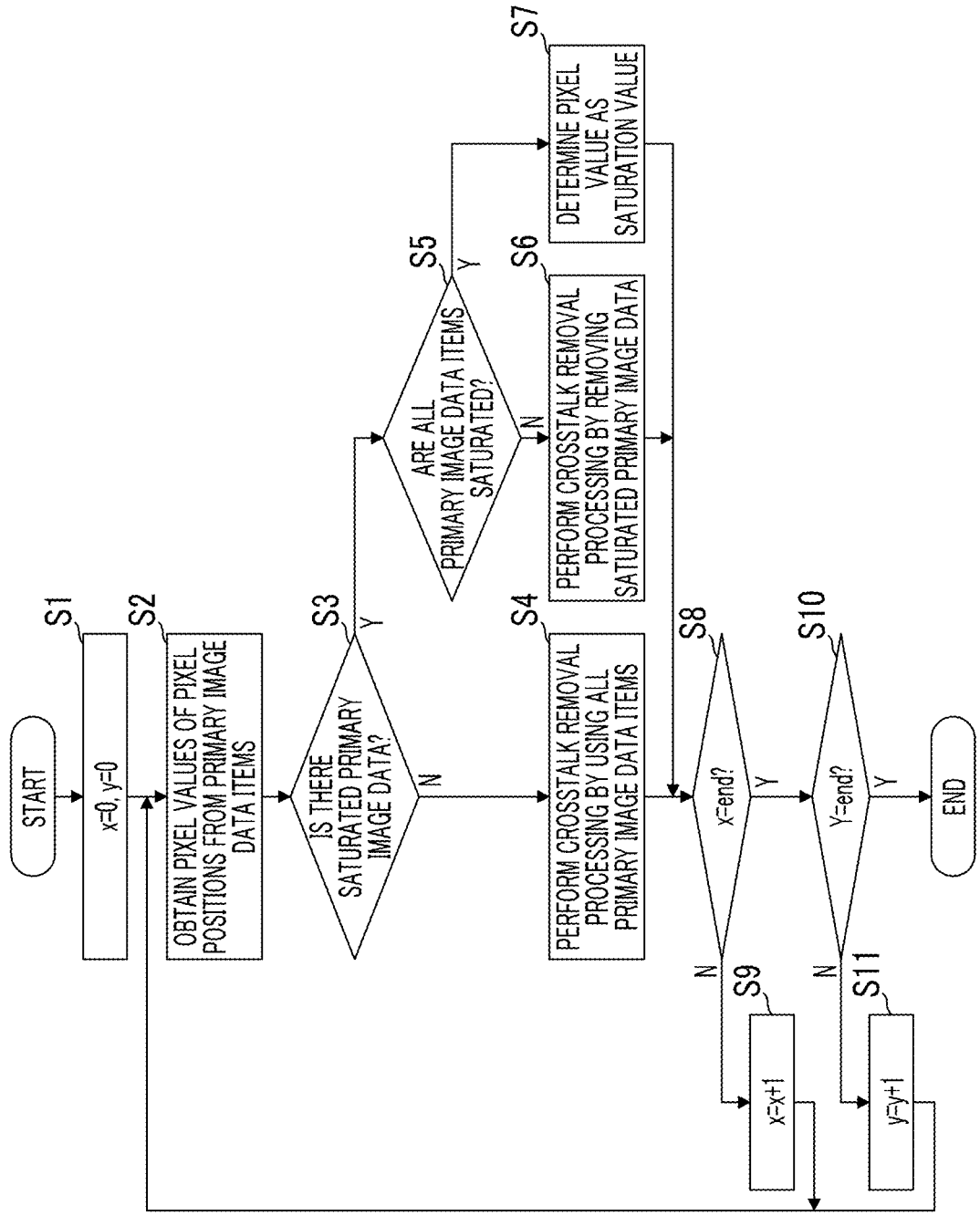
FIG. 33 is a flowchart showing a procedure of generation processing of the secondary image data.

FIG. 33 is a flowchart showing a procedure of generation processing of the secondary image data.

The crosstalk removal processing is performed for each pixel. In a case where an upper left corner of an image is a coordinate origin, the processing is started from the coordinate origin.

Initially, x=0, and y=0 (step S1). The pixel values of the primary image data items FI1 to FI4 in the pixel position (x, y) are obtained (step S2). It is determined whether or not the primary image data of which the pixel value is saturated is included in the pixel position (x, y) (step S3).

In a case where the primary image data of which the pixel value is saturated is not included in the pixel position (x, y), the crosstalk removal processing is performed by using all the primary image data items Fi1 to FI4 (step S4). Accordingly, the pixel values of the first secondary image data and the second secondary image data in the corresponding pixel position are obtained.

Meanwhile, in a case where the primary image data of which the pixel value is saturated is included in the pixel position (x, y), it is determined whether or not the pixel values of all the primary image data items are saturated (step S5).

In a case where the pixel values of all the primary image data items in the pixel position (x, y) are not saturated, the primary image data of which the pixel value is saturated is removed, and the crosstalk removal processing is performed (step S6). Accordingly, the pixel values of the first secondary image data and the second secondary image data in the corresponding pixel position are obtained.

Meanwhile, in a case where the pixel values of all the primary image data items in the pixel position (x, y) are saturated, the crosstalk removal processing is not performed, and the pixel values of the first secondary image data and the second secondary image data in the corresponding pixel position are determined as the saturation values (step S7).

As stated above, the contents of the crosstalk removal processing are switched depending on whether or not the pixel as the processing target includes the primary image data of which the pixel value is saturated.

Thereafter, it is determined whether or not a value of an X coordinate of the processed pixel is an end point in an x direction (step S8). In a case where the value of the x coordinate of the processed pixel is not the end point in the x direction, the value of the x coordinate is increased (step S9). Accordingly, the next processing target is newly set. After the value of the x coordinate is increased, the processing returns to step S2, and the series of processing is reperformed on the newly set pixel as the target.

In a case where the value of the x coordinate of the processed pixel is the end point in the x direction, it is determined whether or not a value of a y coordinate of the processed pixel is an end point in a y direction (step S10). In a case where the value of the y coordinate of the processed pixel is not the end point in the y direction, the value of the y coordinate is increased (step S11). Accordingly, the next processing target is newly set. After the value of the y coordinate is increased, the processing returns to step S2, and the series of processing is reperformed on the newly set pixel as the target.

In a case where the value of the y coordinate of the processed pixel is the end point in the y direction, the processing is ended. Accordingly, the crosstalk removal processing in all the pixels is completed. The crosstalk removal processing is completed in all the pixels, and thus, the secondary image data items are generated.

<<Configuration of Digital Signal Processing Unit>>

The series of signal processing is performed by the digital signal processing unit 216. The digital signal processing unit 216 generates the primary image data items by obtaining the image signals from each light receiving sensor of each pixel of the image sensor 100, and generates the secondary image data corresponding to each optical system by performing the crosstalk removal processing on the primary image data for each pixel. The digital signal processing unit 216 analyzes the primary image data items, and detects the pixel of which the pixel value is saturated.

Figure 34:
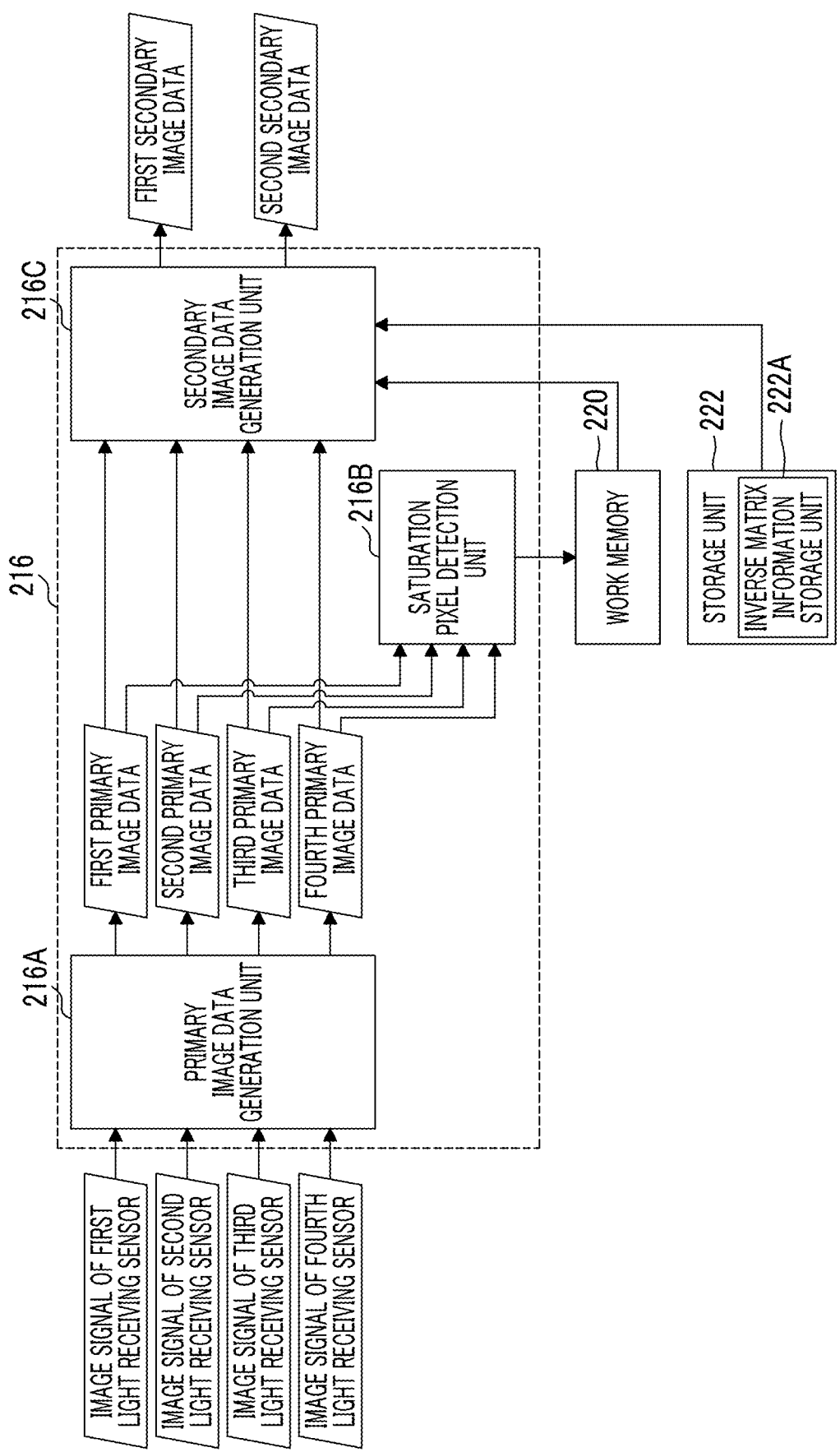
FIG. 34 is a block diagram of a function of a digital signal processing unit.

FIG. 34 is a block diagram of a function of the digital signal processing unit.

The digital signal processing unit 216 has a function of generating the primary image data items, that is, a function of a primary image data generation unit 216A, a function of detecting the pixel of which the pixel value is saturated from the image data, that is, a function of a saturation pixel detection unit 216B, and a function of generating the secondary image data items, that is, a function of a secondary image data generation unit 216C.

The primary image data generation unit 216A obtains the image signals of the corresponding light receiving sensor from each pixel of the image sensor, and generates m number of primary image data items. Since the imaging device 1 of the present embodiment includes four (m=4) light receiving sensors 120a to 120d of each pixel 110 of the image sensor 100, the imaging device generates four primary image data items.

The saturation pixel detection unit 216B analyzes the primary image data items generated by the primary image data generation unit 216A, and detects the pixel of which the pixel value is saturated. Specifically, the pixel of which the pixel value is the saturation value is detected from each primary image data item, and the pixel of the pixel value is saturated is detected. In a case where the pixel of which the pixel value is saturated is detected, information of the pixel position is recorded as saturation pixel positional information in the work memory 220.

The secondary image data generation unit 216C obtains the four primary image data items generated by the primary image data generation unit 216A, and generates n number of secondary image data items corresponding to the optical systems by performing the crosstalk removal processing. Since the imaging device 1 of the present embodiment includes two (n=2) optical systems in the imaging lens 10, two secondary image data items are generated. Specifically, the first secondary image data corresponding to the first optical system 20 and the second secondary image data corresponding to the second optical system 30 are generated.

As stated above, the crosstalk removal processing is performed for each pixel. In a case where the pixel as the processing target includes the primary image data of which the pixel value is saturated, the corresponding primary image data is removed, and the crosstalk removal processing is performed. The secondary image data generation unit 216C determines whether or not the pixel as the processing target includes the primary image data of which the pixel value is saturated while referring to the saturation pixel positional information stored in the work memory 220.

Here, in a case where the pixel as the processing target does not include the primary image data of which the pixel value is saturated, the secondary image data generation unit 216C generates the secondary image data items by solving the simultaneous equations $A1=s1*C11*B1+s1*C12*B2+ \ldots +s1*C1n*Bn$, $A2=s2*C21*B1+s2*C22*B2+ \ldots +s2*C2n*Bn, \ldots$, and $Am=sm*Cm1*B1+sm*Cm2*B2+ \ldots +sm*Cmn*Bn$. In the imaging device 1 of the present embodiment, since m=4 and n=2, the secondary image data items corresponding to the optical systems are generated by solving the simultaneous equations $A1=s1*C11*B1+s1*C12*B2$, $A2=s2*C21*B1+s2*C22*B2$, $A3=s3*C31*B1+s3*C32*B2$, and $A4=s4*C41*B1+s4*C42*B2$.

Meanwhile, in a case where the pixel as the processing target includes the primary image data of which the pixel value is saturated, the secondary image data items are generated by removing the corresponding primary image data and establishing the simultaneous equations.

In a case where the pixel values of all the primary image data items are saturated in the pixels as the processing targets, the pixel values of the secondary image data items in the corresponding pixels are the saturation values, and the secondary image data items are generated.

The secondary image data generation unit 216C performs processing for solving the simultaneous equations by using the matrix. That is, the secondary image data items are generated by solving the matrix equation $B=T^{-1}*A$. Information of the inverse matrix $T^{-1}$ used in the calculation is stored in the storage unit 222. The storage unit 222 includes an inverse matrix information storage unit 222A that stores the information of the inverse matrix $T^{-1}$ in a part of a storage region thereof. The information of the inverse matrix $T^{-1}$ is stored for each pixel. The information of the inverse matrix $T^{-1}$ is prepared by the number of combinations of expressions in a case where the simultaneous equations are established. The secondary image data generation unit 216C reads out the information of the inverse matrix $T^{-1}$ for each pixel to be processed, and performs the crosstalk removal processing.

<<Flow of Processing in Imaging Device (Image Data Generation Method)>>

In the imaging device of the present embodiment, image data items for recording are generated by performing (1) exposing based on an imaging instruction (exposing step), (2) generation of the primary image data based on the exposing (primary image data generation step), (3) detection (saturation pixel detection step) of the pixel of which the pixel value is saturated, and (4) generation of the secondary image data based on primary image data (secondary image data generation step) in this order.

The imaging (exposing) for recording is performed based on an instruction from the operating unit 228. Here, it is assumed that an instruction to perform the imaging for recording is transmitted by fully pressing the shutter button. A photographer performs the focus adjustment of each optical system, and then instructs that the imaging for recording is performed by fully pressing the shutter button.

In a case where the shutter button is fully pressed, photometric processing is initially performed. An exposure value (EV value) is calculated based on the image signals obtained from the system controller 226 and the image sensor 100, and the exposure is determined.

In a case where the exposure is determined, the image sensor 100 is exposed by using the determined exposure (exposing step). Electric charges are accumulated in the photoelectric conversion elements 130 of the light receiving sensors 120a to 120i through the exposing. The image sensor 100 reads out an electric charge amount accumulated in the photoelectric conversion element 130 of each of the light receiving sensors 120a to 120i, and outputs the image signal corresponding to the electric charge amount.

The image signal output from the image sensor 100 is taken into the work memory 220 through the analog signal processing unit 214. The digital signal processing unit 216 performs predetermined signal processing on the image signals taken into the work memory 220, and thus, the image data items (the first secondary image data and the second secondary image data) corresponding to the optical systems are generated. That is, the image signals of the light receiving sensors are obtained for each pixel, four primary image data items are generated (primary image data generation step), and the crosstalk removal processing is performed on the generated primary image data items. The secondary image data items (the first secondary image data and the second secondary image data) corresponding to the optical systems are generated (secondary image data generation step). At this time, in a case where the pixel as the processing target includes the primary image data of which the pixel value is saturated, the secondary image data items are generated by removing the corresponding primary image data and performing the crosstalk removal processing.

The generated image data items (the first secondary image data and the second secondary image data) are converted in a predetermined data format if necessary, and is recorded in the external memory 230.

As stated above, according to the imaging device 1 of the present embodiment, the plurality of images can be simultaneously captured by performing exposing once. According to the imaging device 1 of the present embodiment, the plurality of light receiving sensors 120a to 120d of which the combinations of crosstalk ratio and light sensitivity are different is included in each pixel 110 of the image sensor 100. Thus, the influence of the saturation of the light receiving sensor is removed, and it is possible to accurately the crosstalk.

Accordingly, it is possible to generate a high-quality image. It is possible to expand a dynamic range.

Modification Example of Imaging Device of First Embodiment

<Another Example of Adjustment Method of Light Sensitivity of Light Receiving Sensor>

Although it has been described in the embodiment that the light sensitivity of the light receiving sensors is adjusted by adjusting the transmittance of the filter, a method of adjusting the light sensitivity of the light receiving sensors is not limited thereto. For example, the light sensitivity of each light receiving sensor may be adjusted by adjusting a size of an opening of the light shielding mask provided on each light receiving sensor. In a case where an image sensor capable of adjusting an exposure time (shutter speed) for each light receiving sensor is used, the light sensitivity of each light receiving sensor maybe adjusted by adjusting the exposing time (shutter speed) for each light receiving sensor. The light sensitivity of each light receiving sensor may be adjusted by using the combinations thereof.

<Another Example of Adjustment Method of Crosstalk Ratio of Light Receiving Sensor>

Although it has been described in the embodiment that the crosstalk ratios of the light receiving sensors are adjusted depending on the shape of the light shielding mask, a method of adjusting the crosstalk ratios of the light receiving sensors is not limited thereto. For example, it is possible to adjust the crosstalk ratios by changing image forming characteristics of the microlens. For example, it is possible to change the crosstalk ratios by changing a lens power, a magnification, or an imaging position of the microlens. In this case, the light shielding mask is not needed.

It is possible to adjust the crosstalk ratios by using both the light shielding mask and the microlens. That is, it is possible to adjust the crosstalk ratios by changing both the shape of the light shielding mask and the image forming characteristics of the microlens.

<Relationship between Number (n) of Optical Systems and Number (m) of Light Receiving Sensor>

The number (m) of light receiving sensors included in each pixel of the image sensor may be larger than the number (n) of optical systems included in the imaging lens. That is, it is sufficient to satisfy the relationship of m>n. Accordingly, in a case where the number of optical systems included in the imaging lens 10 is two, at least three light receiving sensors may be included in each pixel.

Although it has been described in the embodiment that the four light receiving sensors is disposed in the array of 2 rows×2 columns (2×2) in each pixel of the image sensor, the arrangement of the light receiving sensors is not limited thereto. For example, the light receiving sensors may be disposed in an array of 1 row×4 columns (1×4). The light receiving sensors constituting each pixel may be discretely disposed. That is, the light receiving sensors constituting one pixel of the image sensor are light receiving sensors that generate the pixel values in the same pixel position in a case where the primary image data items are generated. In other words, in a case where the primary image data items are generated from the outputs of the image sensor, a set of light receiving sensors that generate the pixel values in the same pixel position is light receiving sensors constituting one pixel of the image sensor.

It is assumed that the number of optical systems included in the imaging lens is n (n>1) and the number of light receiving sensors included in each pixel of the image sensor is m (m>n). The crosstalk ratios of the light receiving sensors are $C1=C11:C12: \ldots :C1n$, $C2=C21:C22: \ldots : C2n, \ldots$, and $Cm=Cm1:Cm2: \ldots :Cmn$, and the coefficients corresponding to the light sensitivity of the light receiving sensors are $s1, s2, \ldots,$ and $sm$.

Assuming that the pixel values of the primary image data items are $A1, A2, \ldots,$ and $Am$ and the pixel values of the secondary image data items are $B1, B2, \ldots,$ and $Bn$, in a case where the linearity is established between the input and the output of the image sensor, the following relationships are established between the primary image data items and the secondary image data items.

$$A1 = s1*C11*B1 + s1*C12*B2 + \ldots + s1*C1n*Bn$$

$$A2 = s2*C21*B1 + s2*C22*B2 + \ldots + s2*C2n*Bn$$

$$\ldots$$

$$Am = sm*Cm1*B1 + sm*Cm2*B2 + \ldots + sm*Cmn*Bn$$

Accordingly, the number of optical systems included in the imaging lens is n (n>1) and the number of light receiving sensors included in each pixel of the image sensor is m (m>n), the secondary image data items in which the influence of the crosstalk is removed can be generated from the primary image data items by solving the simultaneous equations.

In a case where the simultaneous equations are established and the pixel as the processing target includes the primary image data of which the pixel value is saturated, the primary image data is removed, and the simultaneous equation is established. Accordingly, the influence of the saturation is eliminated, and thus, it is possible to accurately remove the crosstalk.

In a case where the simultaneous equation is solved by using the matrix, the matrix equation $B=T^{-1}*A$ is generated. Here, the matrix A is a matrix of m rows×1 column in which the pixel values A1, A2, . . . , and Am of the primary image data items are elements, and the matrix B is a matrix of n rows×1 column in which the pixel values B1, B2, . . . , and Bn of the secondary image data items are elements. The inverse matrix $T^{-1}$ is an inverse matrix of the matrix T of m rows×n columns in which the products s1*C1=s1*C11: s1*C12: . . . :s1*C1n, s2*C2=s2*C21:s2*C22: . . . :s2*C2n, . . . , and sm*Cm=sm*Cm1:sm*Cm2: . . . sm*Cmn of the crosstalk ratios of the light receiving sensors C1=C11: C12: . . . :C1n, C2=C21:C22: . . . :C2n, . . . , and Cm=Cm1:Cm2: . . . :Cmn and the coefficients corresponding to the light sensitivity of the light receiving sensors s1, s2, . . . , and sm are elements.

Although it has been described in the embodiment that the inverse matrix $T^{-1}$ is calculated for each pixel in advance and the calculated inverse matrix is stored in the inverse matrix information storage unit 222A, the inverse matrix $T^{-1}$ may be calculated at the time of the crosstalk removal processing.

<Another Example of Crosstalk Removal Processing>

Although it has been described in the embodiment that the processing method is switched for each pixel, the processing method may be switched for each image.

For example, it may be determined whether or not the plurality of generated primary image data items is saturated for each image, and the secondary image data items may be generated by using only the primary image data items which are not saturated.

The determination whether or not the primary image data items are saturated for each image means that it is determined whether or not there is the pixel of which the pixel value is saturated for each image. In a case where there is the pixel of which the pixel value is saturated, it is determined that the corresponding primary image data is saturated. In this case, the secondary image data items are generated by using the remaining primary image data items which are not saturated without using the corresponding primary image data items.

By performing the processing in this manner, it is possible to commonly perform the processing for all the pixels, and it is possible to simplify the whole processing. Accordingly, it is possible to accelerate the generation processing of the secondary image data items.

In a case where it is determined whether or not the primary image data items are saturated for each image, it may be determined that the primary image data is saturated in a case where there are a predetermined number or more of pixels of which the pixel value is saturated.

<Crosstalk Removal Processing in Case where Primary Image Data of which Pixel Value is Saturated is Included>

As stated above, in a case where the pixel as the processing target includes the primary image data of which the pixel value saturated, the corresponding primary image data is removed, and the crosstalk removal processing is performed.

However, in a case where the number of primary image data items to be removed becomes large, the number of relational expressions (relational expression established between the primary image data items and the secondary image data items) capable of being generated becomes also small. As a result, there are some cases where the number of relational expressions capable of being generated is smaller than the number of secondary image data items to be generated.

Since the number of relational expressions capable of being generated is the number of simultaneous equations to be established, in a case where the number of simultaneous equations to be established is smaller than the number of secondary image data items to be generated, the crosstalk is not able to be accurately removed.

Thus, the number of relational expressions capable of being generated is smaller than the number of secondary image data items to be generated, the pixel values of the secondary image data items in the corresponding pixel are calculated by performing the next processing.

It is assumed that the number of optical systems included in the imaging lens is n and the number of light receiving sensors included in each pixel of the image sensor is m.

It is assumed that the crosstalk ratios of the light receiving sensors C1=C11:C12: . . . :C1n, C2=C21:C22: . . . :C2n, . . . , and Cm=Cm1:Cm2: . . . :Cmn.

Since the number of secondary image data items to be generated is the number (n) of optical systems included in the imaging lens, the number of secondary image data items to be generated is n.

In a case where the number of primary image data items of which the pixel values are saturated is k (here, k is an integer satisfying k>0), the number of relational expressions capable of being generated is (m−k).

Initially, a label indicating an attribute is assigned to the light receiving sensor included in each pixel. The label indicating the attribute is a label indicating which optical system the corresponding light receiving sensor manages. Which optical system the corresponding light receiving sensor manages is determined by an optical system from which the light receiving sensor receives light the most. That is, which optical system the corresponding light receiving sensor manages is determined by which optical system has the most sensitivity. The attribute of each light receiving sensor is calculated from information of the crosstalk ratio. For example, in a case where a crosstalk ratio Cm of a certain light receiving sensor is Cm1:Cm2: . . . :Cmn=first optical system:second optical system: . . . :m-th optical system, the attribute of the light receiving sensor is the first optical system in a case where Cm1 is a maximum value. Accordingly, a label indicating that the attribute is the first optical system is assigned to the light receiving sensor.

[Processing in Case Where (m−k)<n] A case where (m−k) <n is a case where the number (m−k) of simultaneous equations capable of being generated is smaller than the number (n) of secondary image data items to be generated.

In this case, the secondary image data items of the corresponding pixel are generated based on the pixel values of the primary image data items which are not saturated. The generation is performed as follows.

The first secondary image data is image data corresponding to the first optical system. Accordingly, the pixel value B1 of the first secondary image data is generated based on the pixel values output from the light receiving sensors of which the attribute is the first optical system. That is, the first secondary image data is generated based on the pixel values output from the light receiving sensors assigned to the label indicating the attribute managed by the first optical system.

Here, in a case where there are the pixel values output from the light receiving sensors of which the attribute is the first optical system but all the pixels are saturated, the saturation value is the pixel value of the first secondary image data in the corresponding pixel.

Meanwhile, in a case where there are the pixel values output from the light receiving sensors of which the attribute is the first optical system and there is the pixel value which is not saturated, this pixel value is determined as the pixel value of the first secondary image data in the corresponding pixel. In a case where there is the plurality of pixel values which are output from the light receiving sensors of which the attribute is the first optical system and is not saturated, an average value of the pixel values is determined as the pixel value of the first secondary image data in the corresponding pixel.

The pixel values of the remaining secondary image data items are calculated by using the same method. That is, since the n-th secondary image data is the image data corresponding to the n-th optical system, the pixel value Bn of the n-th secondary image data is generated based on the pixel values output from the light receiving sensors of which the attribute is the n-th optical system. That is, the n-th secondary image data is generated based on the pixel values output from the light receiving sensors of which the label indicating the attribute is the n-th optical system.

Here, in a case where there are the pixel values output from the light receiving sensors of which the attribute is the n-th optical system but all the pixel values are saturated, the pixel value of the n-th secondary image data in the corresponding pixel is determined as the saturation value. Meanwhile, in a case where there are the pixel values output from the light receiving sensors of which the attribute is the n-th optical system and there is the pixel value which is not saturated, this pixel value is determined as the pixel value of the n-th secondary image data in the corresponding pixel. In a case where there is the plurality of pixel values which is output from the light receiving sensors of which the attribute is the n-th optical system and is not saturated, an average value thereof is determined as the pixel value of the n-th secondary image data in the corresponding pixel.

In the imaging device 1 of the present embodiment, since the number of optical systems included in the imaging lens 10 is two (n=2) and the number of light receiving sensors 120a to 120d included in each pixel 110 of the image sensor 100 is four (m=4), in a case where the number (m−k) of simultaneous equations capable of being generated is one, the processing is performed.

In the imaging device 1 of the present embodiment, the attributes of the first light receiving sensor 120a and the second light receiving sensor 120b are the first optical system, and the attributes of the third light receiving sensor 120c and the fourth light receiving sensor 120d are the second optical system.

For example, it is assumed that the first light receiving sensor 120a, the second light receiving sensor 120b, and the third light receiving sensor 120c are saturated in the specific pixel. In this case, the pixel value of the secondary image data in the corresponding pixel is calculated based on the pixel value output from the fourth light receiving sensor 120d which is not saturated. Since the attribute of the fourth light receiving sensor 120d is the second optical system, the pixel value of the second secondary image data in the corresponding pixel is determined as the pixel value output from the fourth light receiving sensor 120d, that is, the pixel value of the fourth primary image data. Meanwhile, the pixel value of the first secondary image data is determined as the saturation value.

As stated above, the number of simultaneous equations capable of being generated is smaller than the number of secondary image data items to be generated, the pixel values of the secondary image data items in the corresponding pixels are calculated based on the pixel value of the primary image data output from the light receiving sensor which is not saturated. Accordingly, it is possible to reduce the influence of the saturation.

Figure 35:
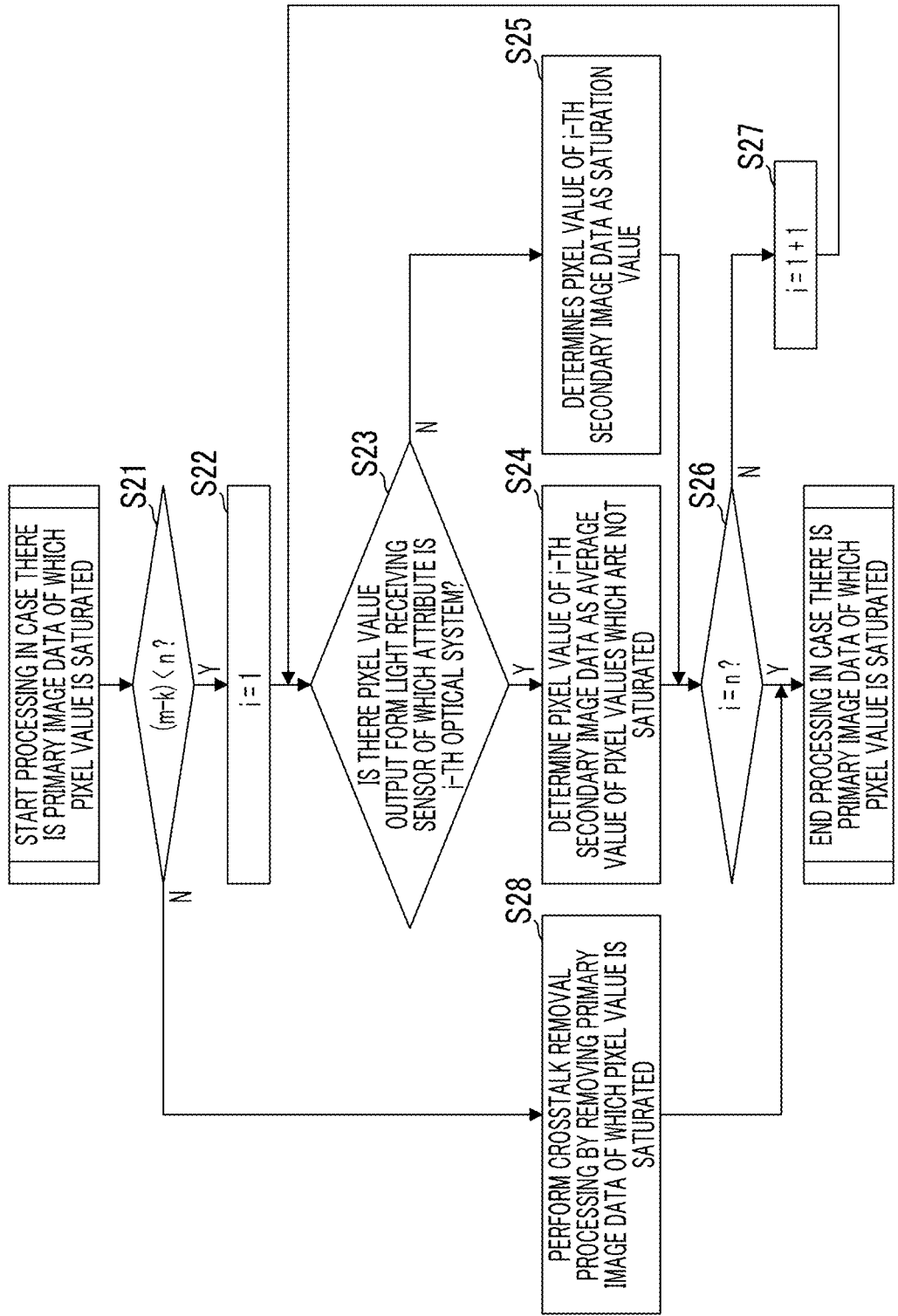
FIG. 35 is a flowchart showing a processing procedure in a case where the pixel as the processing target includes the primary image data of which the pixel value is saturated.

FIG. 35 is a flowchart showing a processing procedure of the present example, and is a flowchart showing a processing procedure in a case where the pixel as the processing target includes the pixel value output from the saturated light receiving sensor.

Initially, it is determined that the number (m−k) of simultaneous equations capable of being generated is smaller than the number (n) of secondary image data items to be generated (step S21).

Initially, in a case where the number (m−k) of simultaneous equations capable of being generated is larger than the number (n) of secondary image data items to be generated, the primary image data items of which the pixel values are saturated are removed, and the crosstalk removal processing is performed (step S28).

Meanwhile, in a case where the number (m−k) of simultaneous equations capable of being generated is smaller than the number (n) of secondary image data items to be generated, a variable i is set to be 1 (step S22). It is determined whether or not there is the pixel value output from the light receiving sensor of which the attribute is the i-th optical system among the pixel values output from the light receiving sensors which are not saturated (step S23).

In a case where there is no pixel value output from the light receiving sensor of which the attribute is the i-th optical system among the pixel values output from the light receiving sensors which are not saturated, the pixel value of the i-th secondary image data is set as the saturation value (step S25).

In a case where there is the pixel value output from the light receiving sensor of which the attribute is the i-th optical system among the pixel values output from the light receiving sensors which are not saturated, an average value of the pixel values output from the light receiving sensors of which the attribute is the i-th optical system is set as the pixel value of the i-th secondary image data (step S24).

After step S24 or step S25, it is determined whether or not the variable i satisfies i=n (step S26). That is, it is determined whether or not the pixel values of all the secondary image data items are calculated. In a case where the pixel values of all the secondary image data items are calculated, the processing in the corresponding pixel is ended.

Meanwhile, in a case where the obtaining of the pixel values of all the secondary image data items is not completed (i≠n), the variable i is increased (step S27). Thereafter, the processing returns to step S23, and the processing in step S23 and the subsequent steps is performed again.

As stated above, in a case where the number of simultaneous equations capable of being generated is smaller than the number of secondary image data items to be generated, the pixel value of each secondary image data item is calculated based on the pixel values of the primary image data items output from the light receiving sensors which are not saturated.

The information of the label indicating the attribute of each light receiving sensor is stored as attribute label information in the storage unit 222. The digital signal processing unit 216 performs the processing while referring to the attribute label information stored in the storage unit 222.

Second Embodiment

It has been described in the imaging device 1 of the first embodiment that the m number of primary image data items of which the combinations of the crosstalk ratio and light sensitivity are different by using the image sensor including the m number of light receiving sensors of which the combinations of crosstalk ratio and light sensitivity are different in each pixel.

An imaging device 1α of the present embodiment generates m number of primary image data items of which combinations of crosstalk ratio and light sensitivity are different by performing exposing multiple times with different exposure values.

The secondary image data items corresponding to the optical systems are generated based on the m number of generated primary image data items.

Figure 36:
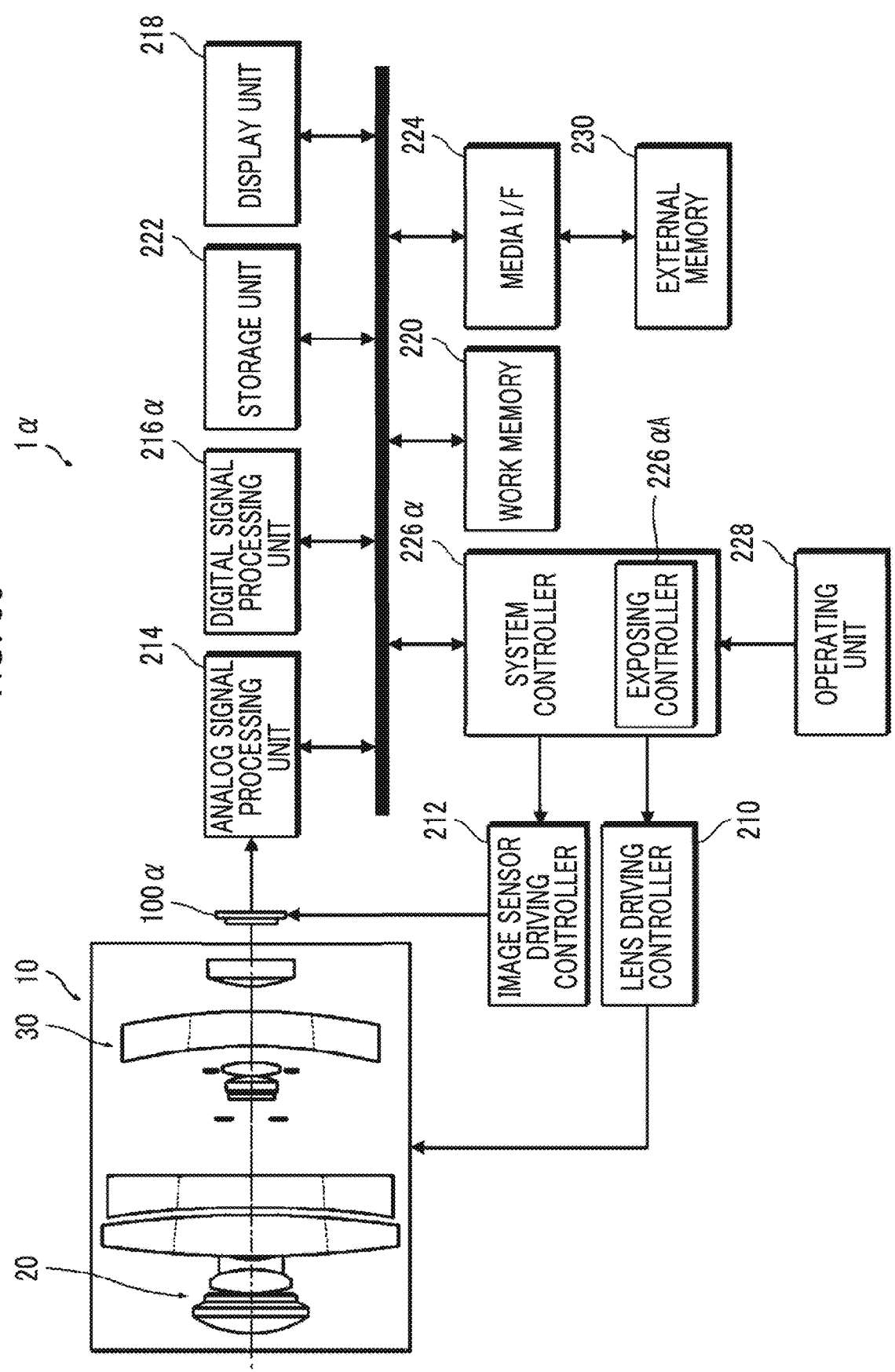
FIG. 36 is a block diagram showing a system configuration of an imaging device of a second embodiment.

FIG. 36 is a block diagram showing a system configuration of an imaging device of a second embodiment.

The imaging device of the second embodiment has the same configuration as that of the imaging device 1 of the first embodiment except for the configuration related to the generation of the primary image data. That is, the imaging device includes an imaging lens 10, an image sensor 100α, a lens driving controller 210, an image sensor driving controller 212, an analog signal processing unit 214, a digital signal processing unit 216α, a display unit 218, a work memory 220, a storage unit 222, a media interface 224, a system controller 226α, and an operating unit 228.

The imaging lens 10 includes two optical systems of a first optical system 20 and a second optical system 30 (n=2).

Light receiving sensors which are equal to or larger than the number of optical systems included in the imaging lens may be included in each pixel 110α of the image sensor 100α.

In the present embodiment, two light receiving sensors are provided.

Figure 37:
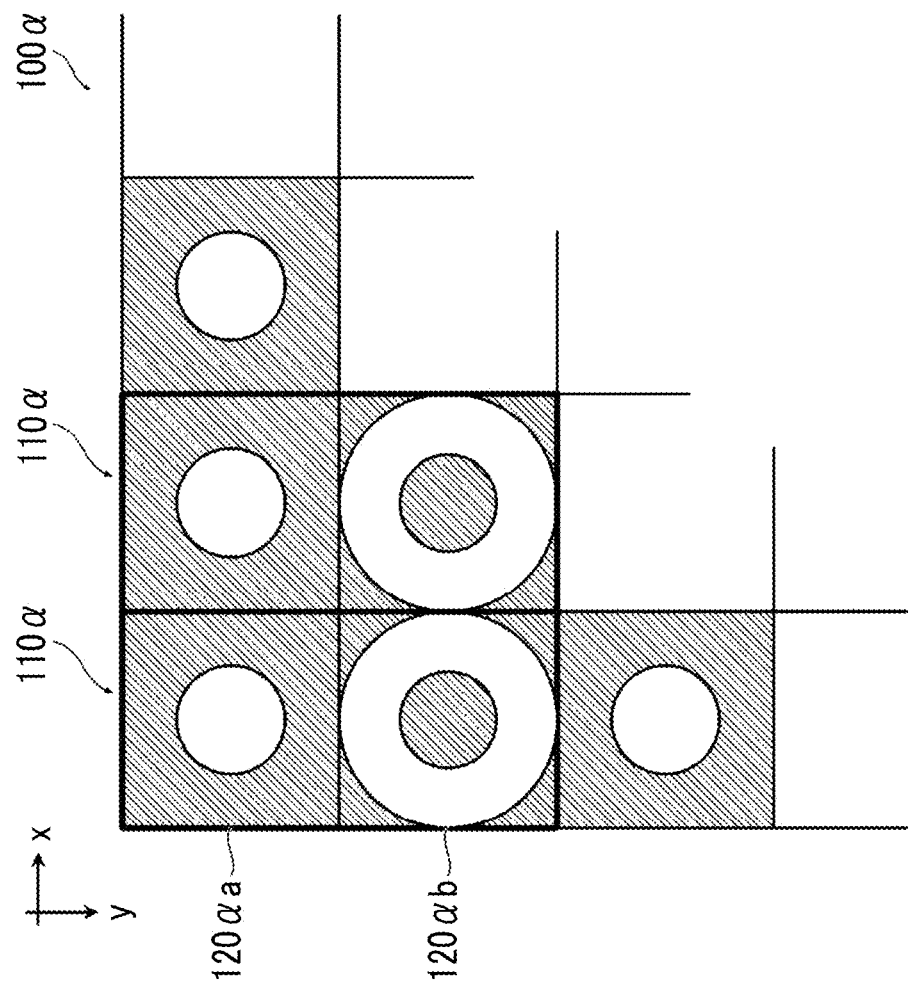
FIG. 37 is a partially enlarged front view of the image sensor.

FIG. 37 is a partially enlarged front view of the image sensor.

As shown in this drawing, two light receiving sensors 120αa and 120αb are included in each pixel 110α of the image sensor 100α. It is assumed that the light receiving sensor assigned the reference 120αa is a first light receiving sensor, and the light receiving sensor assigned the reference 120αb is a second light receiving sensor. The first light receiving sensor 120αa and the second light receiving sensor 120αb are light receiving sensors of which crosstalk ratios are different from each other. The first light receiving sensor 120αa is the light receiving sensor that mainly receives light rays from the first optical system 20, and the second light receiving sensor 120αb is the light receiving sensor that mainly receives light rays from the second optical system 30.

The exposing is controlled by the system controller 226α. The system controller 226α functions as an exposing controller 226αA by executing a predetermined exposing control program.

In a case where an imaging instruction is received, the exposing controller 226αA exposes the image sensor 100α with different exposure values multiple times. In the present embodiment, the exposing is performed twice. The exposing is performed twice with an exposure value which is a proper exposure and an exposure value which is smaller than the proper exposure by a predetermined amount. The exposure value which is the proper exposure mentioned herein is an exposure value calculated through photometry. The exposure value is determined by the combination of the stop (F number) of the imaging lens, an exposing time (shutter speed), and sensitivity. The exposing is continuously performed.

It is possible to generate four primary image data items by performing the exposing twice. The primary image data items are generated by the digital signal processing unit 216αa.

Figure 38:
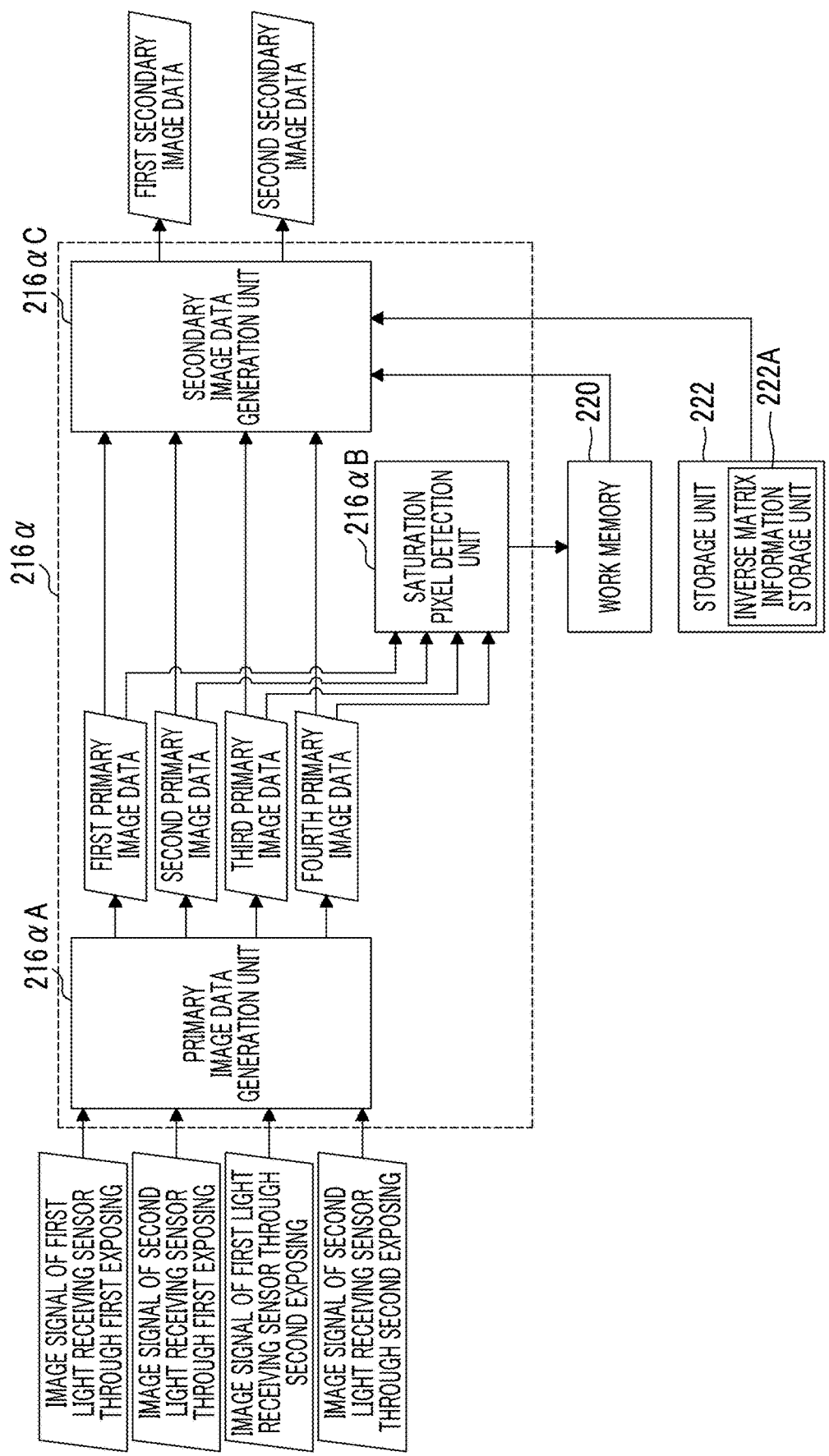
FIG. 38 is a block diagram of a function of a digital signal processing unit.

FIG. 38 is a block diagram of a function of the digital signal processing unit.

Similarly to the imaging device 1 of the first embodiment, the digital signal processing unit 216α has a function of generating the primary image data items, that is, a function of a primary image data generation unit 216αA, a function of detecting the pixel of which the pixel value is saturated from the image data, that is, a function of a saturation pixel detection unit 216αB, and a function of generating the secondary image data items, that is, a function of a secondary image data generation unit 216αC.

The primary image data generation unit 216αA obtains the image signals of the corresponding light receiving sensor from each pixel 110α of the image sensor 100α, and generates the primary image data items. The image signals are obtained from the first light receiving sensor 120αa of each pixel through first exposing, and one primary image data item is generated. It is assumed that the primary image data is first primary image data. The image signals are obtained from the second light receiving sensor 120αb of each pixel through the first exposing, and one primary image data item is generated. It is assumed that the primary image data is second primary image data. The image signals are obtained from the first light receiving sensor 120αa of each pixel through second exposing, and one primary image data item is generated. It is assumed that the primary image data is third primary image data. The image signals are obtained from the second light receiving sensor 120αb of each pixel through the second exposing, and one primary image data item is generated. it is assumed that the primary image data is fourth primary image data item. As stated above, it is possible to generate the four primary image data items in total by performing the exposing two times.

The saturation pixel detection unit 216αB analyzes the primary image data items generated by the primary image data generation unit 216αA, and detects the pixel of which the pixel value is saturated. A method of detecting the pixel of which the pixel value is saturated is the same as that using the imaging device of the first embodiment.

The secondary image data generation unit 216αC obtains the four primary image data items generated by the primary image data generation unit 216αA, and generates n number of secondary image data items corresponding to the optical system by performing the crosstalk removal processing. The method of the crosstalk removal is the same as that in the imaging device 1 of the first embodiment. Accordingly, the detailed description thereof will be omitted.

The coefficients s1, s2, . . . , and sm corresponding to the light sensitivity of the light receiving sensors which are required at the time of the crosstalk removal processing are set as coefficients e1, e2, . . . , and em corresponding to the exposure values at the time of exposing the primary image data items.

Figure 39:
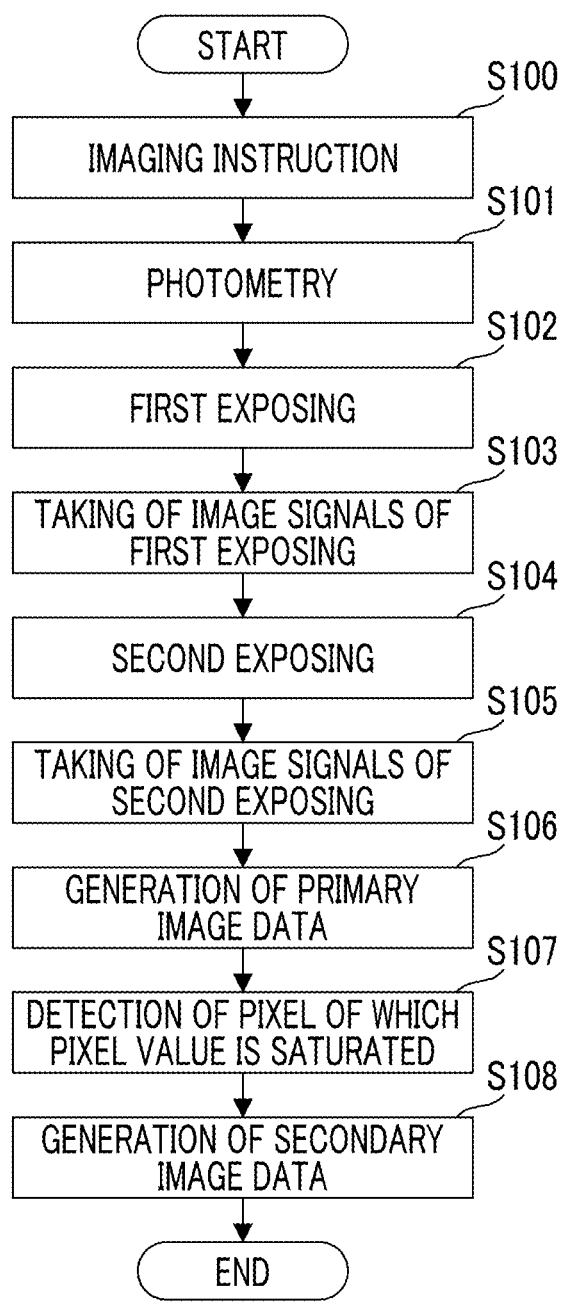
FIG. 39 is a flowchart showing a procedure of the generation processing of the image data items using the imaging device of the second embodiment.

FIG. 39 is a flowchart showing a procedure of the generation processing of the image data items using the imaging device of the second embodiment.

In a case where the imaging instruction is received (step S100), the photometric processing is performed (step S101). The exposure value of the first exposing and the exposure value of the second exposing are determined based on the photometry result. The exposure value of the first exposing is an exposure value which is the proper exposure. The exposure value of the second exposing is an exposure value which is smaller than the proper exposure by a predetermined amount.

After the determination of the exposure value, the first exposing is performed (step S102). After the exposing, the image signals of the first exposing are taken (step S103).

The image signals are stored in the work memory 220.

Subsequently, the second exposing of which the exposure is changed is performed (step S104). After the exposing, the image signals of the second exposing are taken (step S105). The image signals are also stored in the work memory 220.

After the second exposing, the primary image data is generated from the taken image signals (step S106). The pixel of which the pixel value is saturated from the generated primary image data is detected (step S107). Thereafter, the crosstalk removal processing is performed by using the positional information of the detected pixel, and the secondary image data is generated (step S108).

As stated above, it is possible to generate the secondary image data items by generating the plurality of primary image data items by performing the exposing multiple times and performing the crosstalk removal processing on the generated primary image data items. Accordingly, similarly to the imaging device 1 of the first embodiment, the influence of the saturation is eliminated, and thus, it is possible to accurately remove the influence of the crosstalk.

Modification Example of Imaging Device of Second Embodiment

<Number of Light Receiving Sensors>

The number of light receiving sensors included in each pixel may be larger than the number of optical systems included in the imaging lens. Accordingly, as long as the number of optical systems included in the imaging lens is two, two or more light receiving sensors may be included in each pixel.

The light receiving sensors of which the combinations of crosstalk ratio and light sensitivity are different may be included in each pixel.

<Number of Times of Exposing>

The exposing may be performed at least twice. It is preferable that the exposing is performed with the exposure value which is smaller than the proper exposure in a case where the exposing is performed at least once. It is preferable that the exposure value is set such that the exposing time does not become long by a predetermined time or more. In a case where the exposing time becomes long, the influence of image blurring occurs.

Other Embodiments

<<Modification Example of Imaging Lens>>

Although it has been described in the embodiment that two optical systems are included in the imaging lens, the number (n) of optical systems included in the imaging lens is not limited thereto. Two or more optical systems of which imaging characteristics are different from each other may be included in the imaging lens.

Although it has been described in the embodiment that the optical systems of which focal lengths are different are included in the imaging lens, the kind of the optical system included in the imaging lens is not limited thereto. For example, the optical systems of which focusing distances are different from each other may be provided. Accordingly, images of which focusing distances are different from each other, such as an image focused on a subject present in a short range and an image focused on a subject present in a long range, can be simultaneously captured. For example, optical systems of which transmission wavelength characteristics are different from each other may be provided. Accordingly, an optical system that transmits light rays of an infrared light range and an optical system that transmits light rays of a visible light range are provided, and thus, an infrared light image and a visible light image can be simultaneously captured.

Although it has been described in the embodiment that the plurality of optical systems is concentrically disposed, the arrangement of the plurality of optical systems is not limited thereto. For example, a region may be divided in a circumferential direction by using an optical axis as a center, and the optical systems may be disposed in the regions.

<<Modification Example of Crosstalk Removal Processing>>

As stated above, in a case where the crosstalk removal processing is performed for each pixel by using the matrix, the information of the inverse matrix $C^{-1}$ is read out for each pixel, and the crosstalk removal processing is performed. Accordingly, the information of the inverse matrix $C^{-1}$ is stored in the inverse matrix information storage unit 222A for each pixel. Meanwhile, the crosstalk ratios of the light receiving sensors included in each pixel approximate between the pixels, a representative inverse matrix may be determined, and the crosstalk removal processing may be performed. That is, the crosstalk removal processing may be performed by using a common inverse matrix to the pixels. Accordingly, it is possible to reduce a calculation load. A screen may be divided into a plurality of regions, and a common inverse matrix may be determined for each region.

<<Case where Pixel Value is Equal to or Smaller than Noise Level>>

In a case where the pixel value of the primary image data is equal to or smaller than a noise level, a predetermined relationship is not established between the secondary image data items and the primary image data items.

Accordingly, it is preferable that the secondary image data items are generated by removing the corresponding primary image data items in a case where the pixel as the processing target includes the primary image data of which the pixel value is equal to or smaller than the noise level.

That is, the crosstalk removal processing is performed by using only the primary image data in which the linearity is secured between the input and the output, and thus, it is possible to generate the secondary image data items.

<<Generation of Color Image>>

Although it has been described in the embodiment that a color image is not mentioned for the sake of convenience in description, color filters are disposed in each pixel in a predetermined filter array in a case where the color image is generated. Accordingly, it is possible to generate a color image.

EXAMPLE

In order to check the effects of the present invention, a test in which the crosstalk removal processing according to the present invention is performed on artificially generated primary image data items and the secondary image data items are generated was performed.

<Generation of Primary Image Data>

Figure 40:
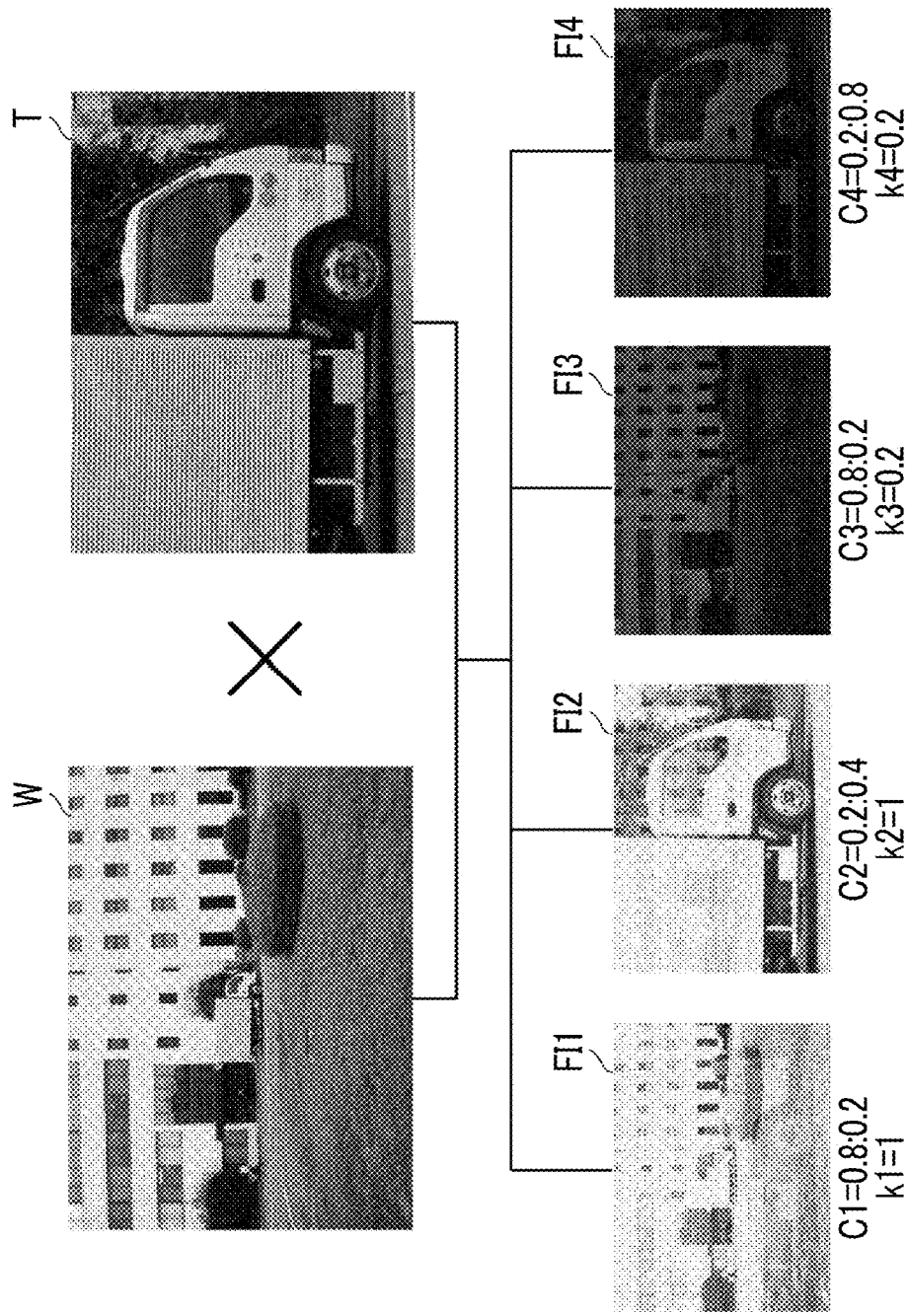
FIG. 40 is a conceptual diagram of the generation of the primary image data.

FIG. 40 is a conceptual diagram of the generation of the primary image data.

The primary image data items were artificially generated by combining to two image data items W and T. The number of images to be combined corresponds to the number (n) of optical systems included in the imaging lens. Since two image data items W and T are combined, the number of optical systems included in the imaging lens is two (n=2).

The number of primary image data items to be generated corresponds to the number (m) of light receiving sensors included in each pixel of the image sensor. The four primary image data items were generated. In this case, the number of light receiving sensors included in each pixel of the image sensor is four (m=4). It is assumed that the four primary image data items are first primary image data FI1, second primary image data FI2, third primary image data FI3, and fourth primary image data FI4.

A combination ratio (ratio at which two image data items W and T are combined) at the time of combination corresponds to the crosstalk ratio. It was assumed that the crosstalk ratio C1 of the first primary image data FI1 is W:T=0.8:0.2, the crosstalk ratio C2 of the second primary image data FI2 is W:T=0.2:0.8, the crosstalk ratio C3 of the third primary image data FI3 is W:T=0.8:0.2, and the crosstalk ratio C4 of the fourth primary image data FI4 is W:T=0.2:0.8.

The brightness of each image was adjusted, and the light sensitivity was artificially adjusted. The brightness of the third primary image data FI3 and the fourth primary image data FI4 with respect to the first primary image data FI1 and the second primary image data FI2 was set to be ⅕. In this case, the coefficients s1, s2, s3, and s4 corresponding to the light sensitivity are s1=1, s2=1, s3=0.2, and s4=0.2.

The four primary image data items FI1 to FI4 of which the combinations of crosstalk ratio and light sensitivity are different were generated.

<Generation of Secondary Image Data>

(1) Present Invention

Figure 41:
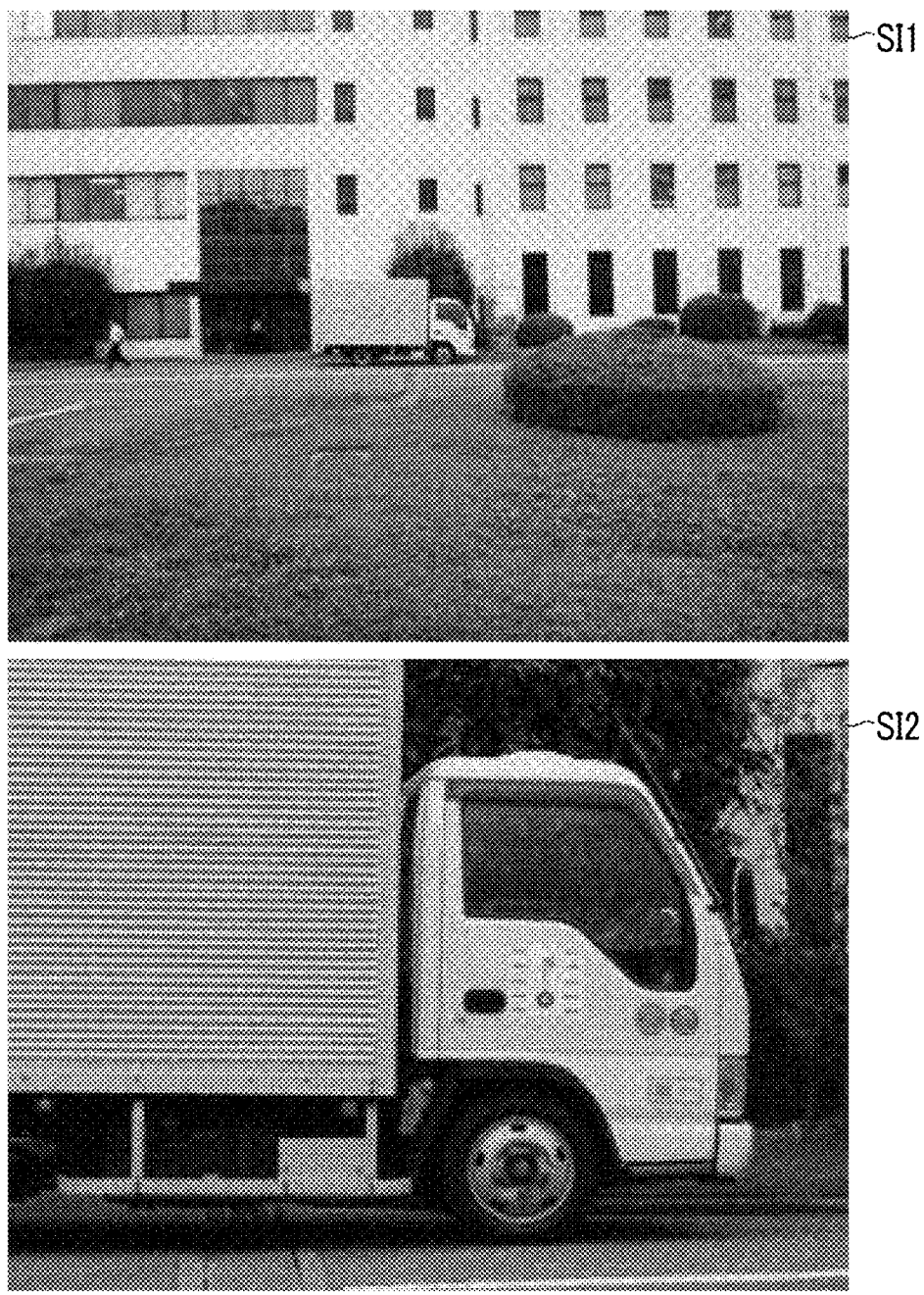
FIG. 41 shows images represented by the secondary image data items generated through the image data generation method according to the present invention.

FIG. 41 shows images represented by the secondary image data items generated through the image data generation method according to the present invention.

That is, the crosstalk removal processing was performed on the four primary image data items (the first primary image data FI1, the second primary image data FI2, the third primary image data FI3, and the fourth primary image data FI4) by using the method of the present invention, and the two secondary image data items (the first secondary image data SI1 and the second secondary image data SI2) were generated.

As shown in this drawing, it was checked that the influence of the saturation was eliminated and the influence of the crosstalk is able to be removed from two images.

(2) Comparison Example

Figure 42:
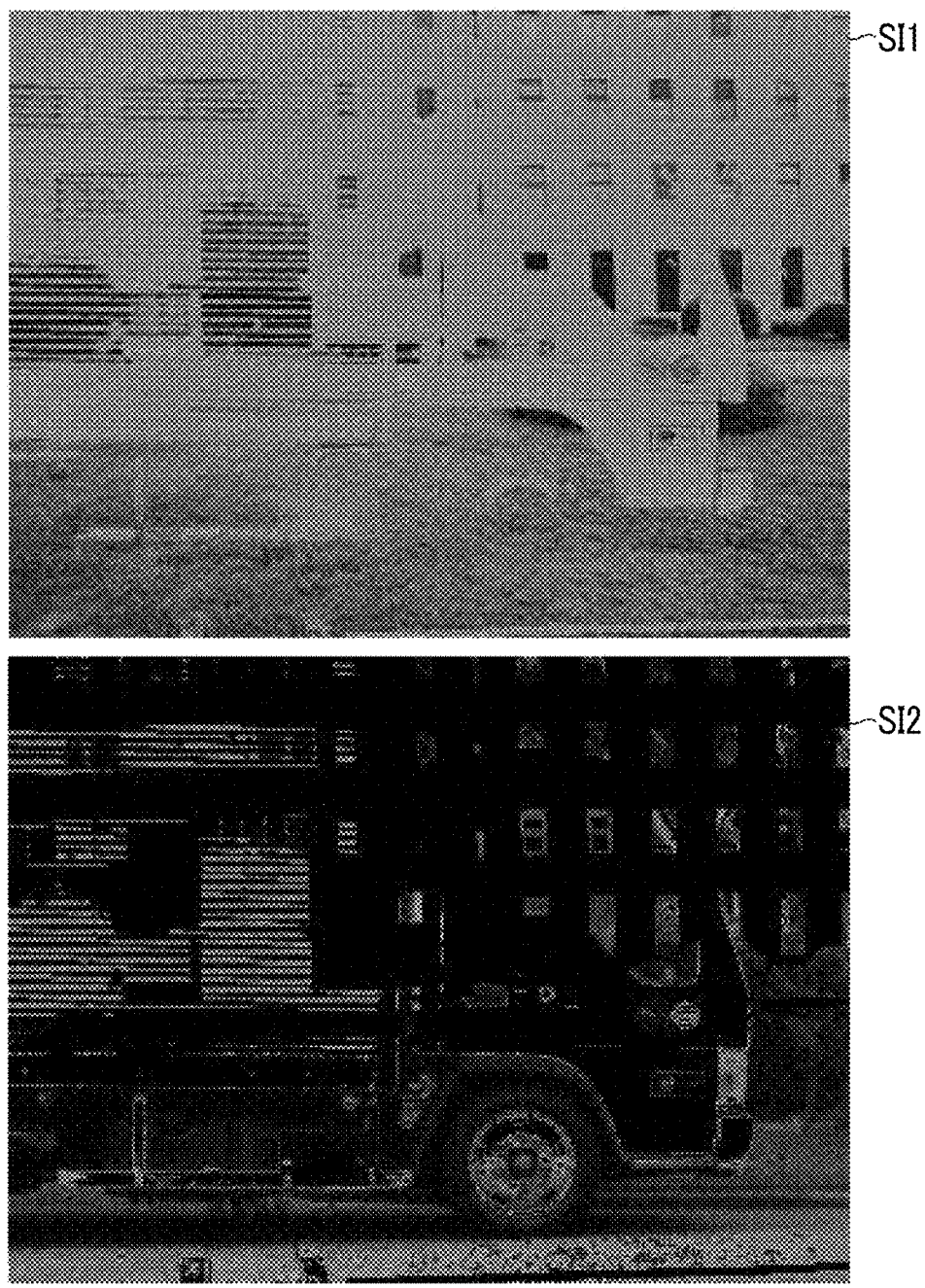
FIG. 42 shows images represented by the secondary image data items generated through the method of the related art.

FIG. 42 shows images represented by the secondary image data items generated through the method of the related art.

The crosstalk removal processing was performed on the first primary image data FI1 and the second primary image data FI2 through the method of the related art, and the two secondary image data items (the first secondary image data SI1 and the second secondary image data SI2) were generated.

As shown in this drawing, it was checked that the failure of the generated images (secondary image data items) occurs due to the influence of the saturation.

EXPLANATION OF REFERENCES 1 imaging device
1α imaging device
10 imaging lens
20 first optical system
22 stop
30 second optical system
30a first lens
30b second lens
30c third lens
30d main mirror
30e secondary mirror
32 stop
40 common lens
100 image sensor
100α image sensor
110 pixel
110α pixel
120a first light receiving sensor
120b second light receiving sensor
120c third light receiving sensor
120d fourth light receiving sensor
120e light receiving sensor
120f light receiving sensor
120g light receiving sensor
120h light receiving sensor
120i light receiving sensor
120αa first light receiving sensor
120αb second light receiving sensor
130 photoelectric conversion element
132 microlens
134 light shielding mask
134A opening portion
136 filter
210: lens driving controller
212: image sensor driving controller
214: analog signal processing unit
216: digital signal processing unit
216A primary image data generation unit
216B saturation pixel detection unit
216C secondary image data generation unit
216α digital signal processing unit
216αA primary image data generation unit
216αB saturation pixel detection unit
216αC secondary image data generation unit
218 display unit
220 work memory
222 storage unit
222A inverse matrix information storage unit
224 media interface
226 system controller
226α system controller
226αA exposing controller
228 operating unit
230 external memory
FI1 first primary image data
FI2 second primary image data
FI3 third primary image data
FI4 fourth primary image data
L optical axis
L1 region
L2 region
SI1 first secondary image data
SI2 second secondary image data
S1 to S11 steps at the time of generation processing of secondary image data
S21 to S27 steps of processing in case there is primary image data of which pixel value is saturated.

What is claimed is:

1. An imaging device comprising:
   an imaging lens that includes n number of optical systems of which imaging characteristics are different in which n is an integer satisfying n>1;
   an image sensor that includes m number of light receiving sensors of which combinations of crosstalk ratio and light sensitivity are different in each pixel in which m is an integer satisfying m>n;
   a primary image data generation unit that generates m number of primary image data items by obtaining image signals output from the light receiving sensors of each pixel of the image sensor;
   a saturation pixel detection unit that detects a pixel of which a pixel value is saturated from the primary image data items; and
   a secondary image data generation unit that generates n number of secondary image data items corresponding to the optical systems by performing crosstalk removal processing on the m number of primary image data items for each pixel, the secondary image data generation unit generating the secondary image data items by removing the primary image data of which a pixel value is saturated and performing the crosstalk removal processing on remaining primary image data items in a case where a processing target includes the primary image data of which the pixel value is saturated.

2. The imaging device according to claim 1,
   wherein the secondary image data generation unit generates the secondary image data items by solving the following simultaneous equations $$A1 = s1*C11*B1 + s1*C12*B2 + \ldots + s1*C1n*Bn$$
$$A2 = s2*C21*B1 + s2*C22*B2 + \ldots + s2*C2n*Bn$$
$$\ldots$$
$$Am = sm*Cm1*B1 + sm*Cm2*B2 + \ldots + sm*Cmn*Bn$$

as the crosstalk removal processing in a case where pixel values of the primary image data items are A1, A2, ..., and Am, pixel values of the secondary image data items are B1, B2, ..., and Bn, crosstalk ratios of the light receiving sensors are C1=C11:C12: ... :C1n, C2=C21:C22: ... :C2n, ..., and Cm=Cm1:Cm2: ... :Cmn, and coefficients corresponding to light sensitivity of the light receiving sensors are s1, s2, ..., and sm, and
   generates the secondary image data items by removing the primary image data of which a pixel value is saturated and establishing the simultaneous equations in a case where a pixel as a processing target includes the primary image data of which the pixel value is saturated.

3. The imaging device according to claim 1,
   wherein the secondary image data generation unit generates the secondary image data items by solving the following matrix equation $$B = T^{-1} * A$$

as the crosstalk removal processing in a case where a matrix of m rows×1 column in which pixel values A1, A2, ..., and Am of the primary image data items are elements is A, a matrix of n rows×1 column in which pixel values B1, B2, ..., and Bn of the secondary image data items are elements is B, a matrix of m rows×n columns in which products s1*C1=s1*C11: s1*C12: ... :s1*C1n, s2*C2=s2*C21:s2*C22: ... :s2*C2n, ..., and sm*Cm=sm*Cm1: sm*Cm2: ... :sm*Cmn of crosstalk ratios C1=C11: C12: ... :C1n, C2=C21:C22: ... :C2n, ..., and Cm=Cm1:Cm2: ... :Cmn of the light receiving sensors and coefficients s1, s2, ..., and sm corresponding to light sensitivity of the light receiving sensors are elements is T, and an inverse matrix of the T is $T^{-1}$, and
   generates the secondary image data items by removing the primary image data of which the pixel value is saturated and establishing the matrix equation in a case where a pixel as a processing target includes the primary image data of which the pixel value is saturated.

4. The imaging device according to claim 3, further comprising:
   an inverse matrix information storage unit that stores information of the inverse matrix $T^{-1}$,
   wherein the secondary image data generation unit solves the matrix equation by using the information of the inverse matrix $T^{-1}$ stored in the inverse matrix information storage unit.

5. The imaging device according to claim 4,
   wherein the inverse matrix information storage unit stores the information of the inverse matrix $T^{-1}$ for each pixel.

6. The imaging device according to claim 1,
   wherein, in a case where a pixel as a processing target includes k number of primary image data items of which pixel values are saturated in which k is an integer satisfying k>0 and a relationship of (m−k)<n is satisfied, the secondary image data generation unit calculates a pixel value of the secondary image data in the pixel as the processing target based on a pixel value of the primary image data which is not saturated and a crosstalk ratio of the primary image data which is not saturated without performing the crosstalk removal processing.

7. The imaging device according to claim 6,
   wherein, in a case where m=k, the secondary image data generation unit determines the pixel value of the secondary image data in the pixel as the processing target, as a saturation value.

8. The imaging device according to claim 1,
   wherein the light receiving sensor includes
   a photoelectric conversion element,
   a microlens that forms an image of an emission pupil of the imaging lens on the photoelectric conversion element, and
   a light shielding mask that is disposed between the microlens and the light receiving sensor, and
   a difference in shape of the light shielding mask causes a difference in light sensitivity.

9. The imaging device according to claim 1,
   wherein the light receiving sensor includes a filter, and
   a difference in transmittance of the filter causes a difference in light sensitivity.

10. The imaging device according to claim 1,
    wherein the plurality of optical systems included in the imaging lens has different focal lengths from each other.

11. The imaging device according to claim 1,
    wherein the plurality of optical systems included in the imaging lens has different focusing distances.

12. The imaging device according to claim 1,
wherein the plurality of optical systems included in the imaging lens has different transmission wavelength characteristics.

13. The imaging device according to claim 1,
wherein the plurality of optical systems included in the imaging lens is concentrically disposed with each other.

14. An imaging device comprising:
an imaging lens that includes n number of optical systems of which imaging characteristics are different in which n is an integer satisfying n>1;
an image sensor that includes n number of light receiving sensors or more of which crosstalk ratios are different in each pixel;
an exposing controller that exposes the image sensor with different exposure values multiple times;
a primary image data generation unit that generates m number of primary image data items in which m>n by obtaining image signals output from the light receiving sensors of each pixel of the image sensor whenever the exposing is performed;
a saturation pixel detection unit that detects a pixel of which a pixel value is saturated from the primary image data items; and
a secondary image data generation unit that generates n number of secondary image data items corresponding to the optical systems by performing crosstalk removal processing on the m number of primary image data items for each pixel, the secondary image data generation unit generating the secondary image data items by removing the primary image data of which a pixel value is saturated and performing the crosstalk removal processing on remaining primary image data items in a case where a processing target includes the primary image data of which the pixel value is saturated.

15. The imaging device according to claim 14,
wherein the secondary image data generation unit generates the secondary image data items by solving the following simultaneous equations $$A1 = e1*C11*B1 + e1*C12*B2 + \ldots + e1*C1n*Bn$$
$$A2 = e2*C21*B1 + e2*C22*B2 + \ldots + e2*C2n*Bn$$
$$\ldots$$
$$Am = em*Cm1*B1 + em*Cm2*B2 + \ldots + em*Cmn*Bn$$

as the crosstalk removal processing in a case where pixel values of the primary image data items are A1, A2, ..., and Am, pixel values of the secondary image data items are B1, B2, ..., and Bn, crosstalk ratios of the light receiving sensors corresponding to the primary image data items are C1=C11:C12: ... :C1n, C2=C21:C22: ... :C2n, ..., and Cm=Cm1:Cm2: ... :Cmn, and coefficients corresponding to exposure values at the time of exposing the primary image data items are e1, e2, ..., and em, and
generates the secondary image data items by removing the primary image data of which a pixel value is saturated and establishing the simultaneous equations in a case where a pixel as a processing target includes the primary image data of which the pixel value is saturated.

16. The imaging device according to claim 14,
wherein the secondary image data generation unit generates the secondary image data items by solving the following matrix equation $$B = T^{-1}*A$$

as the crosstalk removal processing in a case where a matrix of m rows×1 column in which pixel values A1, A2, ..., and Am of the primary image data items are elements is A, a matrix of n rows×1 column in which pixel values B1, B2, ..., and Bn of the secondary image data items are elements is B, a matrix of m rows×n columns in which products e1*C1=e1*C11:e1*C12: ... :e1*C1n, e2*C2=e2*C21:e2*C22: ... :e2*C2n, ..., and em*Cm=em*Cm1:em*Cm2: ... :em*Cmn of crosstalk ratios C1=C11:C12: ... :C1n, C2=C21:C22: ... :C2n, ..., and Cm=Cm1:Cm2: ... :Cmn of the light receiving sensors corresponding to the primary image data items and coefficients e1, e2, ..., and em corresponding to exposure values at the time of exposing the primary image data items are elements is T, and an inverse matrix of the T is $T^{-1}$, and
generates the secondary image data items by removing the primary image data of which a pixel value is saturated and establishing the matrix equation in a case where a pixel as a processing target includes the primary image data of which the pixel value is saturated.

17. The imaging device according to claim 16, further comprising:
an inverse matrix information storage unit that stores information of the inverse matrix $T^{-1}$,
wherein the secondary image data generation unit solves the matrix equation by using the information of the inverse matrix $T^{-1}$ stored in the inverse matrix information storage unit.

18. The imaging device according to claim 17,
wherein the inverse matrix information storage unit stores the information of the inverse matrix $T^{-1}$ for each pixel.

19. The imaging device according to claim 14,
wherein, in a case where a pixel as a processing target includes k number of primary image data items of which pixel values are saturated in which k is an integer satisfying k>0 and a relationship of (m−k)≤n is satisfied, the secondary image data generation unit calculates a pixel value of the secondary image data in the pixel as the processing target based on a pixel value of the primary image data which is not saturated and a crosstalk ratio of the primary image data which is not saturated without performing the crosstalk removal processing.

20. The imaging device according to claim 19,
wherein, in a case where m=k, the secondary image data generation unit determines the pixel value of the secondary image data in the pixel as the processing target, as a saturation value.

21. An image data generation method using an imaging device that includes an imaging lens including n number of optical systems of which imaging characteristics are different in which n is an integer satisfying n>1 and an image sensor including m number of light receiving sensors of which combinations of crosstalk ratio and light sensitivity are different in each pixel in which m is an integer satisfying m>n, the method comprising:
a step of exposing the image sensor;
a step of generating m number of primary image data items by obtaining image signals output from the light receiving sensors of each pixel of the image sensor;

a step of detecting a pixel of which a pixel value is saturated from the primary image data items; and a step of generating n number of secondary image data items corresponding to the optical systems by performing crosstalk removal processing on the m number of primary image data items for each pixel, the secondary image data items being generated by removing the primary image data of which the pixel value is saturated and performing the crosstalk removal processing on remaining primary image data items in a case where a processing target includes the primary image data of which the pixel value is saturated in the step of generating the secondary image data items.

22. The image data generation method according to claim 21,
wherein, in the step of generating the secondary image data items,
the secondary image data items are generated by solving the following simultaneous equations $$A1 = s1*C11*B1 + s1*C12*B2 + \ldots + s1*C1n*Bn$$
$$A2 = s2*C21*B1 + s2*C22*B2 + \ldots + s2*C2n*Bn$$
$$\ldots$$
$$Am = sm*Cm1*B1 + sm*Cm2*B2 + \ldots + sm*Cmn*Bn$$

as the crosstalk removal processing in a case where pixel values of the primary image data items are A1, A2, . . . , and Am, pixel values of the secondary image data items are B1, B2, . . . , and Bn, crosstalk ratios of the light receiving sensors are C1=C11:C12: . . . :C1n, C2=C21:C22: . . . :C2n, . . . , and Cm=Cm1: Cm2: . . . :Cmn, and coefficients corresponding to light sensitivity of the light receiving sensors are s1, s2, . . . , and sm, and the secondary image data items are generated by removing the primary image data of which a pixel value is saturated and establishing the simultaneous equations in a case where a pixel as a processing target includes the primary image data of which the pixel value is saturated.

23. The image data generation method according to claim 21,
wherein, in the step of generating the secondary image data items,
the secondary image data items are generated by solving the following matrix equation $$B=T^{-1}*A$$

as the crosstalk removal processing in a case where a matrix of m rows×1 column in which pixel values A1, A2, . . . , and Am of the primary image data items are elements is A, a matrix of n rows×1 column in which pixel values B1, B2, . . . , and Bn of the secondary image data items are elements is B, a matrix of m rows×n columns in which products s1*C1=s1*C11: s1*C12: . . . :s1*C1n, s2*C2=s2*C21:s2* C22: . . . :s2*C2n, . . . , and sm*Cm=sm*Cm1: sm*Cm2: . . . :sm*Cmn of crosstalk ratios C1=C11: C12: . . . :C1n, C2=C21:C22: . . . :C2n, . . . , and Cm=Cm1:Cm2: . . . :Cmn of the light receiving sensors and coefficients s1, s2, . . . , and sm corresponding to light sensitivity of the light receiving sensors are elements is T, and an inverse matrix of the T is $T^{-1}$, and the secondary image data items are generated by removing the primary image data of which the pixel value is saturated and establishing the matrix equation in a case where a pixel as a processing target includes the primary image data of which the pixel value is saturated.

24. The image data generation method according to claim 21,
wherein, in a case where a pixel as a processing target includes k number of primary image data items of which pixel values are saturated in which k is an integer satisfying k>0 and a relationship of (m−k)<n is satisfied, the crosstalk removal processing is not performed, and a pixel value of the secondary image data in the pixel as the processing target is calculated based on a pixel value of the primary image data which is not saturated and a crosstalk ratio of the primary image data which is not saturated in the step of generating the secondary image data items.

25. The image data generation method according to claim 24,
wherein, in a case where m=k, the pixel value of the secondary image data in the pixel as the processing target is determined as a saturation value in the step of generating the secondary image data items.

26. An image data generation method using an imaging device that includes an imaging lens including n number of optical systems of which imaging characteristics are different in which n is an integer satisfying n>1 and an image sensor including n number of light receiving sensors or more of which crosstalk ratios are different in each pixel, the method comprising:

a step of exposing the image sensor with different exposure values multiple times;

a step of generating m number of primary image data items in which m>n by obtaining image signals output from the light receiving sensors of each pixel of the image sensor whenever the exposing is performed;

a step of detecting a pixel of which a pixel value is saturated from the primary image data items; and a step of generating n number of secondary image data items corresponding to the optical systems by performing crosstalk removal processing on the m number of primary image data items for each pixel, the secondary image data items being generated by removing the primary image data of which a pixel value is saturated and performing the crosstalk removal processing on remaining primary image data items in a case where a processing target includes the primary image data of which the pixel value is saturated in the step of generating the secondary image data items.

27. The image data generation method according to claim 26,
wherein, in the step of generating the secondary image data items,
the secondary image data items are generated by solving the following simultaneous equations $$A1 = e1*C11*B1 + e1*C12*B2 + \ldots + e1*C1n*Bn$$
$$A2 = e28C21*B1 + e2*C22*B2 + \ldots + e2*C2n*Bn$$
$$\ldots$$
$$Am = em*Cm1*B1 + em*Cm2*B2 + \ldots + em*Cmn*Bn$$

as the crosstalk removal processing in a case where pixel values of the primary image data items are A1, A2, . . . , and Am, pixel values of the secondary image data items are B1, B2, . . . , and Bn, crosstalk ratios of the light receiving sensors corresponding to the primary image data items are C1=C11:C12: . . . :C1n, C2=C21:C22: . . . :C2n, . . . , and Cm=Cm1:Cm2: . . . :Cmn, and coefficients corresponding to exposure values at the time of exposing the primary image data items are e1, e2, . . . , and em, and the secondary image data items are generated by removing the primary image data of which the pixel value is saturated and establishing the simultaneous equation in a case where a pixel as a processing target includes the primary image data of which the pixel value is saturated.

28. The image data generation method according to claim 26, wherein, in the step of generating the secondary image data items, the secondary image data items are generated by solving the following matrix equation $$B = T^{-1} * A$$

as the crosstalk removal processing in a case where a matrix of m rows×1 column in which pixel values A1, A2, . . . , and Am of the primary image data items are elements is A, a matrix of n rows×1 column in which pixel values B1, B2, . . . , and Bn of the secondary image data items are elements is B, a matrix of m rows×n columns in which products e1*C1=e1*C11: e1*C12: . . . :e1*C1n, e2*C2=e2*C21:e2*C22: . . . : . . . e2*C2n, . . . , and em*Cm=em*Cm1: em*Cm2: . . . :em*Cmn of the crosstalk ratios C1=C11:C12: . . . :C1n, C2=C21:C22: . . . :C2n, . . . , and Cm=Cm1:Cm2: . . . :Cmn of the light receiving sensors corresponding to the primary image data items and coefficients e1, e2, . . . , and em corresponding to the exposure values at the time of exposing the primary image data items are elements is T, and an inverse matrix of the T is $T^{-1}$, and the secondary image data items are generated by removing the primary image data of which the pixel value is saturated and establishing the matrix equation in a case where the pixel as the processing target includes the primary image data of which the pixel value is saturated.

29. The image data generation method according to claim 26, wherein, in a case where a pixel as a processing target includes k number of primary image data items of which pixel values are saturated in which k is an integer satisfying k>0 and a relationship of (m−k)<n is satisfied, the crosstalk removal processing is not performed, and a pixel value of the secondary image data in the pixel as the processing target is calculated based on a pixel value of the primary image data which is not saturated and a crosstalk ratio of the primary image data which is not saturated in the step of generating the secondary image data items.

30. The image data generation method according to claim 29, wherein, in a case where m=k, the pixel value of the secondary image data in the pixel as the processing target is determined as a saturation value in the step of generating the secondary image data items.

\* \* \* \* \*